United States Patent
Yasukawa et al.

(10) Patent No.: US 7,047,550 B1
(45) Date of Patent: May 16, 2006

(54) SYSTEM FOR PROCESSING PROGRAM INFORMATION

(75) Inventors: Hideki Yasukawa, Tokyo (JP); Yoshihiro Noguchi, Ichikawa (JP); Masaki Hoshida, Tokyo (JP); Tsuyoshi Ueno, Tokyo (JP); Fumiyuki Kato, Yokohama (JP); Yutaka Tomioka, Yokohama (JP); Hayashi Itou, Matsudo (JP); Takao Isogawa, Sagamihara (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/108,506

(22) Filed: Jul. 1, 1998

(30) Foreign Application Priority Data

Jul. 3, 1997 (JP) .................................... 9-194750

(51) Int. Cl.
*G06F 3/00* (2006.01)

(52) U.S. Cl. .................... 725/44; 725/39; 725/43; 725/45; 725/46; 725/47; 725/50; 725/40

(58) Field of Classification Search .................. 725/13, 725/39, 40, 42, 44, 45–47, 68, 98, 118, 139, 725/148, 50, 52, 91, 100
See application file for complete search history.

(56) References Cited

U.S. PATENT DOCUMENTS

| | | | |
|---|---|---|---|
| 5,027,400 A * | 6/1991 | Baji et al. .................... 380/211 |
| 5,223,924 A | 6/1993 | Strubbe | |
| 5,353,121 A | 10/1994 | Young et al. | |
| 5,410,344 A | 4/1995 | Graves et al. | |
| 5,473,607 A | 12/1995 | Hausman et al. | |
| 5,483,278 A | 1/1996 | Strubbe et al. | |
| 5,659,350 A * | 8/1997 | Hendricks et al. .......... 725/116 |
| 5,678,015 A * | 10/1997 | Goh ............................ 345/782 |
| 5,686,954 A * | 11/1997 | Yoshinobu et al. ........... 725/43 |
| 5,694,176 A * | 12/1997 | Bruette et al. ................ 725/43 |
| 5,731,844 A * | 3/1998 | Rauch et al. .................. 725/40 |
| 5,737,029 A * | 4/1998 | Ohkura et al. ................ 725/56 |
| 5,751,282 A * | 5/1998 | Girard et al. ............... 345/721 |
| 5,758,259 A * | 5/1998 | Lawler ......................... 725/45 |
| 5,790,935 A * | 8/1998 | Payton ......................... 725/91 |
| 5,812,123 A * | 9/1998 | Rowe et al. .................. 725/43 |

(Continued)

FOREIGN PATENT DOCUMENTS

CN 1119390 A 3/1996

(Continued)

*Primary Examiner*—Jason Salce
(74) *Attorney, Agent, or Firm*—Michael G. Gilman

(57) ABSTRACT

To provide a system for processing program information in which the display structure of a program table can be freely changed in accordance with a requirement of or the taste of an audience, the system for processing program information is structured to include program information storage means 1 for storing program information, and program table display means 4 for two-dimensionally displaying a program table employing as the two axes, two attributes 102 and 103 selected from among all of the attributes that have been given to each piece of program information, to make the program table 101. For the audience, program tables of various constructions can be displayed on the display means at will and in respective program retrieval operations, a program table that is easy to use to search for a program can be obtained. An specific desired program can be found in a short time by selecting key word(s) related to each program and extracting them from the program or the like. This is useful for an audience member to make a plan of desired broadcasts for himself.

22 Claims, 48 Drawing Sheets

U.S. PATENT DOCUMENTS

| | | | |
|---|---|---|---|
| 5,818,510 A * | 10/1998 | Cobbley et al. | 725/116 |
| 5,850,218 A * | 12/1998 | LaJoie et al. | 725/45 |
| 5,867,207 A * | 2/1999 | Chaney et al. | 725/54 |
| 5,867,226 A * | 2/1999 | Wehmeyer et al. | 348/569 |
| 5,880,768 A * | 3/1999 | Lemmons et al. | 725/41 |
| 5,909,212 A * | 6/1999 | Nishina et al. | 725/47 |
| 5,929,932 A * | 7/1999 | Otsuki et al. | 725/47 |
| 6,005,601 A * | 12/1999 | Ohkura et al. | 725/52 |
| 6,028,600 A * | 2/2000 | Rosin et al. | 345/718 |
| 6,100,883 A * | 8/2000 | Hoarty | 345/721 |
| 6,262,722 B1 * | 7/2001 | Allison et al. | 725/39 |
| 6,263,501 B1 * | 7/2001 | Schein et al. | 725/39 |
| 6,426,779 B1 * | 7/2002 | Noguchi et al. | 348/569 |

FOREIGN PATENT DOCUMENTS

| | | |
|---|---|---|
| EP | 0705036 | 4/1996 |
| EP | 0774868 A1 | 5/1997 |
| EP | 0 819 354 | 1/1998 |
| WO | WO94/29811 | 12/1994 |
| WO | WO96/17473 | 6/1996 |
| WO | WO 96/31980 | 10/1996 |
| WO | WO 97/18670 | 5/1997 |

* cited by examiner

FIG.2

| 151 | 152 | 153 | 154 | 155 | 156 | 157 | 158 | |
|---|---|---|---|---|---|---|---|---|
| NIHON TV. | 19970531 | FRIDAY | 17:00 | 18:00 | TV OJAMANBOCHO | MANBOUTOTOKALU | 0 | OTHERS |
| NIHON TV. | 19970531 | FRIDAY | 18:00 | 18:30 | (N) PLUS 1/SATURDAY | NEWSCASTER: AKIO ISHIDA, KEI TAKAMI | 0 | OTHERS |
| NIHON TV. | 19970531 | FRIDAY | 18:30 | 19:00 | MOGUMOGU | LET'S MAKE A HOMEMADE PIZZA BY JOINING ALL FORCES | 0 | OTHERS |
| NIHON TV. | 19970531 | FRIDAY | 19:00 | 20:54 | <S> PRO BASEBALL | KOSHIEN, HANSHIN-KYOJIN, COMMENTATOR: HIROSHI YAMAMOTO | 2 | SPORTS |
| NIHON TV. | 19970531 | FRIDAY | 20:54 | 21:00 | (N) (WEATHER) | | 0 | OTHERS |
| NIHON TV. | 19970531 | FRIDAY | 21:00 | 21:54 | <S> FIVE | OF ASAMI BEGINNING TO INVESTIGATE A NEW TARGET | 3 | DRAMA |

FIG.5A

TIME  CHANNEL  //// TYPE //// 101   103

| | NHK | NHK EDUCATION | NIHON TV. | TBS | FUJI TV. | TV. ASAHI |
|---|---|---|---|---|---|---|
| 18:00 | | | | | SAZAE SAN | |
| 19:00 | | | | BASEBALL KYO-HAN | UNDER ONE ROOF | |
| 20:00 | MOURI | | GIFT | NEWS 23 | SOCCER | |
| 21:00 | | | | | | |
| 22:00 | | | | | | NEWS TODAY |

TIME  TYPE          CHANNEL      103

111 //// AUDIENCE RATING ////

| | MOVIE | DRAMA | MUSIC | SPORTS | NEWS | WEATHER | NON-SECTION |
|---|---|---|---|---|---|---|---|
| 18:00 | | | ⑧LIVE CONCERT | ⑥GRAND SUMO TOURNAMENT | ⑩NEWS 6 | ①WEATHER | |
| 19:00 | | | | | | | |
| 20:00 | | ①AGURI (REPEAT) | | ⑧BASEBALL | | ④WEATHER | |
| 21:00 | ⑩FOREIGN FILM | | | | ⑫NEWS 9 | | |
| 22:00 | | | | | | ④WEATHER | |

TYPE  AUDIENCE RATING   109   103

//// PERFORMER ////

| | MOVIE | DRAMA | MUSIC | SPORTS | NEWS | WEATHER | NON-SECTION |
|---|---|---|---|---|---|---|---|
| OVER 30% | | 8:00①AGURI | | | | | |
| 20% | | 20:00⑧UNDER ONE ROOF | | 20:00⑧BASEBALL KYO-HAN | | | |
| 15% | | 21:00⑫GIFT | | 21:00⑭SOCCER | 23:00⑥NEWS 23 | | |
| 10% | | 20:00⑫X-FILE | | | 22:00⑩NEWS STATION | | |
| 5% | | | | | | | |

TYPE   PERFORMER                    RELATIVE INFORMATION

| | MOVIE | DRAMA | MUSIC | SPORTS | NEWS | WEATHER | NON-SECTION |
|---|---|---|---|---|---|---|---|
| NAMIE AMURO | | | 20:00 ⑧ HEYHEYHEY | 14:00 ④PRO BASEBALL : OPENING CEREMONY | | | |
| NORIKO KATO | | 22:00 ④ SHOES OF GLASS | | | | | 12:00 ⑧WARATTE IITOMO! 19:55 ④MAGICAL ZUNO POWER |
| RANRAN SUZUKI | | 19:00 ⑩GHOST STORY | | | | | |
| SMAP | | 22:00 ⑧DOKU, 22:00 ⑧HE | | | | | |

FIG.6B

RELATIVE INFORMATION   PERFORMER

| | CD | BOOK | HOME PAGE |
|---|---|---|---|
| NAMIE AMURO | How to be a girl a walk in the park | AMURO NAMIE PHOTOGRAPH COLLECTION | |
| NORIKO KATO | | | http://kato |
| RANRAN SUZUKI | | | http://fuji |
| SMAP | SE | SMAP PHOTOGRAPH COLLECTION | |

FIG.7

| | PROGRAM | DAY | TIME | DAY OF WEEK | CHANNEL | ADDRESS | PROGRAM FORM | AUDIENCE RATING | TYPE | SUB-TYPE | PERFORMER | ROLE | NUMBER OF APPEARANCES | RELATIVE INFORMATION |
|---|---|---|---|---|---|---|---|---|---|---|---|---|---|---|
| PROGRAM | ▓ | X | X | X | X | X | X | △ | X | X | O | X | X | O |
| DAY | | ▓ | X | X | X | X | X | O | X | X | X | X | X | X |
| TIME | | | ▓ | O | ⊘ | X | △ | O | O | O | △ | X | X | X |
| DAY OF WEEK | | | | ▓ | X | X | △ | O | O | O | △ | X | X | O |
| CHANNEL | | | | | ▓ | X | O | X | X | X | X | X | X | X |
| ADDRESS | | | | | | ▓ | X | X | O | O | △ | X | X | X |
| PROGRAM FORM | | | | | | | ▓ | X | O | O | O | X | X | X |
| AUDIENCE RATING | | | | | | | | ▓ | X | X | O | X | X | O |
| TYPE | | | | | | | | | ▓ | X | ⊘ | X | X | O |
| SUB-TYPE | | | | | | | | | | ▓ | O | X | X | O |
| PERFORMER | | | | | | | | | | | ▓ | O | O | O |
| ROLE | | | | | | | | | | | | ▓ | X | X |
| NUMBER OF APPEARANCES | | | | | | | | | | | | | ▓ | X |
| RELATIVE INFORMATION | | | | | | | | | | | | | | ▓ |

IMAGE ON ANOTHER PICTURE

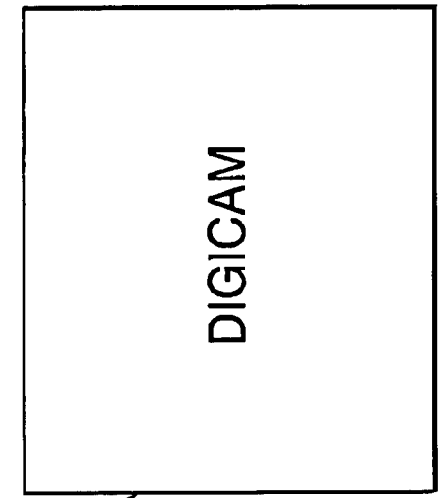
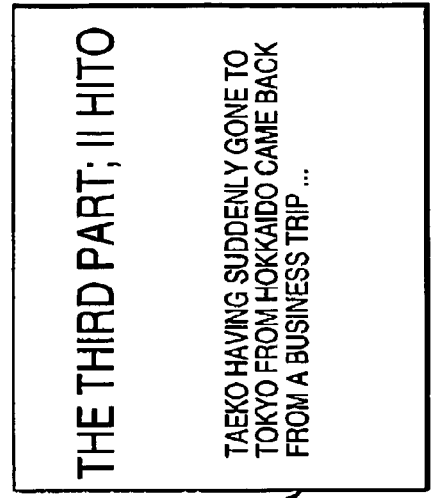
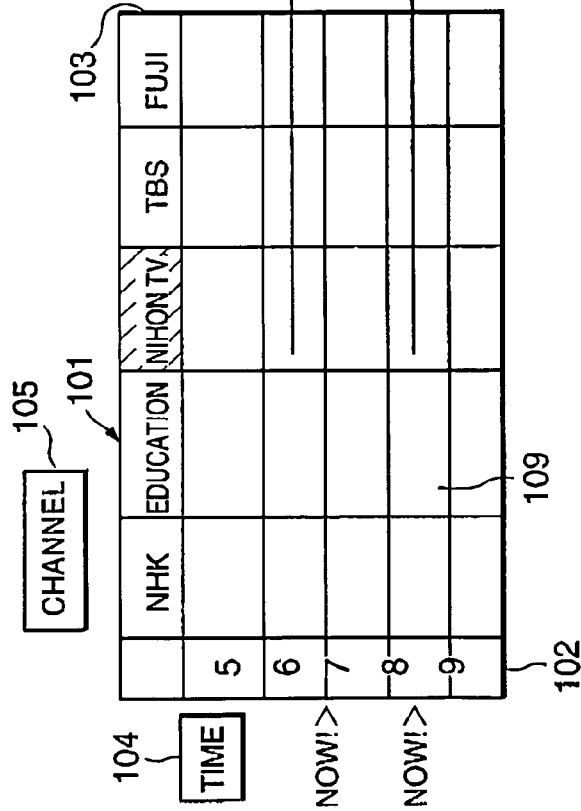

IMAGE SEQUENCE SUCH AS ADVERTISEMENT AND ANIMATION IS BROADCAST. BY TRANSMITTING THIS TO SERVER, USERS LOOKING PROGRAM TABLE CAN HAVE THIS JOINTLY.

FIG. 43

| | 1 | 2 | 3 | 4 |
|---|---|---|---|---|
| COMPUTER | NHK; NATION STANDING ON ELECTRONICS | NHK EDUCATION PERSONAL COMPUTER SCHOOL | THE UNIVERSITY OF THE AIR; PERSONAL COMPUTER ANALYSIS | |
| DIVING | TV. ASAHI; AMAMI OSHIMA | NIHON TV.; SOUTHERN COUNTRY PARADISE | | |
| MY TASTE | NHK EDUCATION; SCIENCE EYE | TBS; THE WORLD OF VOD | | |
| PROGRAM VIEWED LAST TIME | NHK EDUCATION; TOGETHER WITH MAMMA | FUJI TV.; PONKIKKIES | TV. TOKYO; DORAEMON | |

SYSTEM FOR PROCESSING PROGRAM INFORMATION

BACKGROUND OF THE INVENTION

1. Field of the Invention

The present invention relates to a system for processing program information that is capable of efficiently displaying the program information to an audience.

2. Description of the Prior Art

In recent years, program and image information have been broadcast and transmitted through a large number of channels because of the spread and progress of satellite broadcasting, satellite communication and so on. In the case of sending information relating to such a program or the like, that is, for example a program guide, to an audience, because of the large number of channels, of course, the number of frames of a program table also becomes large. There are various proposals for easily and efficiently sending or displaying this program table to the audience in an understandable form. As such prior art, for instance, there is a program information processor (display device) shown in Japanese Patent Laid Open No. 83888/1997. This program information processor includes a first memory means for storing program information, a second memory means for storing designation information for a program retrieval input by an audience, retrieving means for retrieving a program from the program information on the basis of designation information, program construction control means for constructing a program table based on the retrieval result and displaying it, and program selection means by which the audience selects a program from the program table. When the audience inputs designation information, a program meeting the condition(s) of the designation information is retrieved from the large quantities of program information that make up the program table. Designation information called for in this prior art includes, for instance, the present time, the established charge information and information about a viewed program. For in instance, when the present time is input as designation information, a program capable of being broadcast at present is retrieved. As another instance, when information of the viewed program is input as designation information, a program which has not been retrieved is retrieved. Of course, plural items of designation information can be input in one operation. As program table, can be made as a result of the retrieval, is suitably one in which various channels are arranged along the vertical axis and time slots are shown along the horizontal axis. As a matter of course, the relationship between the vertical and horizontal axes may be reversed. It is also possible that the time slots are arranged along the vertical axis and the various channels are shown along the horizontal axis in much the same manner as a program table that is presently carried in a general newspaper.

However, in such a prior art program information processor, because a program based on the conditions of designating information is retrieved by inputting various pieces of designating information, and a program is focussed oil in accordance with the taste or demand of the audience, there is the advantage that the audience finds it easy to select a program. However the program table assembled by this program information processor is merely a two-dimensional display in which the two attributes of channel and time slot are used as the two axes of the table, vis: the vertical axis and the horizontal axis as described above. This table can be assembled by deleting or culling programs that are not desired to be selected, from a program table that has been in general use up until now. Because of this, and because the number of channels is about to become 100 or more, because of increase in recent satellite broadcasting, if a program table is created as above, the two-dimensionally displayed program table itself occupies an extremely large area and the audience cannot look everywhere when searching for a program or cannot spend the huge amount of time needed for searching the current program. Furthermore, if whole program table is displayed even though a program only in a specific time zone is to be searched, there is the defect that it is hard to search the desired program because program columns of other time zones catch the sarcher's eye.

SUMMARY OF THE INVENTION

The present invention has been made in view of such prior art problems and one of its objects is to provide a system for processing program information in which the display structure of a program table can freely be changed in accordance with a requirement or the taste of the audience.

For attaining the above object, the present invention comprises a system for processing program information including means for storing program information, and program table display means for two-dimensionally displaying a program table made up of two axes identifying two attributes, from among the attributes given of each piece of program information, wherein the program table displays programs in two dimensions by using any two of the attributes at a time as the two axes.

Because it is desired that the audience can determine the attributes of the two-axes at will, the system further comprises attribute input means through which the two-axes attributes used for two-dimensionally displaying the program table are input, and program table making means for retrieving program information, from program information stored in the program information storage means, on the basis of said selected input attributes to make the program table, and the program table display means can display the program table derived by the program table making means. In this manner, the program table making means retrieves program information stored in the program information storage means and can also classify the above referred to program information.

Therefore, although a conventional program table is limited to a table structure in which time slots are arranged along the vertical axis and various channels are arranged along the horizontal axis, the program table of this invention, has an unlimited structure without either axis being necessarily fixed as to what criteria can be displayed and thus, the audience has a greater degree of freedom to select a program based on its own selected criteria.

The invention set forth herein comprises a system for processing program information including program information storage means for storing program information, and program table display means for two-dimensionally displaying a program table having two axes each of which is assigned to an attribute from among attributes that are related to each piece of program information, wherein the operation of the program table is in accordance with the taste or requirements of a user who arbitrarily establishes the specific attributes of the two-axes. Means are provided for displaying such a table which makes program retrieval easier and faster.

The instant invention further comprises a system for processing program information, in the manner set forth above and further comprises attribute input means. The attribute input means enables the two-axes attributes, that will be used for two-dimensionally displaying the program table, to be input. Program table making means is provided, for retrieving program information from program information stored in the program information storage means on the basis of the selected attributes that have been input to make the program table. The user can select and determine the formation of the program table that suits his taste by selecting the attributes of the two axes, through the attribute input means, and displaying the program table created by the program table making means.

The invention further comprises in a system for processing program information as set forth above, that the program table making means has the functions of retrieving program information stored in the program information storage means and classifying the retrieved program information.

The invention further comprises in the system for processing program information as set forth above, the selection of another attribute selected in addition to the selected attributes of the two axes of the program table to change over the display.

The invention further comprises, in a system for processing program information as set forth above, that the table display is created by culling out a portion of the program information that is not needed.

The invention further comprises, in a system for processing program information as set forth above, means for restoring and displaying the original program table when displaying the modified program table.

The invention further comprises a system for processing program information, as set forth above wherein the user can select an attribute relative to the program and that selected attribute is used to change the display of the table.

The invention further comprises a system for processing program information as set forth above wherein a new attribute can be added to and an old attribute can be deleted from the program table in accordance with a selection by a user or an input from another system.

The invention further comprises a system for processing program information as set forth above wherein information registered by a user is designated as an attribute of the program table.

The invention further comprises a system for processing program information set forth above wherein when there are plural programs in a same time slot, they are displayed slightly offset, one upon another, as they are shifted rearward little by little, and the front of each program can be displayed one a time. Further, mean are provided such that this display can be used for a program check of the same time slot without expanding the display area.

The invention further comprises a system for processing program information as set forth above having a program table made up of three-axes each of which is assigned a specific attribute selected by a user to display information in a three-dimensional mode.

The invention further comprises a system for processing program information as set forth above wherein an attributive word related to an attribute of the program table can be extracted from the program information and used in the table.

The invention further comprises a system for processing program information as set forth above further comprising means for storing pictures or sounds of a program and means to display and play them back.

The invention further comprises a system for processing program information as set forth above when a channel or a program is selected from the attributes of the program table, means are provided to convert the designated channel into a pictorial form of the selected program; and further wherein means are provided to display program related information if the program is on the air at present, and to display information relative to the program if the program is off the air.

The invention further comprises a system for processing program information as set forth above wherein, when a channel is selected as an attribute of the program table, means are provided to display advertisements and program relation information in accordance with the time schedule of programs in the channel.

The invention further comprises a system for processing program information as set forth above further comprising means for transmitting and/or receiving program information, program relation information, program information renewal information, information registered by a user, a program, a picture, or a sound.

The invention further comprises a system for processing program information, as set forth above further comprising means for transmitting an image sequence made by a user and receiving such image sequence in a manner to be displayed in a portion of the program table.

The invention further comprises a system for processing program information as set forth above further comprising means for transmitting program information selected by a user; means for calculating the number of people viewing the same program; means for displaying the calculated result in a portion of the program table as an audience rating or the number of people in the audience receiving a specified program.

The invention further comprising a system for processing program information, including means for transmitting and receiving an index for retrieving a program.

The invention further comprising a system for processing program information as set forth above, further comprising means for maintaining a user attribute at the receiver side to retrieve program information, including an index for retrieving a program, on the basis of an attribute selected by a user.

The invention further comprises a system for processing program information as set forth above, further comprising means for retrieval and an automatic classification of a program, that was not successfully retrieved based on program information and an index for retrieving a program, at the transmitter side and means for transmitting the result to the receiver side.

The invention further comprises a system for processing program information as set forth above forth comprising when a retrieval of a program according to an attribute selected by a user was unsuccessful when using program information including an index for retrieving a program, at the receiver side, means for retrieving and automatically classifying the program, according to the user selected attribute, at the transmitter side and means for transmitting the result to the receiver side.

The invention further comprises a system for processing program information as set forth above further comprising means for recording a designated program, means for reserving the recorded program and/or means for playing back the recorded program in accordance with a designation of a user or an input from another system.

The invention further comprises a system for processing program information as set forth above further comprising means for displaying program(s) that have been recorded or reserved for recording along the time axis of the program table.

The invention further comprises a system for processing program information as set forth above further comprising means for recording information of the program that has been viewed by a user, means for relating the recorded program information to all programs, and means for displaying the program when it is judged that the relationship is high.

The invention further comprising a system for processing program information as set forth above further comprising means to determine whether or not a performer of the program appears at a certain time of a certain day.

The invention further comprising a system for processing program information as set forth above further comprising means for calculating a fitting degree between program information and each piece of program classification information, and program classification means comprising means to calculate a degree of fitting between a piece of program classification information and a program information set, using the fitting degree calculation means to obtain a subset of the program information set having a fitting degree not less than a given threshold value, means for taking as at least one attribute a predetermined or predesignated line of the program classification at least one attributes of the program table, and means to display it by the program table display means.

The invention further comprising a system for processing program information as set forth above including fitting degree calculation means for calculating a fitting degree between program information and each piece of program classification information, and program classification means in which, as to one given piece of program classification information and a program information set, a fitting degree of each piece of program information in the program information set to program classification information, is calculated by using the fitting degree calculation means to obtain a subset of the program information set having a fitting degree not less than a given threshold value, and means to display only a program classified into a predetermined or predesignated program classification so that it can be distinguished from another program in the program table irrespective of the form of the program table.

The invention further comprising a system for processing program information as set forth above that includes program information designation means for designating a subset of the program information set stored in the program information storage means, means for extracting a key word set characterizing the subset from the subset of program information designated by the program information designation means, means for extracting characteristic word information from the designated subset by using a relative key word extraction means and means for extracting program classification information that enables determining discriminating and classifying program information similar to program information in the subset, and wherein a user can designate a proper program group and easily user-define a new program classification information, whereby the trouble of designating a characteristic word is overcome and a program can be classified more accurately because the characteristic word is extracted from actual program information.

The invention further comprising system for processing program information as set forth above further comprising means for transmitting program classification information from a user side terminal to a transmitter side terminal, means for classifying program information by the program information classification means at the transmitter side, and means for limiting transmission of program information, classified into program classification information, from the user side terminal to the user side terminal, and means for reducing the quantity of data to be transmitted as compared to the quantity of data in the all program table, by transmitting only program information classified into program classification information transmitted from the user side terminal in a remote place, to the user side terminal to display it on the program display means of the user side terminal.

BRIEF DESCRIPTION OF THE DRAWINGS

These and other objects and features will become more readily apparent from the following detailed description taken in conjunction with the accompanying drawings in which:

FIG. 2 is a data structure diagram extracting and showing an example of program information stored in the program information storage means;

FIG. 5A is a diagram showing the construction of a program table in an ordinary form for use in the above first embodiment;

FIG. 5B is diagram showing a program table in a changed form having two axes of "type" and "time" for use in the above first embodiment;

FIG. 5C is a diagram showing the program table in a changed form having two axes of "type" and "audience rating" for use in the above first embodiment;

FIG. 6A is a program table in a changed form having two axes of "type" and "performer" for use in the above first embodiment;

FIG. 6B is a program table in a changed form having two axes of "performer" and "relative information" for use in the above first embodiment;

FIG. 7 is a diagram showing, by a table, proper or improper combinations of attributes used for two axes;

FIG. 28A is a diagram showing the construction of a program table in the ordinary form used in the above twelfth embodiment;

FIG. 28B is a diagram showing the construction of a picture displaying program information of the corresponding program on the air at present by designating the channel in the program table of the above FIG. 28A;

FIG. 28C is a diagram showing the construction of the picture displaying program information of another corresponding program on the air at present by designating the channel at another time in the program table of the above FIG. 28A;

FIG. 43 is a diagram showing a user classification program table when designating the user classification operation in the program table shown in FIG. 42A;

DETAILED DESCRIPTION OF THE PREFERRED EMBODIMENTS

Hereinafter, embodiments of the present invention will be described in detail with reference to accompanying drawings.

First Embodiment

Figure 1:
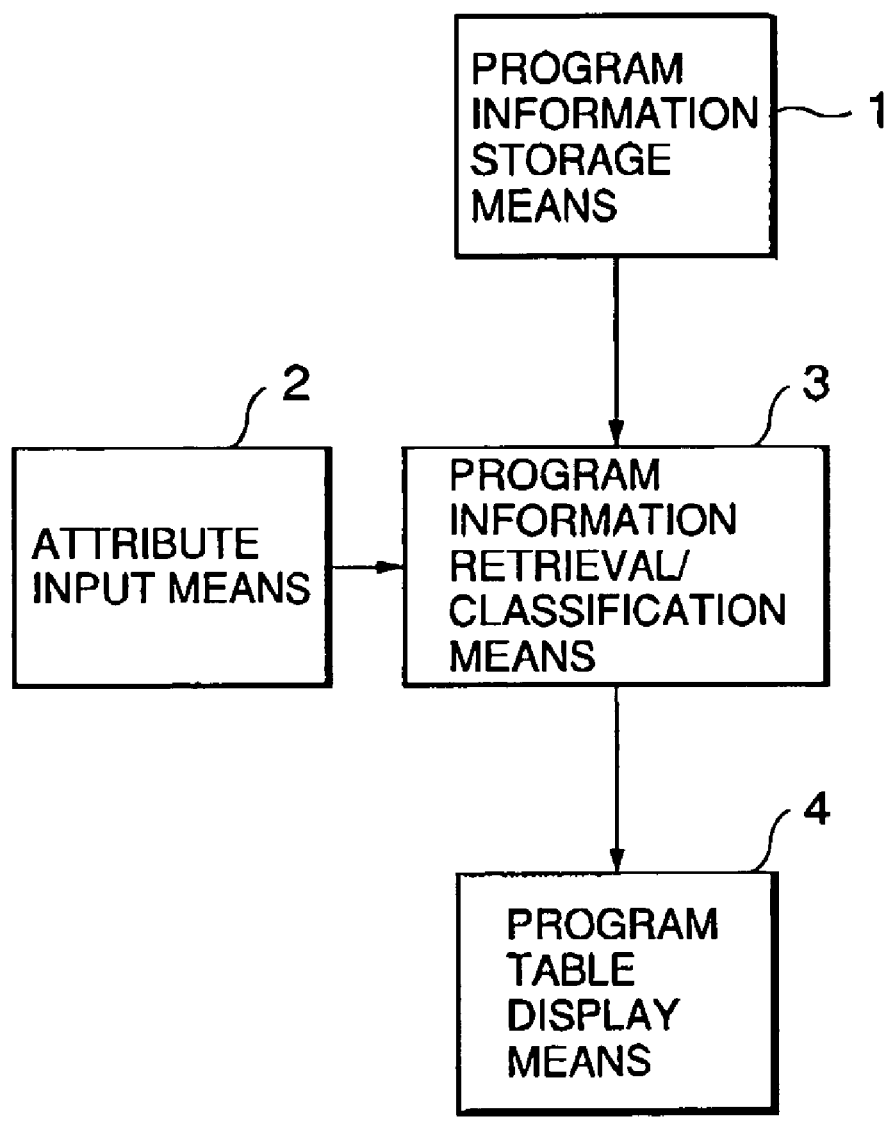
FIG. 1 is a block diagram showing the construction of a first embodiment of a system for processing program information according to the present invention.

FIG. 1 is a block diagram showing the construction of the first embodiment of a system for processing program information according to the present invention. In FIG. 1, the reference 1 denotes program information storage means for storing received program information, 2 denotes attribute input means through which attribute information, to be used as the two-axes of a program table and the others attribute information are input, 3 denotes program information retrieval/classification means as program making means for retrieving and/or classifying a program in program information storage on the basis of input attribute information to make the program table, and 4 denotes program table display means for displaying a fully made program table.

Any attribute information can be used as the two-axes attributes, although it goes without saying that time slots (hereinafter, merely called time) and channels are conventionally used. However, this invention is not limited to those attributes. There are various attributes, for instance, time related attributes, such as days of week and prime times, and category (type of program) related attributes such as news, weather reports, dramas, sports (may be by event), song programs, cooking programs and education programs. Furthermore, attributes that relate to sponsors, attributes that relate to performers or producers, information relative to programs (such as home pages, books and CDs), program forms (such as live, rebroadcast, bilingual, teletext, digest, high-definition broadcasting, wide-vision broadcasting and stereophonic broadcasting), audience rating, broadcasting areas, commentaries, G-codes, and so on.

FIG. 2 is a data structure diagram showing an extracted instance of program information stored in the program information storage means 1. As shown in this drawing, program information is displayed as a directory in the form of a table. A detailed content of each piece of program information is separately housed. The names of TV stations providing these programs are described in station name columns 151 of this table and the dates, times and the days of the week when those programs are broadcast are described in date columns 152 and day-of-week columns 153, respectively. The broadcasting start times and the broadcasting end times of those programs are described in broadcasting start time columns 154 and broadcasting end time columns 155. The titles of stored programs are described in program title columns 156. The contents of the stored programs are described in outline form in program content columns 157. Furthermore, in program classification columns 158, the types of materials that make up the programs are described with corresponding numerical values and the names of the types (for example: 0: others, 2: sports, and the like).

The following data are housed as the detailed content of program information. This is an example using program information of professional baseball broadcast in Japan from nineteen hundred hours to twenty hundred fifty-four hours of May 31, 1997, as shown on the fourth line in FIG. 2. The detailed content of this piece of program information has a data structure such as "975310000000186, 01, E8004, Nihon Television, 19970531,199780531, 1, Saturday, 19:00, 20:54, pro baseball, Koshien Stadium, Hanshin vs. Kyojin, commentator: Koji Yamamoto, Kozo Kawato, announcer: Bin Ogi, (maximum extension to 9:24, move back programs after), Hanshin lack of force of the batting because of throwing out Greenwel. But the sense of stability of the starting pitching staff of Yabu, Kawajiri, et al., has increased. If the first run is scored by surely seizing a few chances and then the attack of Kyojin is stopped by the defensive force including pitcher . . . , (called off) Super Special 97 "song battle of famous songs of Showa vs. hit songs of Heisei", 471832, 0100000000000000000000000000, 2, sports," As for the other programs, the detailed contents are almost the same and have the contents briefly reporting the contents of the respective programs.

Figure 3A:
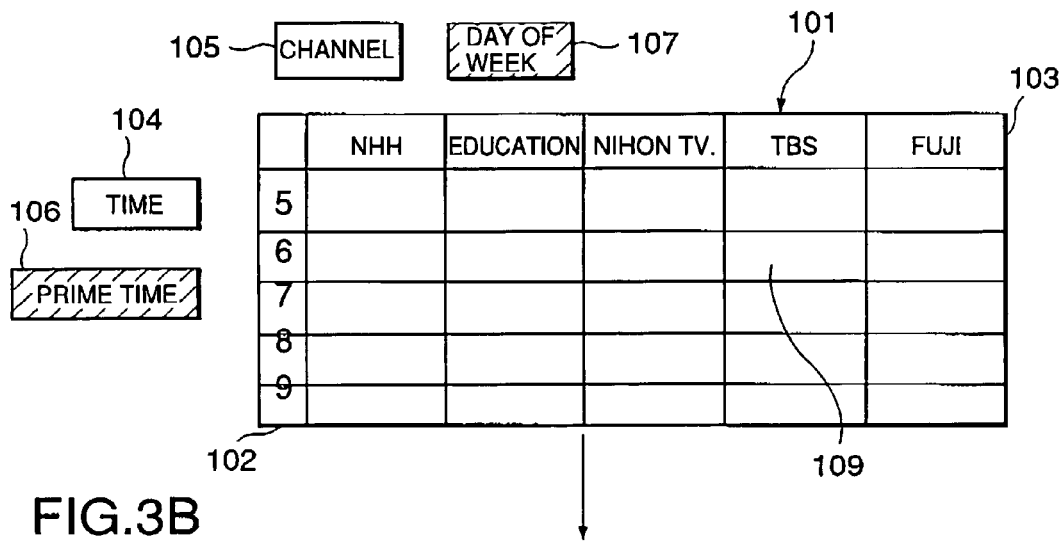
FIG. 3A is a diagram showing the construction of the program table in an ordinary form having two axes of "channel" and "time", respectively, used in the above first embodiment.
Figure 3B:
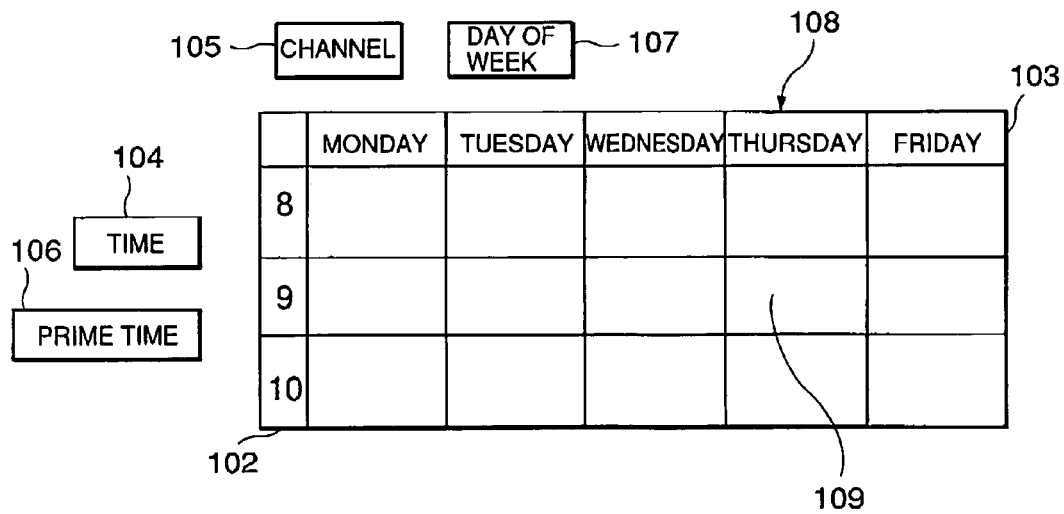
FIG. 3B is a program table listing by day of week and limited to prime time programs for use in the above first embodiment.

As for the system for processing program information constructed as above, the operation will be described hereinafter. FIGS. 3A and 3B are diagrams for illustrating display operations of the program table in the system for processing program information according to the above first embodiment.

In this first embodiment, when displaying the program table 101, as shown in FIG. 3A, at first, as a base display operation, the program table 101w in which time slots are arranged along the vertical axis 102 and various channels are arranged along the horizontal axis 103, is two-dimensionally displayed on the program table display means 4. On the positions adjacent to the axes of the program table 101 in the display picture, there are provided display columns for the attributes of the two axes that determine the construction of the program table displayed at present, that is, the present attribute display columns 104 and 105, and display columns for other attributes for changing the construction of the program table, that is, change the nature of the attribute display columns 106 and 107. In FIG. 3A, "time" is displayed in the present attribute display column 104 and "CH" representing channel, is displayed in the present attribute display column 105. "prime time", as another piece of attribute information capable of being used to construct one of the two-axes, is displayed in the changed attribute display column 106, and "day of week" as another piece of attribute information likewise capable of constituting an attribute of one of the two-axes is displayed in the changed attribute display column 107. Each of the above-described attribute display columns 104, 105, 106 and 107, or various display columns described later, functions as a operation button that, when the display column is clicked by data input means (a mouse or the like), the operation displayed therein is performed or the picture is changed to show the matter displayed therein.

If an audience designates the respective attributes "prime time" and "day of week" from the changed attribute display columns 106 and 107, those attributes are input through the attribute input means and the program information retrieval/classification means 3 makes a program table using the respective attributes as the attributes of the two axes and the program table by day of week relative only to prime time (eight o'clock to ten o'clock, PM), that is, the program table 108 in which the time slots are only for prime time (eight o'clock to ten o'clock) are arranged along the vertical axis 102 and the days of week (Monday, Tuesday, Wednesday, . . . ) are arranged along the horizontal axis 103, is displayed on the program table display means 4. In FIGS. 3A and 3B, squares other than the axes 102 and 103 are program information display columns 109, in which respective corresponding pieces of program information are displayed or stored as data in a memory of the program table display means at the conditions of being able to be displayed.

Here, the operation of the program information retrieval/classification means 3 used in the present invention will be described. The program information retrieval/classification means 3 has either or both of the functions of retrieval and classification in addition to the function of making a program table. Here, the retrieval function will be described first (the classification function will be described in relation to the sixth embodiment of this invention).

As the attributes input through the attribute input means 2, there are various pieces of attribute information, for instance, the time (the date, the day of week, the prime time, the start time, and the end time), the channel, the type of program (such as news, weather reports, dramas, and sports), the subtype, the title, the sponsor, the performer (the role, and the number of appearances), the producer, program relation information (such as home pages, books and CDs), program forms (such as live, rebroadcast, bilingual, teletext, digest, high-definition broadcasting, wide-vision broadcasting and stereophonic broadcasting), an audience ratings, broadcasting areas, commentaries, G-codes, and so on. Not merely the attributes but also attribute values can be considered.

In FIGS. 3A and 3B, the buttons, such as "CHANNEL", "TIME", "DAY OF WEEK" and "PRIME TIME", and each square of the program table, that is, the program display column 109, correspond to the attribute input means 2 in FIG. 1. For instance, if the buttons of "day of week" and "prime time" are operated, from the attribute of "day of week", part of "Monday, Tuesday, Wednesday, Thursday, Friday, Saturday, Sunday" is obtained from the data of "day of week: Monday, Tuesday, Wednesday, Thursday, Friday, Saturday, Sunday". Furthermore, from the attribute of "prime time", the part of "20, 21, 22" is obtained from the data of "prime time: 20, 21, 22" stored in the attribute structure storage means. The attribute structure storage means is memory means for storing data relative to an attribute, the construction and operation of which will be described in the description of a later embodiment. Program information satisfying those two attribute values is retrieved from the program information storage means 1 as shown in FIG. 1 through the program information retrieval/classification means 3, and the corresponding position of the program table is determined to display it on the program table display means 4. In FIG. 1, the attribute structure storage means is in default.

As described above, in this embodiment, for viewing other than the ordinary program table, comprising the two axes of existing channel and time, the user can arrange the program table in the form that he likes to look at, by designating by himself the two attributes (two-axes attributes) that he likes to see. Furthermore, he can designate the attribute by the data constituted by an attribute stored in the attribute structure storage means and the attribute value. From that, in conventional retrieving systems, there are many cases that the retrieval result is shown as a list having a certain attribute in common, for instance, an attribute such as ranking. In the case of a display in relation to two attributes by this manner, two lists on the display in relation to the attributes on or after the second in each item in the list is required. In contrast to this, by including the retrieval result in this table form, because at least the two attributes of the vertical and horizontal axes can be used, in the case of the two attributes, the display is possible by one table. As for attributes on and after the third, the displays in relation to those attributes can be inserted in the program display columns 109 in the table similarly to the list. As described above, the merit as the table can be utilized for the retrieval result, furthermore, the display can be proposed to the user without changing the display image.

Figure 4A:
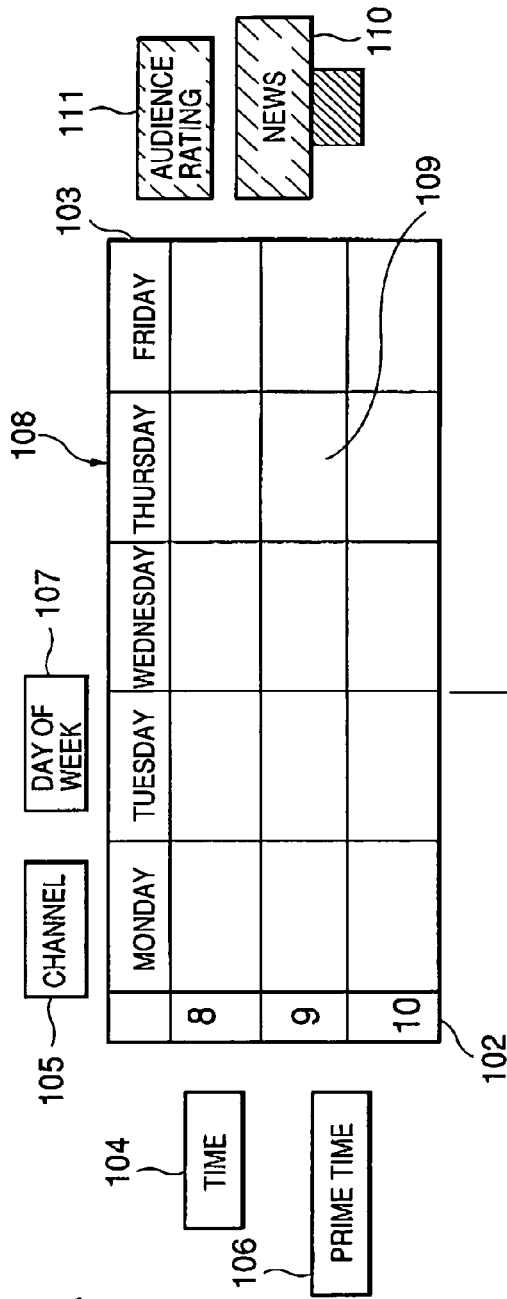
FIGS. 4A and 4B are diagrams illustrating an example of changing the display operation of the program table in a system for processing program information according to the above first embodiment.
Figure 4B:
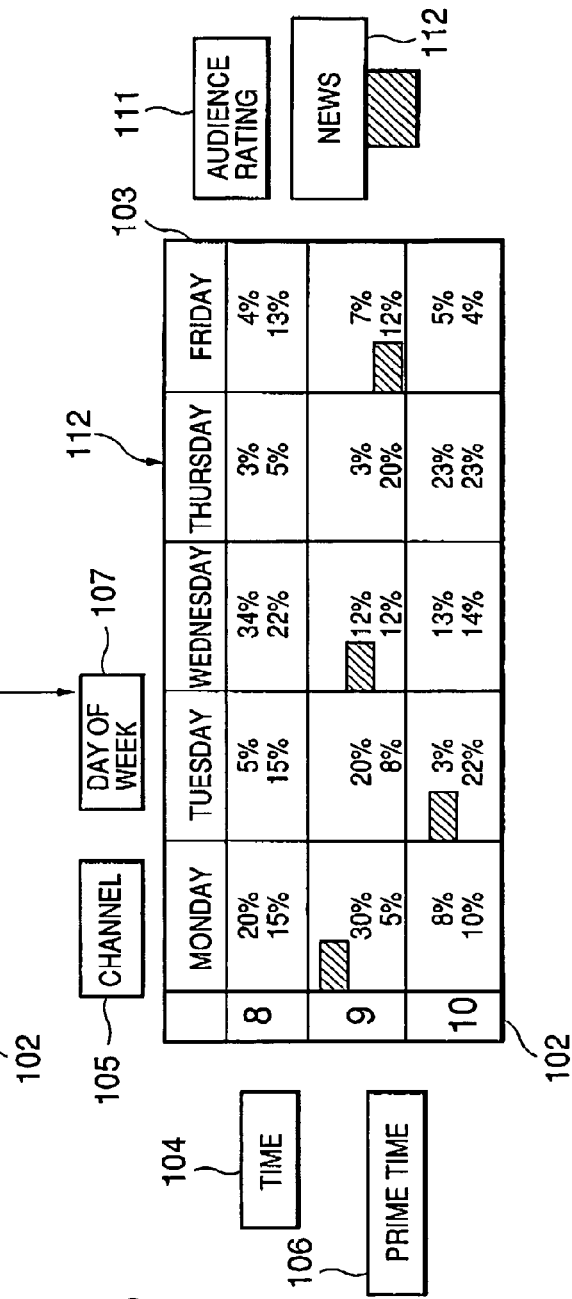

FIGS. 4A and 4B are diagrams illustrating modified examples of display operations of the program table in the system for processing program information according to the above first embodiment. In this modified operation of the first embodiments, at the position adjacent to the right side of the program table 108 in the picture displaying the program table 108, there are provided attribute display columns 110 and 111 for further changing the construction of the program table. In the example of FIG. 4A, "NEWS (news)", which is one of the types of programs, is displayed in the attribute display column 110, and "audience rating" representing an attribute that the user wants to know is displayed in the other attribute display column 111.

If the user/audience designates the respective attributes of "NEWS" and "audience rating" from the attribute display columns 110 and 111, those attributes are input through the attribute input means, and the program information retrieval/classification means 3 makes a program investigation result table 112 along the respective attributes to display the audience rating investigation result table 112 of the news program by the date of week in relation to only the prime time (eight o'clock to ten o'clock), on the program table display means 4. In this manner, changing over the display becomes possible by selecting other attributes in addition to the two-axes attributes of the program table 101 or 108. In the case of FIGS. 4A and B, if buttons such as "audience rating" and "NEWS", which are attributes other than the attributes of the two-axes of the program table 101 such as "CH", "time", "day of week" and "prime time", are operated, program information corresponding to those is retrieved from the program information storage means 1 shown in FIG. 1 through the program information retrieval/classification means 3 to display it on the program table display means 4.

In this manner, in relation to relative attributes other than the attributes on the two axes of the program table 101, they can be considered with relation to the program table 108 or 112, and more different criteria for viewing the program table can be proposed to the user.

Furthermore, as another operation form, for instance, when the ordinary program table 101 is displayed on the program table display means 4, if the user inputs "type" and "time" through the attribute input means 2, (because the time is not selected, it is input by default), from program information of FIG. 2, the fields of the type and the time of each piece of program information are checked to select one in which the same contents are described in both of them, and the program is arranged in the columns of the corresponding type and the corresponding time of the program table. Different attributes relative to the input attributes are used for the two-axes' attributes. These are derived from program information of FIG. 2. Selecting other attributes is similarly accomplished. In the case of changing only one attribute of the two-axes' attributes, the old (unchanged) attribute is used for the attribute not selected. By the above operation, on the program table display means 4, from the ordinary program table 101 shown in FIG. 5A, a program table 159 in which "type" and "time" are used for the two axes as shown in FIG. 5B, is displayed. As for the change operation of the display of the program table by a changed selection of the two-axes attributes, a little more description will be made. In the display condition of FIG. 5B, if the user inputs "type" and "audience rating" through the attribute input means 2, a program table in which each attribute is used for the two axis is displayed as shown in FIG. 5C. Next, in the display condition of FIG. 5C, if the user inputs "type" and "performer" through the attribute input means 2, performers are enumerated on the vertical axis 102 as shown in FIG. 6A and the type is shown on the horizontal axis 103 whereby a program table is displayed in which each attribute is used for the two axes. Furthermore, in the display condition of FIG. 6C, if the user inputs "performer" and "relative information" through the attribute input means 2, the performers are enumerated on the vertical axis 102 as shown in FIG. 6B and information such as CDs, books and home pages is shown on the horizontal axis 103 as relative information to display a program table in which each attribute is used for the two axes. In this manner, by optionally inputting the two-axes' attributes, the form or the construction of the program table can be changed sequentially.

As described above, in this embodiment, in order to view program tables other than the ordinary program table comprising the two axes of "existing channel" and "time", the user can look at the program table as the form of the program table is changing sequentially, by designating by himself the two attributes (two-axes attributes) that he likes to look at. For instance, in the above operation, if "type" and "time" are selected as the two-axes attributes, it becomes easy to find the weather report at the time closest to now. If "type" and "audience rating" are selected, it is possible to select and view only highly popular programs from among dramas. If "type" and "performer" are selected, it can be seen which performer often appears in which type of program. Furthermore, if "performer" and "relative information" are selected, it can be seen which performer does what activity.

Upon the input operation of the two-axes attributes for changing the form of the program table, not all attributes can be freely input, but there are combinations of attributes that are improper for designating the two-axes attributes. FIG. 7 is a diagram of a table showing combinations of attributes that are proper or improper selections for the two-axes attributes. In this drawing, the combinations of attributes marked by ○ are considered to be proper selections for the two-axes attributes and the combinations of attributes marked by x are considered to be improper selections for the two-axes attributes. The combinations of attributes marked by Δ cannot be judged whether they are proper or improper for the two-axes attributes. For instance, if "time" and "channel" are selected as two attributes, an ordinary program table can be made. This would be a combination of attributes that are proper for the two axes. Other combinations marked by ○ are effective combinations, and effective manners of viewing the program table can be proposed by increasing the number of variations for showing program information to the user.

In the conventional program information retrieval system, there are many cases where the retrieval result is shown as a list according to a certain attribute, for instance, an attribute such as ranking. In the case of the display in relation to two attributes by this manner, two lists are displayed in relation to the attributes on or after the second one of each item in the list is required. Because that second attribute is displayed in a form depending on the first attribute, it cannot be considered an even display as to the attributes. That is, in contrast to laying emphasis on the first attribute, by including the retrieval result in this table form, because at least the two attributes of the vertical and horizontal axes can be used, because of an even display, in the case of the two attributes, the display is possible in one table and, the manner of view from the user does not incline to one attribute. Furthermore, as for attributes on and after the third, the displays in relation to those attributes can be inserted in squares (correspond to the reference 109) in the table similarly to the list. As described above, the merit as the table can be utilized for the retrieval result, furthermore, the display can be proposed to the user without changing the display image.

2nd Embodiment

Figure 8:
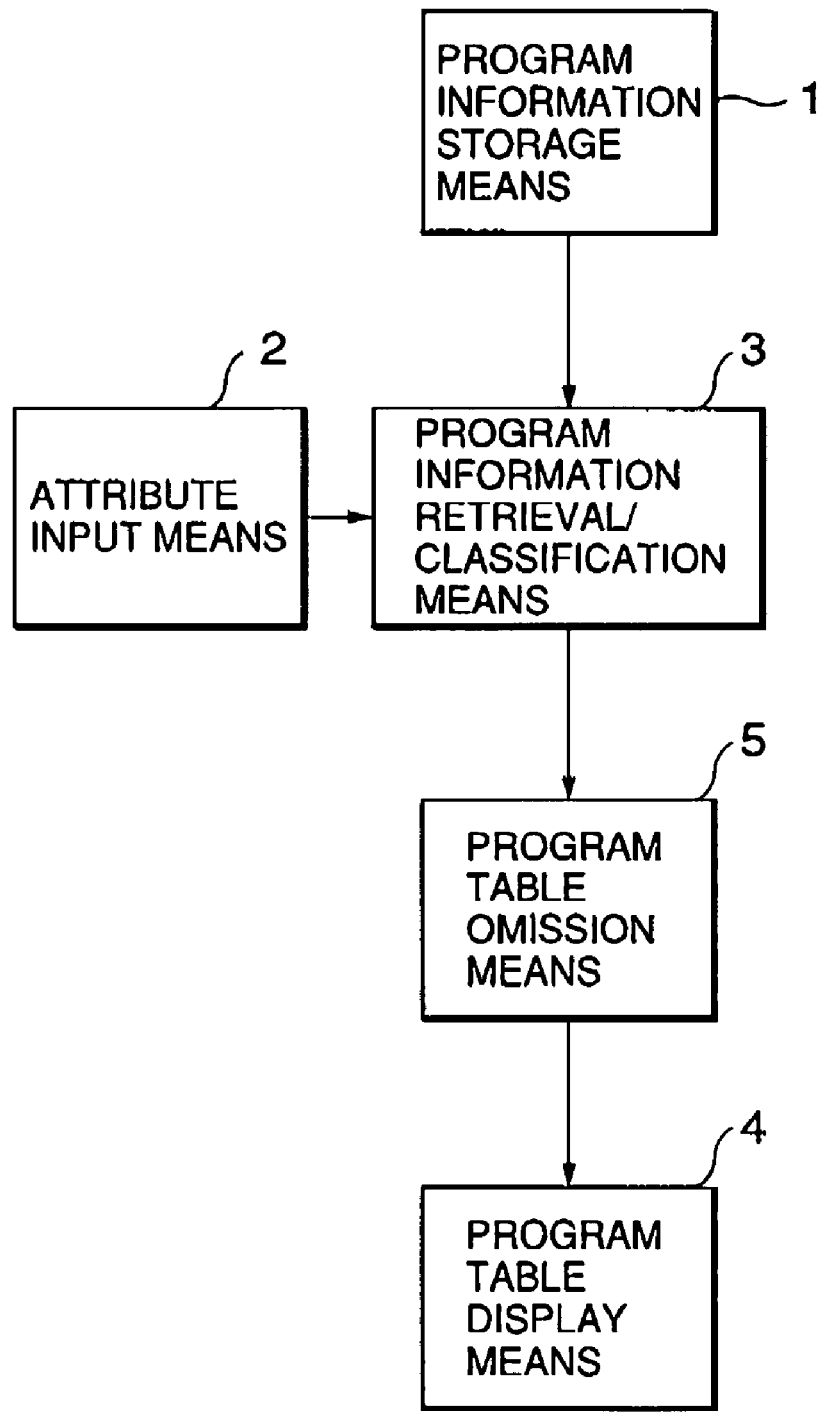
FIG. 8 is a block diagram showing the construction of a second embodiment of a system for processing program information according to the present invention.

FIG. 8 is a block diagram showing the construction of the second embodiment of a system for processing program information according to the present invention. In FIG. 8, the reference 5 denotes program table omission means for culling out information that is not needed to be displayed in a program table. The program table omission means 5 is disposed between program information retrieval/classification means 3 and program table display means to receive data from the program information retrieval/classification means 3 and send the processed result to the program table display means 4. In this second embodiment, the other features of the system for processing program information is the same as the above first embodiment and includes program information storage means 1, attribute input means 2, the program information retrieval/classification means 3, and the program table display means 4.

Figure 9A:
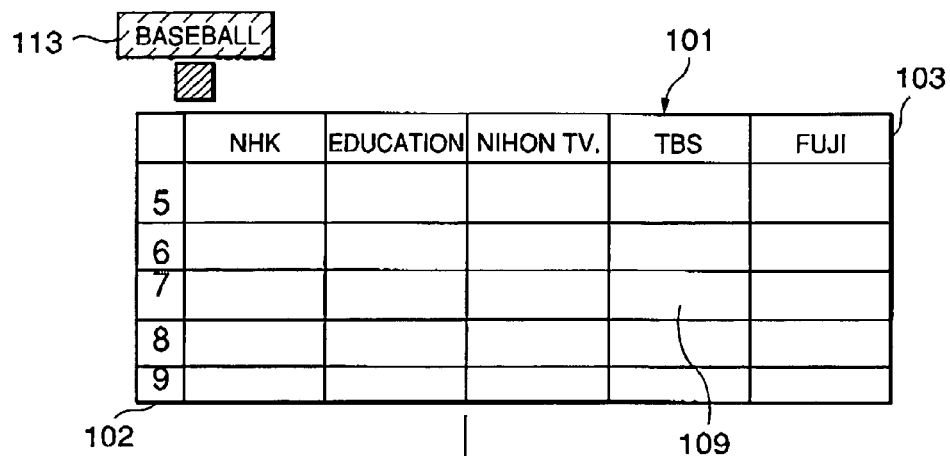
FIG. 9A is a diagram showing the construction of a program table in an ordinary form having two axes of "channel" and "time" for use in the above second embodiment.

The operation of the system for processing program information according to the second embodiment having this structure will be described. FIGS. 9A, B and C diagrams for illustrating the display operation of the program table in the system for processing program information according to the second embodiment. In this second embodiment, as shown in FIG. 9A, at first, a basic program table 101 is two-dimensionally displayed on the program table display means 4. At the position (the upper position of the program table) adjacent to the program table 101 in the display picture, there is provided a retrieval attribute display column 113 for retrieving a program. In this retrieval attribute display column 113, "baseball" in relation to the type is displayed as the attribute wanted to retrieve a program.

Figure 9B:
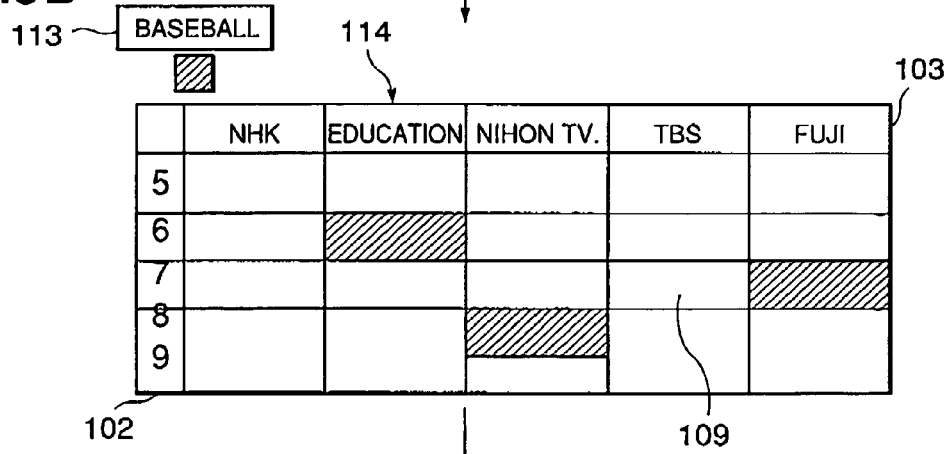
FIG. 9B is a diagram showing the construction of a program table displaying separately, by color, the corresponding program obtained by selecting and designating the corresponding attribute in the above second embodiment.
Figure 9C:
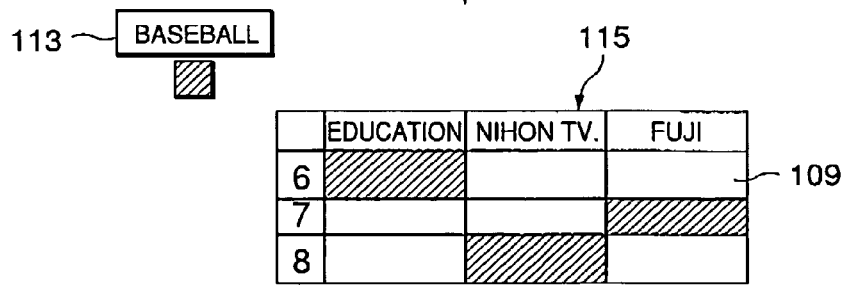
FIG. 9C is a diagram showing the construction of a program table obtained by culling the parts not needed to be displayed as to the program table shown in FIG. 9B.

If the user selects and designate the corresponding attribute "baseball" from the retrieval attribute display column 113, this attribute is input through the attribute input means 2 and the program information retrieval/classification means 3 retrieves the program corresponding to the attribute as shown in FIG. 9B to make a program table 114 in which, for instance, the corresponding programs are displayed separately by hatch marks. In this case, from baseball through the program information retrieval/classification means 3, a program relative to the baseball is retrieved from the program information storage means 1 and the program is hatched. This program table 114 is sent to the program table omission means 5. The program table omission means 5 culls out the parts that are not needed to be displayed in the program table 114, that is programs other than the retrieved program relative to "baseball", and makes a program table 115, without the omitted material as shown in FIG. 9C, to send it to the program table display means 4. In this case, the program table omission means 5 culls out the other, non-relative part from the program table to leave only the part of the time and channel displays including the hatched program (in general, the program table is colored, or hatched in the case where there is no color in the display, and all of the selected programs are displayed but the two axes not colored or hatched are found by the program table omission means not to display selected program). In this manner, the above reduced size program table 115 is displayed on the program table display means 4. In this manner, the audience can look at a program table in which only the program he likes to know about is displayed in a manner that has been condensed from the enormous amount of program information that is available. Particularly in the case of the program table display means 4 having a small area for displaying the program table, by scrolling or the like, the table can be limited to showing only a portion at a time. By the method of this embodiment, the non-relative parts are omitted as much as possible and viewing a small display area becomes possible.

3rd Embodiment

Figure 10:
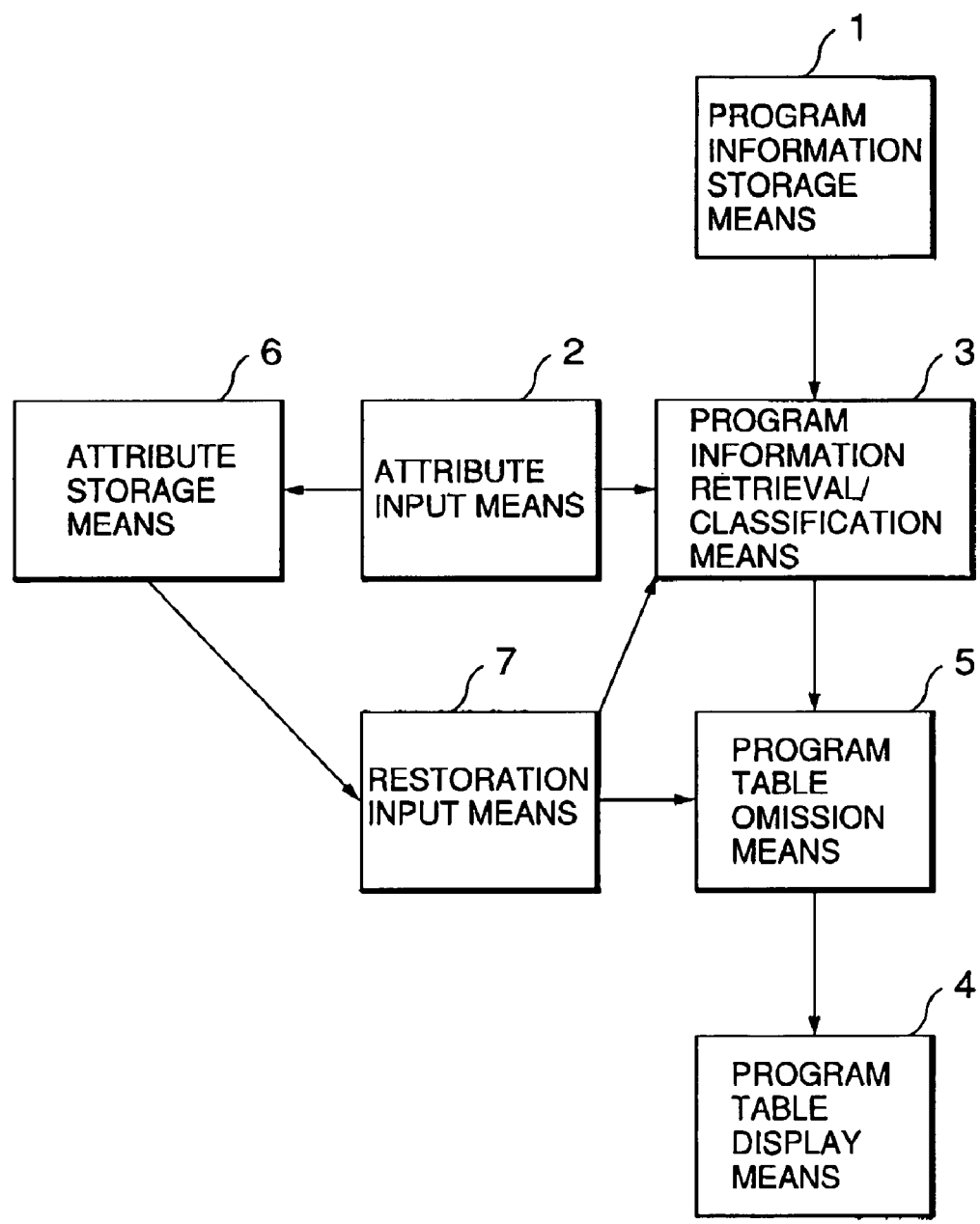
FIG. 10 is a block diagram showing the construction of a third embodiment of a system for processing program information according to the present invention.

FIG. 10 is a block diagram showing the construction of the third embodiment of a system for processing program information according to the present invention. In FIG. 10, the reference 6 denotes attribute storage means for storing attribute information input through attribute input means 2, and restoration input means 7 for inputting a restoration instruction for rejoining culled out program information. In this third embodiment, the remaining structure of the system for processing program information is the same as the above second embodiment and includes program information storage means 1, attribute input means 2, program information retrieval/classification means 3, program table display means 4, and program table omission means 5. The attribute storage means 6 is adapted to receive data from the attribute input means 2 and to send stored data to the restoration input means 7. The restoration input means 7 is adapted to receive data from the attribute storage means 6 and to send the restored input data to the program information retrieval/classification means 3 and the program table omission means 5.

Figure 11A:
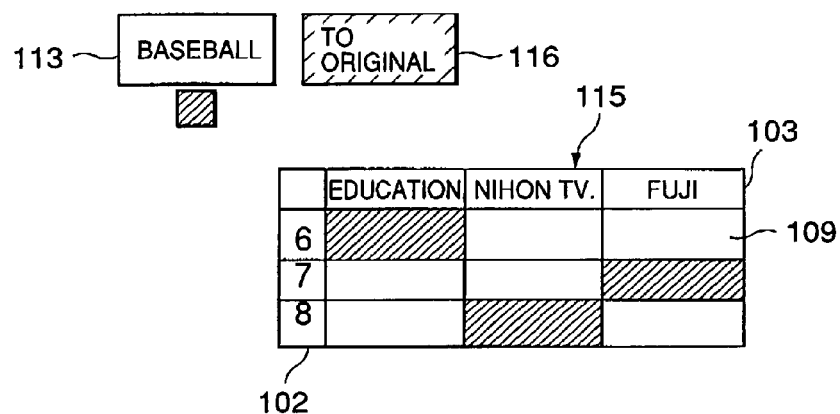
FIG. 11A is a diagram showing the same program table, for the third embodiment, as the program table obtained by culling as shown above relative to the second embodiment.

The operation of the system for processing program information according to the third embodiment having this structure will be described. FIGS. 11A and B are diagrams illustrating the display operation of the program table in the system for processing program information according to the third embodiment. In this third embodiment, the program table shown in FIG. 11A is the same as the reduced size program table 115 shown in FIG. 9C in relation to the above second embodiment. At the position (the upper position of the program table) adjacent to the reduced size program table 115 in this display picture, there is provided a restoration instruction column 116 abreast with a retrieval attribute display column 113 for retrieving a program that had previously been culled out.

Figure 11B:
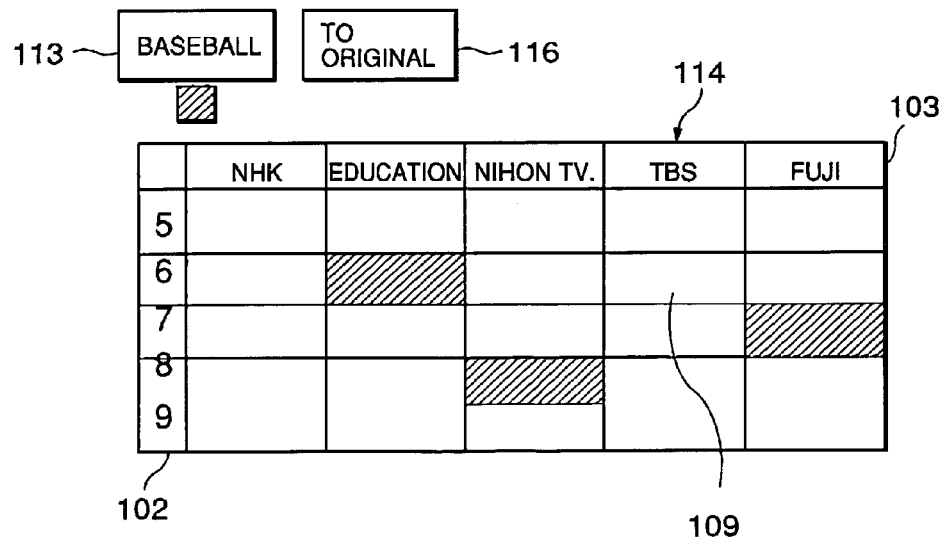
FIG. 11B is a diagram showing the program table displaying the corresponding program separately by color after restoring the above culled program table to the original program table.

After displaying the above referenced size program table 115, if the audience commands a restoration from the restoration instruction column 116, this command data are considered instructed and input through the restoration input means 7. The restoration input means 7 reads out a restoration attribute from the attribute storage means 6, sends it to the program information retrieval/classification means 3 and gives an operation instruction to this program information retrieval/classification means 3. In this manner, as shown in FIG. 11B, the program information retrieval/classification means 3 retrieves a program corresponding to the previously instructed retrieval attribute to make a program table 114 in which the corresponding program is displayed separately by hatched lines. The program table omission means 5 is caused to stop operating by an instruction signal from the restoration input means 7. Although this program table 114 is sent to the program table omission means 5, because the program table omission means 5 is in a condition of stopping the operation, the program table 114 is sent as it is to the program table display means 4 to display it. In this manner, the audience can look the program table 114 restored as shown in FIG. 11B. It is effective if the audience wishes to look at the omitted part in the program table having after it has been once omitted.

For instance, as a concrete operation successive from the second embodiment to the third embodiment, if "baseball" is selected in the program table 101 in FIG. 9A, the programs relative to the baseball are highlighted in the program table 114 (FIG. 9B). This processing operation is performed by retrieving the programs relative to the baseball from the program information storage means 1 through the program information retrieval/classification means 3 to highlight the programs. Only the parts of the times and channels including the highlighted programs are left. Next, the other parts having no relation to baseball are culled from the program table to obtain the reduced size program table 115 as shown in FIG. 9C. This processing finds two axes not being highlighted by the program table omission means 5 from the program table (the ordinary program table at this time) displayed by merely partially being highlighted not to display the part. After this, if the button 116 of "to original" is operated in FIG. 11A, the restored program table 114 as shown in FIG. 113B is displayed.

4th Embodiment

Figure 12:
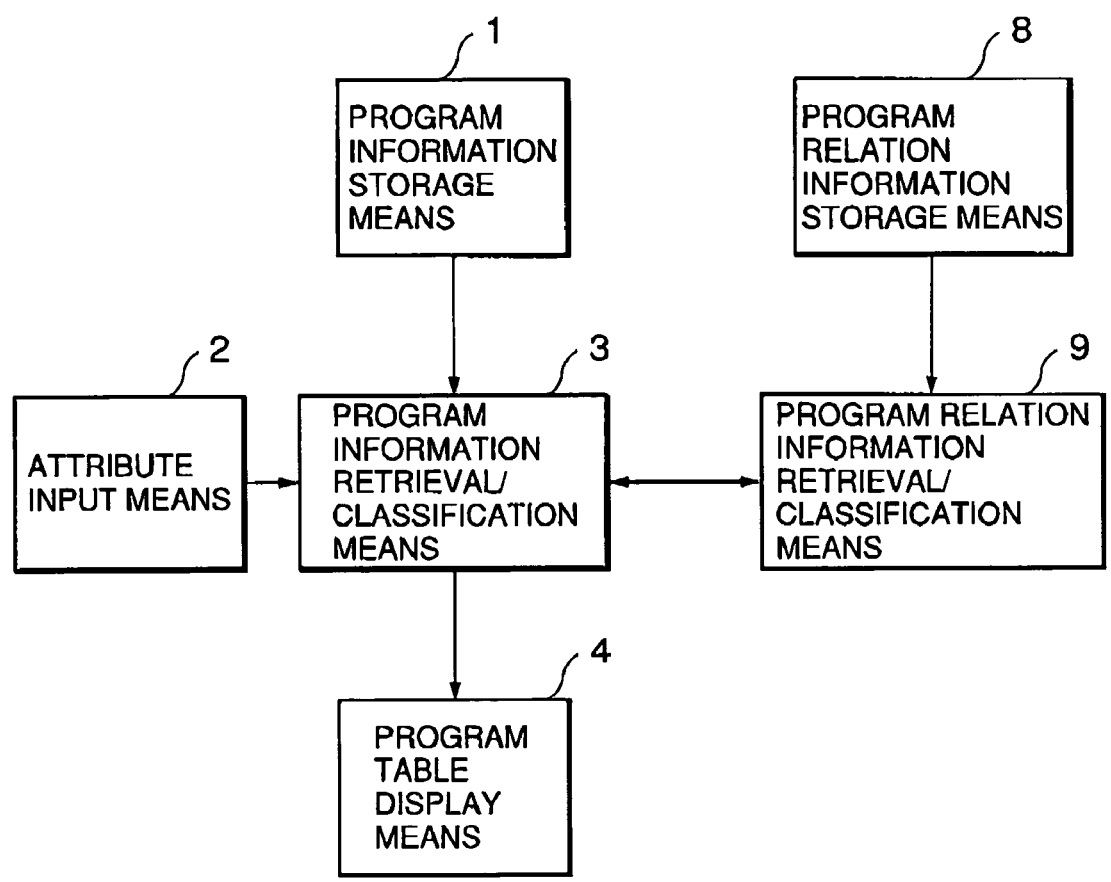
FIG. 12 is a block diagram showing the construction of a fourth embodiment of a system for processing program information according to the present invention.

FIG. 12 is a block diagram showing the structure of the fourth embodiment of a system for processing program information according to the present invention. In FIG. 12, the reference 8 denotes program relation information storage means for storing information relative to the program, and 9 indicates program relation information retrieval/classification means for retrieving and classifying program relation information. In this fourth embodiment, the other structure of the system for processing program information is the same as the above first embodiment and includes program information storage means 1, attribute input means 2, program information retrieval/classification means 3, and program table display means 4. The program relation information storage means 8 stores information relative to respective program information items, for instance, a performer, a producer, a sponsor, an explanation home page address of the program, CDs, books, and so on. This program relation information storage means 8 is connected to the program relation information retrieval/classification means 9 and is adapted to send data stored therein to the program relation information retrieval/classification means 9. The program relation information retrieval/classification means is adapted to retrieve and classify the above program relation information and send the retrieval/classification result to the program information retrieval/classification means 3.

Figure 13A:
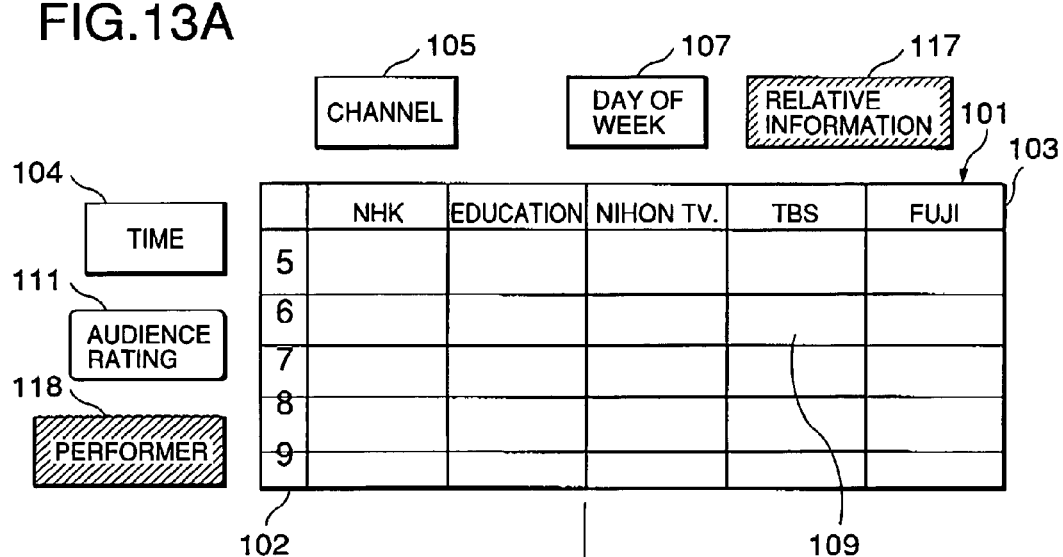
FIG. 13A is a diagram showing the construction of a program table in the ordinary form for use in the above fourth embodiment.

The operation of the system for processing program information according to the fourth embodiment having this structure will be described. FIGS. 13A and B are diagrams for illustrating the display operation of the program table in a system for processing program information according to the fourth embodiment. In this fourth embodiment, at first, the basic program table 101 is two-dimensionally displayed on the program table display means 4 as shown in FIG. 13A. At the positions adjacent to the program table 101 in the display picture, there are provided display columns for the two-axes' attributes determining the structure of the program table displayed at present. There is shown present attribute display columns 104 and 105 and a display column for other two-axes' attributes for changing the structure of the program table, that is, to change attribute display column 107. Another attribute display column 111, for changing the structure of the program table is provided. In the example of FIG. 13A, "time" is displayed in the present attribute display column 104 and "CH", representing the channels is displayed in the present attribute display column 105. In the changed attribute display column 107, "day of week" as another piece of attribute information capable of adding to the two-axes attributes is displayed. In the other attribute display column 111, an operation button display of "audience rating", showing the attribute to be investigated is identified. Furthermore, at the position adjacent to the program table 101 in this display picture, there are provided a relative information display column 117 and a performer display column 118 for displaying or designating a performer as one item of the relative information.

Figure 13B:
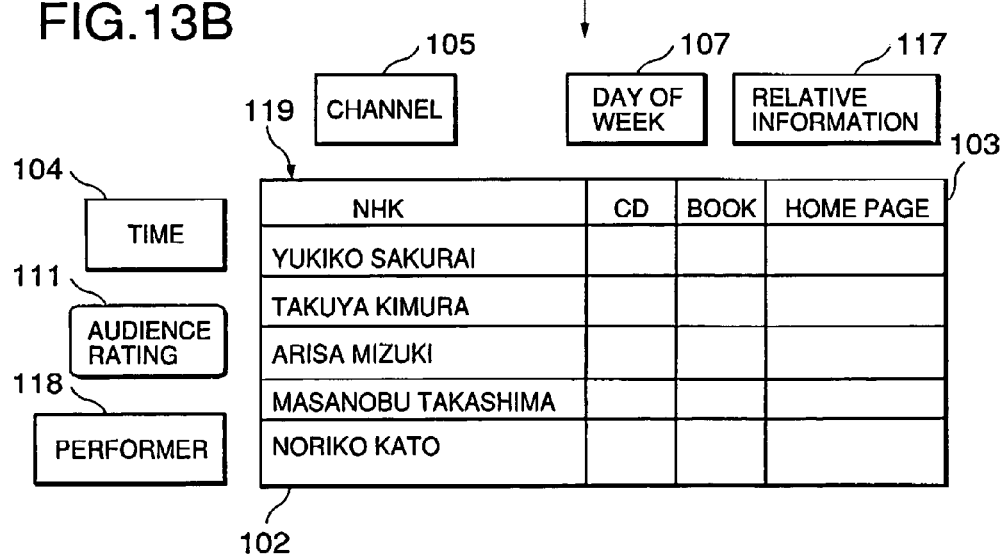
FIG. 13B is a diagram showing a program table in a changed form having two axes of "performer" and "relative information" for use in the above fourth embodiment.

If the audience inputs the attributes of "performer" and "relative information" through the attribute input means 2 to select "performer" for the attribute of the vertical axis of the program table 101 and "relative information" for the attribute of the horizontal axis, the program information retrieval/classification means 3 makes a demand to the program relation information retrieval/classification means 9 for data to display what has been asked for. With this, the program relation information retrieval/classification means 9 makes a demand for data to the program relation information storage means 8 to receive a delivery of data. The program relation information retrieval/classification means 9 retrieves and classifies relative information in program relation information to send it to the program information retrieval/classification means 3. By this manner, a relation program table 119 in which sets of performers (Yukiko Sakurai, Takuya Kimura, Arisa Mizuki, . . . are listed up on the vertical axis 102) and relative information (CD, book and home page) are listed up on the horizontal axis 103. Thus a two-dimensional display, in the form of a table as shown in FIG. 13B, is made. This relation program table 119 is sent to the program table display means 4 to be displayed. In this manner, the audience can see information relative to the program as shown in FIG. 13B and the user can obtain not merely information directly relative to the program, but information indirectly relative to it. There is the case that the program relation information retrieval/classification means 9 and the program relation information storage means 8 are locally disposed and the case that they are remotely disposed.

In this manner, not merely information directly relative to the program but information indirectly relative to it can be disclosed to the user. For instance, in the case of the program relation information storage means 8 of a recording medium such as a CD-ROM and a DVD (digital video disk), in accordance with the program selection in the program table, it is possible that an image or a sound from the recording medium is played or information, such as a text used in the program, a dictionary and an encyclopedia is displayed. If the program relation information storage means 8 is a home page or the like on a network, a page relative to the program can be retrieved by the program relation information retrieval/classification means 9 and displayed. Although the selection of an attribute has been described here, the case of adding a certain attribute to another attribute can be considered. For instance, combination of the attribute of audience rating and the attribute of type (drama) is shown in the following two tables.

TABLE 1

|  | Attribute 1 | | |
| --- | --- | --- | --- |
| Attributes 2 and 3 | Attribute value 11, | Attribute value 12, | Attribute value 13 |
| Attribute value 21 and Attribute 31 | | | |
| Attribute value 22 and Attribute 31 | | | |
| Attribute value 23 and Attribute 31 | | | |

TABLE 2

| Audience rating and Dramas | Channel | | |
|---|---|---|---|
| | NHK, | NHK Education, | Nihon Television |
| Dramas not less than 30% | | | |
| Dramas not less than 20% | | | |
| Dramas not less than 10% | | | |

5th Embodiment

Figure 14:
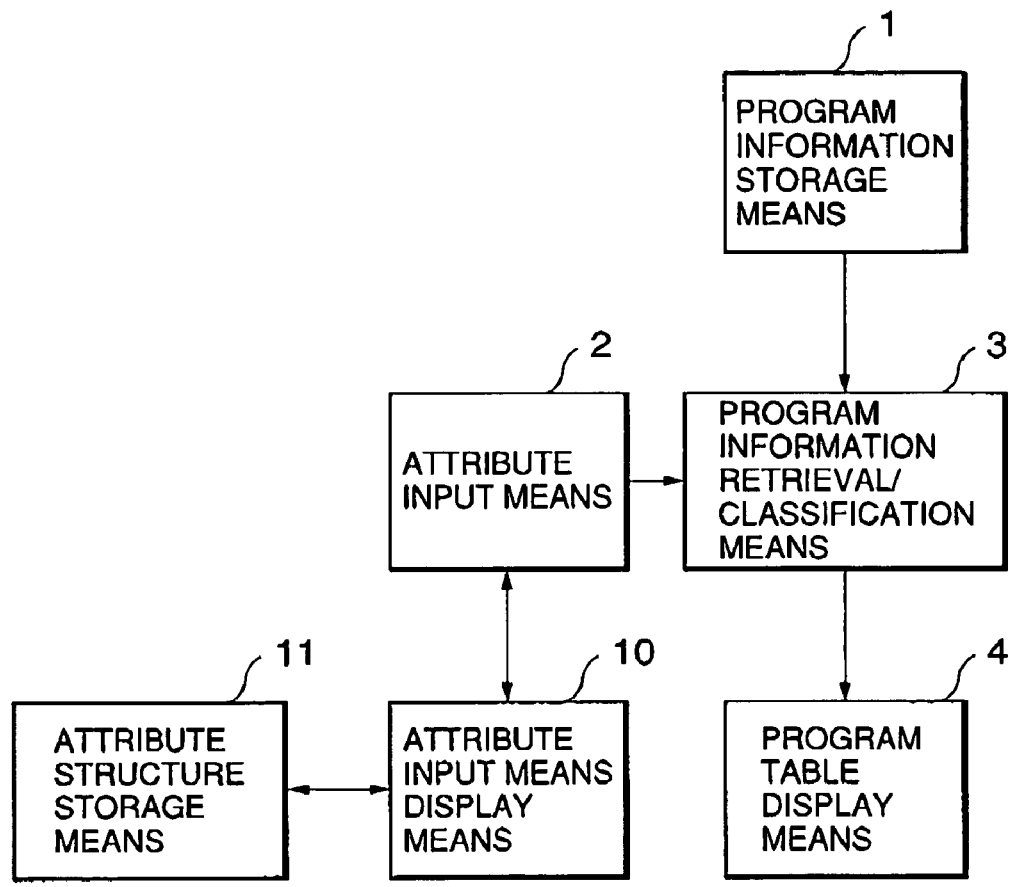
FIG. 14 is a block diagram showing the construction of a fifth embodiment of a system for processing program information according to the present invention.

FIG. 14 is a block diagram showing the structure of the fifth embodiment of a system for processing program information according to the present invention. In FIG. 14, the reference 10 denotes attribute input means display means for displaying information input to the attribute input means, and 11 shows attribute structure storage means for storing data relative to the structure of the attribute input through the attribute input means. In this fifth embodiment, the other structure of the system for processing program information is the same as the above first embodiment and includes program information storage means 1, attribute input means 2, program information retrieval/classification means 3, and program table display means 4. The attribute input means display means 10 is connected to the attribute input means 2 and is adapted to display the input means data and is adapted to send data to the attribute structure storage means 11. The attribute structure storage means 11 is adapted to send data to and receive data from the attribute input means display means 10.

Figure 15A:
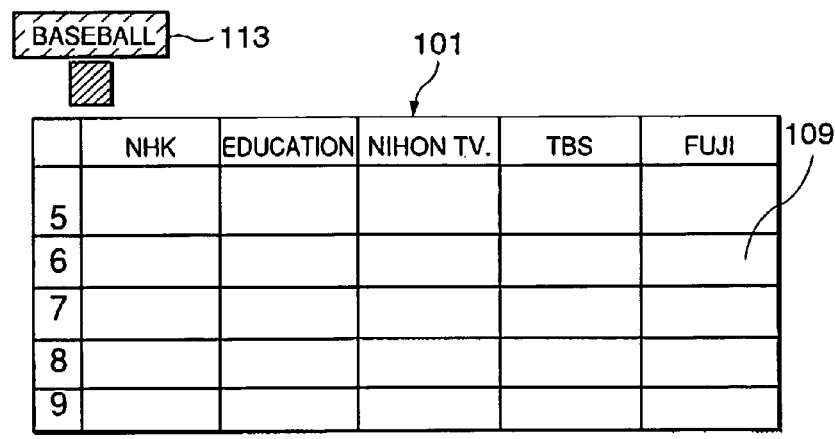
FIG. 15A is a diagram showing the construction of a program table in the ordinary form for use in the above fifth embodiment.

The operation of the system for processing program information according to the fifth embodiment having this construction will be described. FIGS. 15A and B are diagrams illustrating the display operation of the program table in the system for processing program information according to the fifth embodiment. In this fifth embodiment, at first, the basic program table 101 is two-dimensionally displayed on the program table display means 4 as shown in FIG. 15A. At the position (the upper position of the program table) adjacent to the program table 101 in the display picture, there is provided a retrieval attribute display column 113 for retrieving a program. In this retrieval attribute display column 113, "baseball" relative to the type is displayed as the attribute determining what program to retrieve.

Figure 15B:
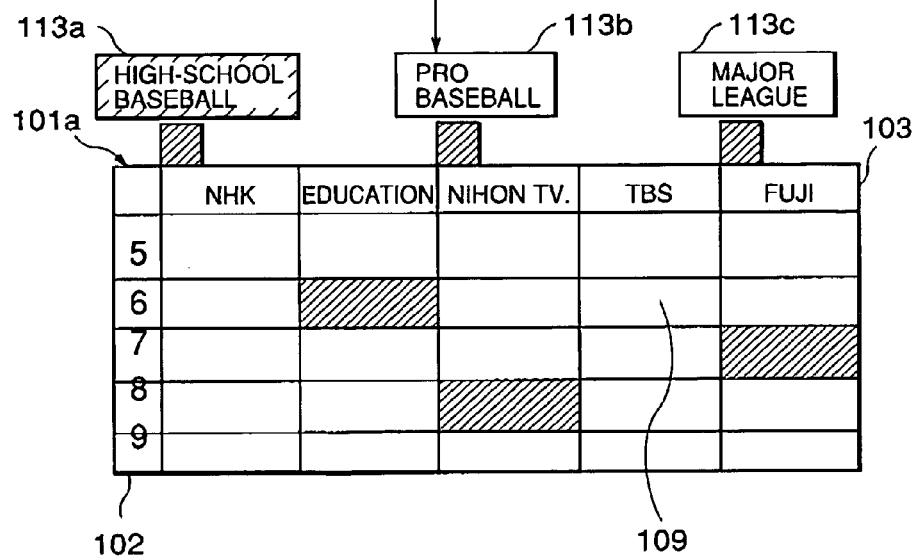
FIG. 15B is a diagram showing the construction of a program table displaying separately, by color, the corresponding program obtained by selecting a sub-type.

If the audience selects and designates the corresponding attribute "baseball" from the retrieval attribute display column 113, "baseball" is considered input through the attribute input means 2, and the attribute input means display means 10 picks out the part of "high-school baseball, pro baseball, major leagues" corresponding to "baseball" from the data of "baseball: high-school baseball, pro baseball, major leagues" stored in the attribute structure storage means 11 to display buttons (113a, 113b and 113c, respectively) of those attributes. By this manner, the attributes relative to the subtypes under "baseball" are given as candidates and the attributes relative to the subtypes are displayed. If the audience further selects any (for instance, the high-school baseball 113a) of the subtypes, the program information retrieval/classification means 3 retrieves program(s) corresponding to the attribute as shown in FIG. 15B and, for instance, makes a program table 101a in which the corresponding program is identified separately by color highlighting (in this case, a subtype program relative to high-school baseball is retrieved from the overall program type, high-school baseball, through the program information retrieval/classification means 3, and the program is highlighted). This program table 101a is sent to the program table display means 4 to be displayed thereon. By this manner, it becomes possible to perform program retrieval if a more specialized type to make and display the program table. It becomes possible to input not only in relation to the statically fixed attribute but also in relation to another relative attribute.

In this manner, although the subtype is proposed to the user as the attribute and it becomes possible to focus the program, by displaying the attribute relative to the program, for instance, performers, rebroadcast, teletext, manager comment, time, channel, title, and key words, such as O-157, AIDS and earthquake: as the attribute value relative to the program, as the attribute input 2 to be proposed to the user, a new manner of showing the program table to the user can be proposed by combining those attributes.

6th Embodiment

Figure 16:
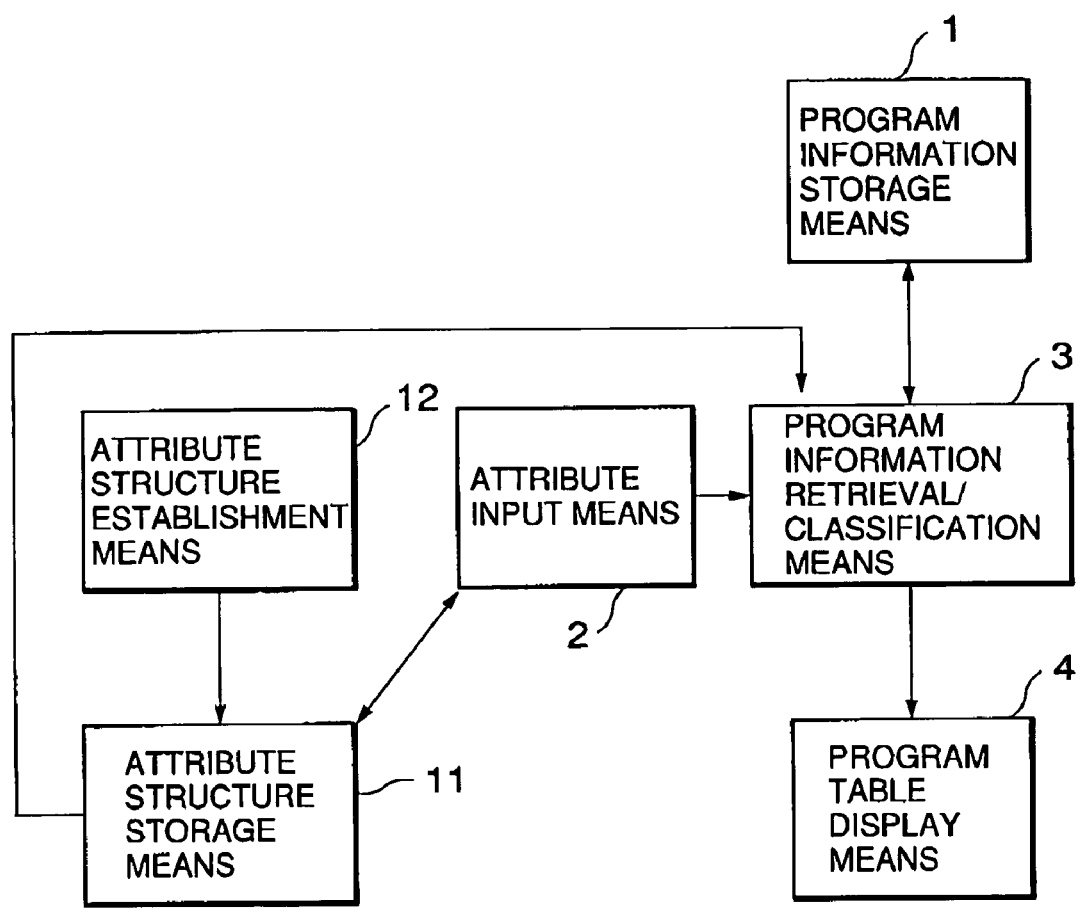
FIG. 16 is a block diagram showing the construction of a sixth embodiment of a system for processing program information according to the present invention.

FIG. 16 is a block diagram showing the structure of the sixth embodiment of a system for processing program information according to the present invention. In FIG. 16, the reference 11 denotes attribute structure storage means for storing data relative to the structure of the attribute input through attribute input means, and 12 indicates attribute structure establishment means for establishing the attribute structure. In this sixth embodiment, the other structure of the system for processing program information is the same as the above first embodiment and includes program information storage means 1, attribute input means 2, program information retrieval/classification means 3, and program table display means 4. The attribute structure storage means 11 is adapted to send data to and receive data from the attribute input means 2. The attribute structure storage means 11 is connected to the attribute input means 2 so as to be able to store the instruction data of the attribute input through the attribute input means 2. The attribute structure storage means 11 is also connected to the attribute structure establishment means 12 to receive data from the attribute structure establishment means 12 and store them.

Figures 17A, 17B:
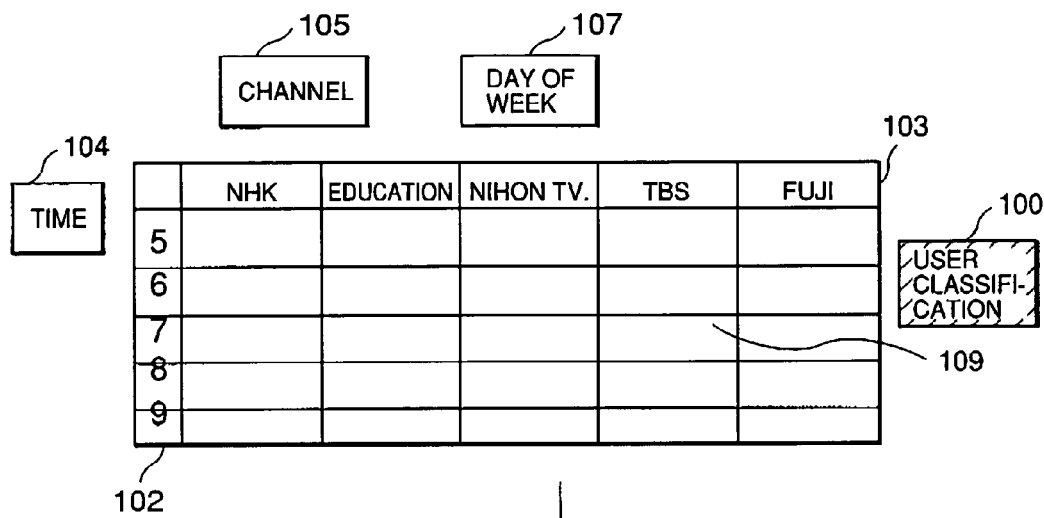
FIG. 17A is a diagram showing the construction of a program table in the ordinary form for use in the above sixth embodiment.
FIG. 17B is a diagram showing the construction of a program table displaying user classification items along the vertical axis and program titles along the horizontal axis for use in the above sixth embodiment.

The operation of the system for processing program information according to the sixth embodiment having this construction will be described. FIGS. 17A and B are diagrams illustrating the display operation of the program table in the system for processing program information according to the sixth embodiment. Here, the classification function of the program information retrieval/classification means 3 will be described. Through the attribute structure input means 12 in FIG. 16, the attribute structure is input by the user. As the attribute structure, for instance, there are "computer: software, CG, personal computer, . . . " and so on. This means that, in the user definition type of "computer", each key word of "software, CG, personal computer, . . . " appears. Then, the program information retrieval/classification means 3 looks for matches with program information stored in the program information storage means 1 according to this attribute structure, for instances the letter line of data as shown in FIG. 2, and classifies each program to add classification information to each program, for instance, to add classification information such as "computer" in the case of good matching with the key word of "software, CG, personal computer, . . . " or the like. The above key word for the user classification of "software, CG, personal computer, . . . ", that is, the attribute structure, is input through the attribute structure establishment means 12 by designating "computer" when the audience is trying to find (or look for from the program table) a program relative to a computer. This attribute structure is stored in the attribute structure storage means 11. An attribute structure that has not been registered by the audience himself can also be input through the attribute structure establishment means 12. In the example of the above, computer as the other attribute structures to be input, for instance, there are terms such as application and protocol.

When program information is being classified, upon the display operation of the program table in this sixth embodiment, at first, the basic program table 101 is two-dimensionally displayed on the program table display means 4 as shown in FIG. 17A. At the position adjacent to the program table 101 in the display picture, there are provided display columns for the two-axes attributes determining the structure of the program table displayed at present, that is, the present attribute display columns 104 and 105, and a display column for other two-axes attributes for changing the structure of the program table, that is, to change the attribute display column 107. There is also provided another attribute display column 111 for changing the structure of the program table. In the example of FIG. 17A, "time", representing the time slots is displayed in the present attribute display column 104 and "CH", representing the channel, is displayed in the present attribute display column 105. In the change attribute display column 107, "day of week", as another piece of attribute information capable of being one of the two-axes attributes, is displayed. In the other attribute display column 111, an operation button 100 of "user classification", representing an attribute that the audience classifies and establishes based on his taste, interest or requirement, is displayed.

If the audience selects and designates the corresponding attribute "user classification" from the attribute display column 111, "user classification" is input through the attribute input means 2 and, for instance, the part of "software, CG, personal computer, . . . ." is obtained from "computer: software, CG, personal computer, . . . " stored in the attribute structure storage means 11, and the input to the program information retrieval/classification means 3 is performed by using those as the key word(s). The program information retrieval/classification means 3 performs the retrieval on the basis of the user attribute previously established to the program information storage means 1, and classifies information received from the program information storage means 1 to make the user classification program table 120 as shown in FIG. 17B. In this user classification program table 120, various kinds of user classification items such as "computer", "diving", "my taste", . . . , are displayed along the vertical axis 102, and various kinds of program titles are displayed along the horizontal axis 103 in a predetermined order such as "1", "2", "3", . . . . The user classification program table 120 is sent to the program table display means 4 to be displayed. In this manner, the audience can obtain a program table meeting the classification based on his taste or the like, and easily perform a program selection.

As another operation, it is possible that the program information retrieval/classification means 3 has previously classified program information stored in the program information storage means 1 from "computer: software, CG, personal computer" stored in the attribute structure storage means 11, so that the classification item is "computer" if the key word of "software, CG, personal computer" is included, and, if "user classification" is selected through the attribute input means 2, the subtypes of "computer", that is "computer: software, CG, personal computer" are taken out of the attribute structure storage means 11, the retrieval is performed from the program information storage means 1 through the program information retrieval/classification means 3 by using this key word, and the user classification program table 120 is made by classifying the corresponding programs to be displayed on the program table display means 4. In this manner, because the program table is displayed in accordance with a user classification method that has previously been registered, the program table fitting the audience can be made by selecting a user definition attribute.

As described above, in this embodiment, because the user definition attribute structure can be established, the manner of viewing program information by this attribute defined by the user can be expanded. Although the type of the program is defined in this example, it is also possible that, for instance, program titles to be classified are directly defined such as "child: Ponkikkies, Tales of old Japan", or they are defined in levels such as "child: animation, educational program", . . . (the first level)

"animation: Doraemon, Sazae san", "educational program: saga drama, English conversation", . . . (the second level)

and they are actually used as

"child: Draemon, Sazae san, saga drama, English conversation".

In this manner, in addition to the conventional manner of viewing the program table, viewing from the point of view of what the user likes to look at is possible.

7th Embodiment

Figure 18:
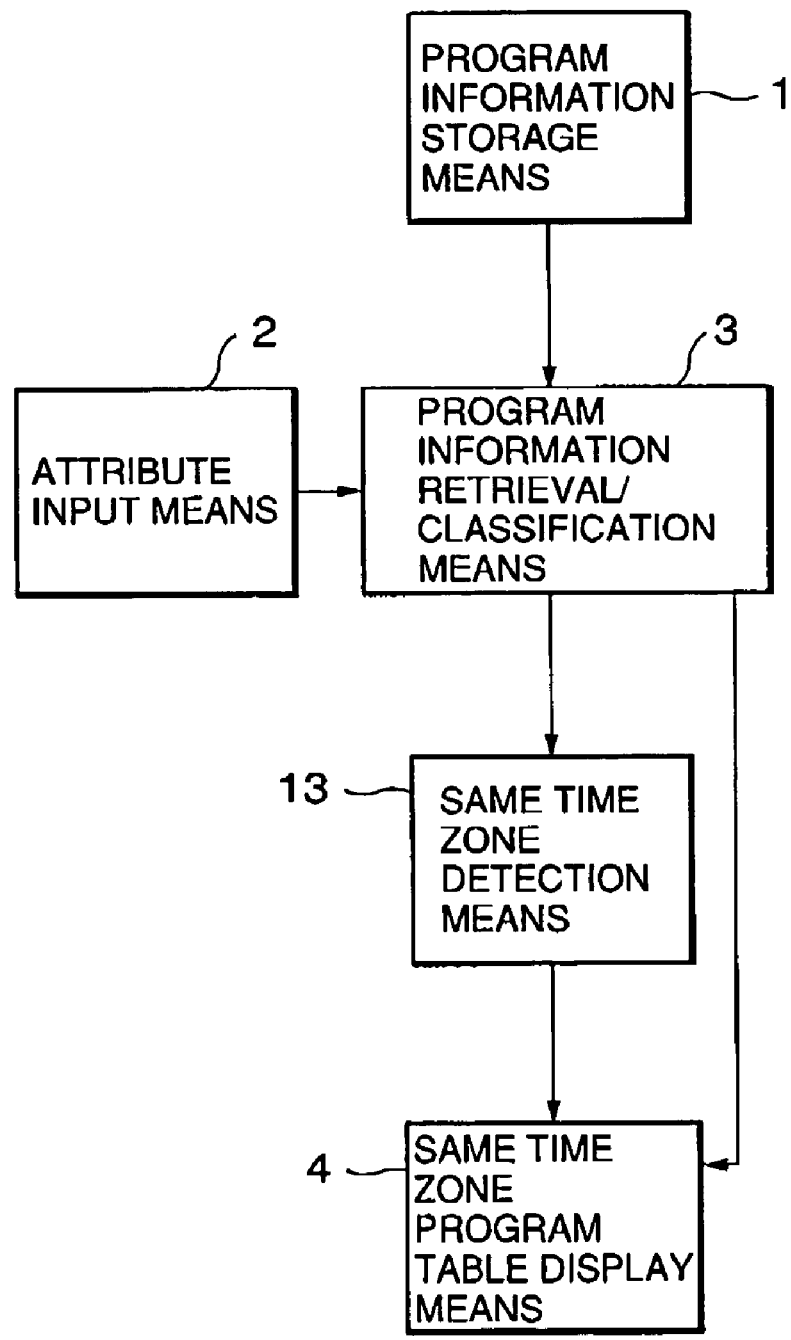
FIG. 18 is a block diagram showing the construction of a seventh embodiment of a system for processing program information according to the present invention.

FIG. 18 is a block diagram showing the structure of the seventh embodiment of a system for processing program information according to the present invention. In FIG. 18, the reference 13 denotes a same time zone detection means for detecting programs in the same time zone from program information. In this seventh embodiment, the remaining structure of the system for processing program information is the same as the above described first embodiment and includes program information storage means 1, attribute input means 2, program information retrieval/classification means 3, and program table display means 4. The same time zone detection means 13 is adapted detect the programs in the same time zone, based on program information sent from the program information retrieval/classification means 3, and send them to the program table display means 4.

Figure 19:
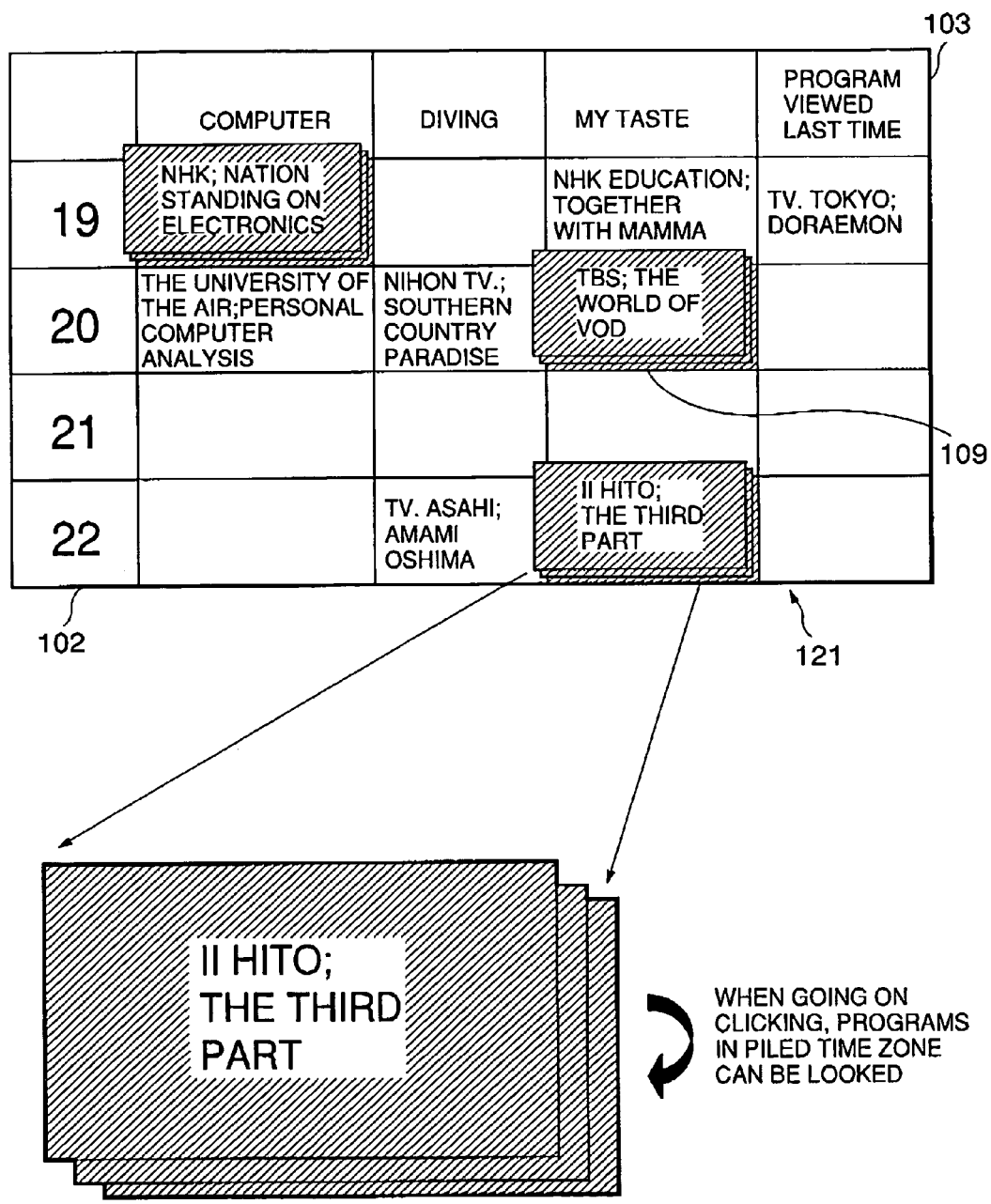
FIG. 19 is a diagram showing the construction of the same time zone program table displaying the time slots along the vertical axis and the user classification items along the horizontal axis for use in the above seventh embodiment.

The operation of the system for processing program information according to the seventh embodiment having this structure will be described. FIG. 19 is a diagram illustrating the display operation of the program table in the system for processing program information according to the seventh embodiment. In this seventh embodiment, the table shown in FIG. 19 is a same time zone program table 121. In this same time zone program table 121, time slots are arranged along the vertical axis 102 and various user classification items such as "computer", "diving", "my taste", are displayed along the horizontal axis 103. In the example of FIG. 19, prime time is selected as the time slot. When there are plural programs in a predetermined time zone as that are consistent with a certain user classification item as a result of the retrieval and classification, those plural programs are displayed in an overlapping condition on the corresponding program information display columns 109. In FIG. 19, the "computer" item in the 19 o'clock zone, the "my taste" item in the 22 o'clock zone and so on correspond to the overlap displays of the above referenced pieces of program information.

In this display condition, if a program displayed in an overlapping condition is selected (here, for instance, "Ii Hito" is selected), "Ii Hito" is input through the attribute input means 2 and this attribute becomes the attributes of the two axes of the table, "my taste" and "22 o'clock" and the corresponding programs are retrieved from the program information storage means 1 according to this attribute to display them in order. In this retrieval and display operation of program information, in the initial overlap program display, the same time zone detection means 13 detects the programs broadcast in the same time zone from the program information storage means 1 through the program information retrieval/classification means 3 to display the images overlapped by the detected number, on the program table display means 4. By clicking the program information display item 109 in which the plural pieces of program information are overlapped and displayed, by the data input means, the overlapped programs can be looked at in order as the pages are turned. By this manner, information of the programs in the same time zone can be seen without expanding the display area.

8th Embodiment

Figure 20:
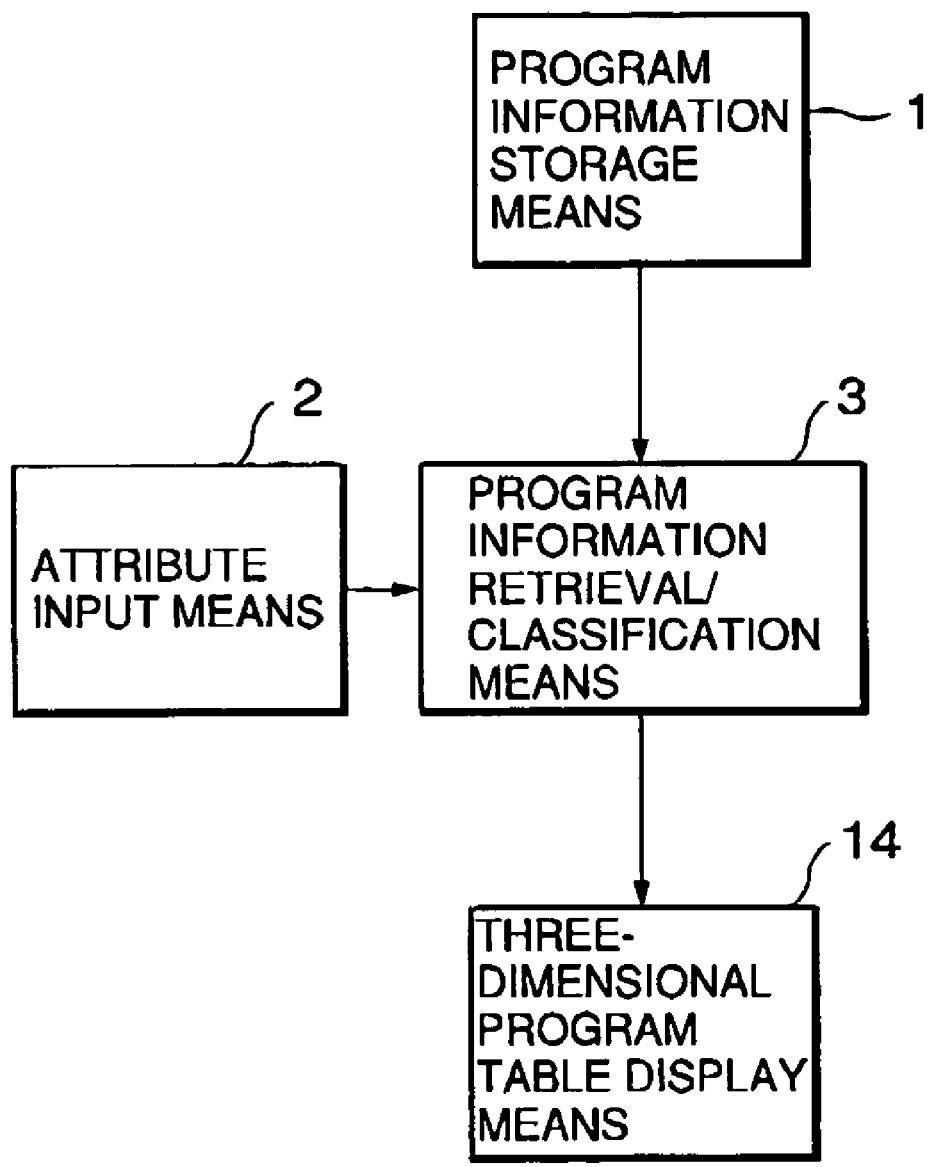
FIG. 20 is a block diagram showing the construction of an eighth embodiment of a system for processing program information according to the present invention.

FIG. 20 is a block diagram showing the structure of the eighth embodiment of a system for processing program information according to the present invention. In FIG. 20, the reference 14 denotes three-dimensional program table display means for displaying the program table in three dimensions. This three-dimensional program table display means 14 is used instead of the program table display means 4 and can display a predetermined piece of information in a three-dimensional structure. In this eighth embodiment, the remaining structure of the system for processing program information is the same as the above first embodiment and includes program information storage means 1, attribute input means 2, and program information retrieval/classification means 3.

Figure 21A:
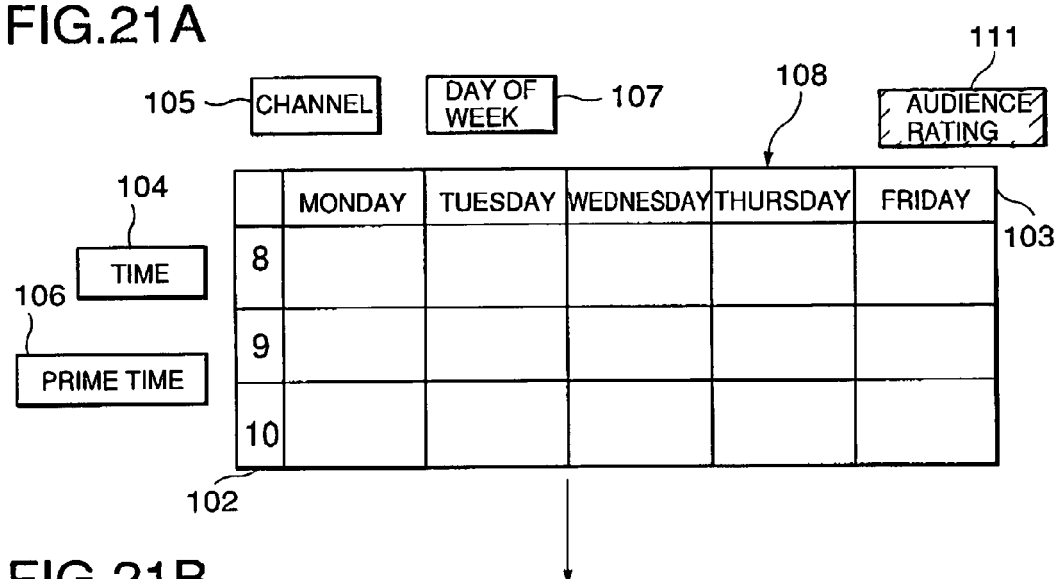
FIG. 21A is a diagram showing the construction of a program table in which only prime time slots are arranged along the vertical axis and the days of week are arranged along the horizontal axis, for use in the above eighth embodiment.

The operation of the system for processing program information according to the eighth embodiment having this structure will be described. FIGS. 21A and B are diagrams illustrating the display operation of the program table in the system for processing program information according to the eighth embodiment. In this eighth embodiment, as shown in FIG. 21A, the program table is structured by day of week in relation to the prime time (8 o'clock to 10 o'clock. That is, the program table 108 is made up of only prime time (8 o'clock to 10 o'clock) slots arranged along the vertical axis 102 and the days of week (Monday, Tuesday, Wednesday, . . . ) arranged along the horizontal axis 103. This; is displayed on the three-dimensional program table display means 14. "Time", representing the time slots is positioned in the present attribute display 104 near the program table 108 and "CH", representing the channels, is displayed in the present attribute display 105. "Prime time" is displayed in the change attribute display 106 and "day of week" is displayed in the change attribute display 107. "Audience rating", representing the attribute that is desired to be investigated is displayed in the other attribute display 111.

Figure 21B:
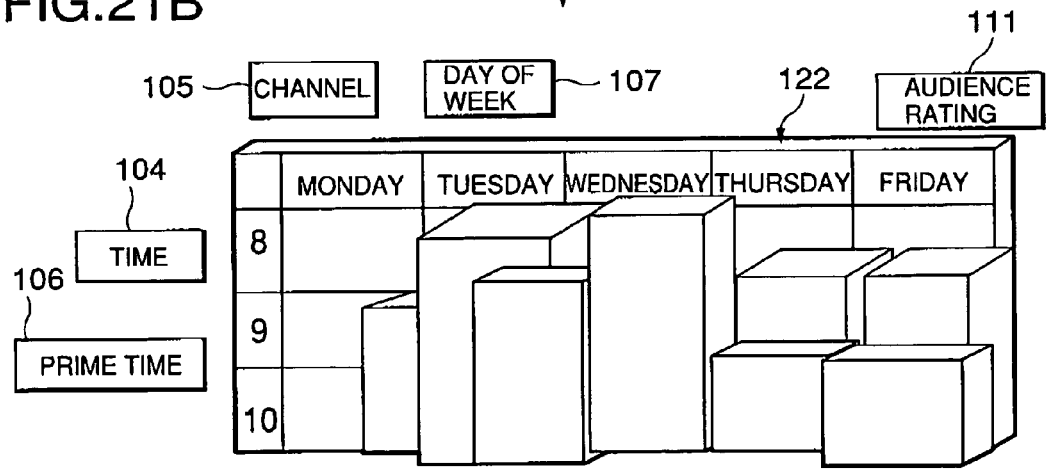
FIG. 21B is a diagram showing the construction of a three-dimensional program table displaying an audience rating corresponding to a program by designating the audience rating added to the program table of the above FIG. 21A.

If the audience selects the audience rating from the attribute display 111, those attribute instructions are input through the attribute input means and the program information retrieval/classification means 3 retrieves the program from the program information storage means 1 on the basis of the attribute. At this time, the program information retrieval/classification means 3 retrieves the corresponding audience rating from the program information storage means 1 as to each set of attributes of "Monday, Tuesday, Wednesday, Thursday, Friday" and "8 o'clock, 9 o'clock, 10 o'clock" of the attributes of the two axes of the program table. As shown in FIG. 21B, the program table 122 is displayed on as a three-dimensional program table display 14 with the three-dimensional form (height of a column) in accordance with the degree of the audience rating. In this manner, because information is three-dimensionally displayed, the retrieval content can be understood at a glance.

9th Embodiment

Figure 22:
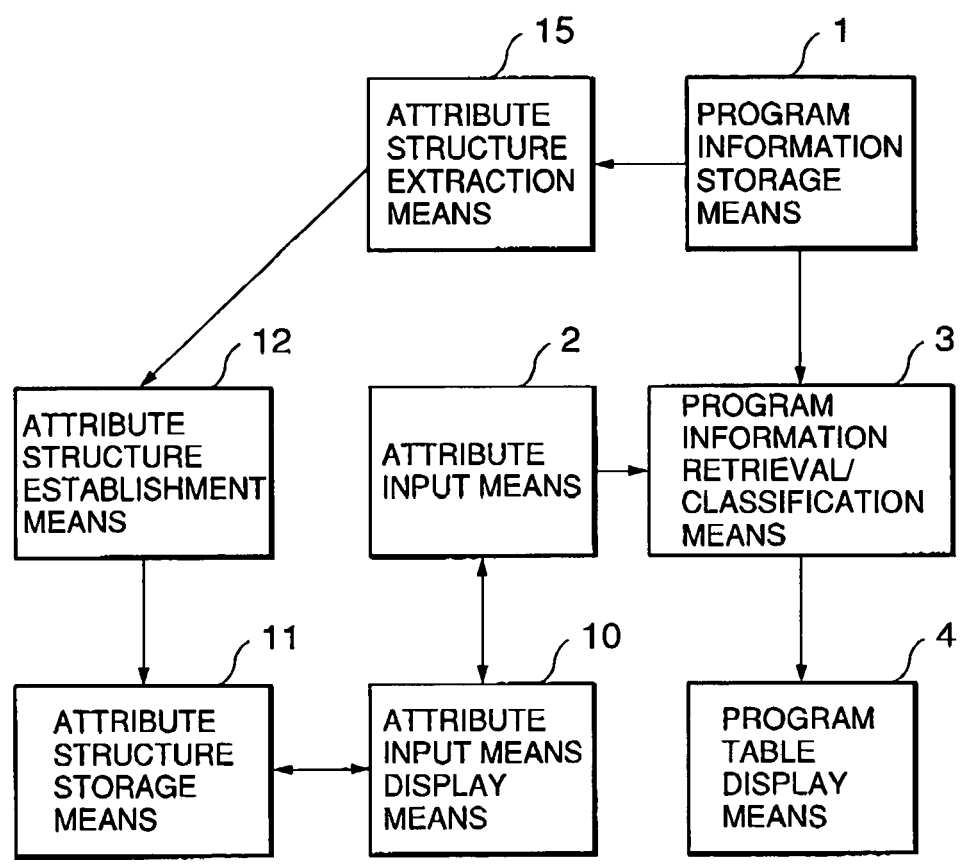
FIG. 22 is a block diagram showing the construction of a ninth embodiment of a system for processing program information according to the present invention.

FIG. 22 is a block diagram showing the construction of the ninth embodiment of a system for processing program information according to the present invention. In FIG. 22, the reference 10 denotes attribute input means display means for displaying information input to attribute input means, 11 identifies attribute structure storage means for storing data relative to the structure of the attribute input through the attribute input means, 12 indicates attribute structure establishment means for establishing the attribute structure, and 15 shows attribute structure extraction means for extracting the attribute structure from program information. In this ninth embodiment, the remaining structure of the system for processing program information is the same as the above first embodiment and includes program information storage means 1, attribute input means 2, program information retrieval/classification means 3, and program table display means 4. The attribute input means display means 10 is connected to the attribute input means 2 and is adapted to display the input means data and is adapted to send data to the attribute structure storage means 11. The attribute structure storage means 11 is adapted to send data to and receive data from the attribute input means display means 10. The attribute structure storage means 11 is also connected to the attribute structure establishment means 12 and is adapted to receive data identifying the established attribute structure from this attribute structure establishment means 12 and to store these data.

As for the operation of the system for processing program information according to the ninth embodiment having this structure, the display operation of the program table was described in relation to the above sixth embodiment, is performed. That is, because structure data relative to various attributes are stored in the attribute structure storage means 11, if the audience selects and inputs the user classification through the attribute input means 2 as shown in FIG. 17A, the program table in which the user classification was performed is displayed as shown in FIG. 17B. This embodiment is wherein the attribute structure for performing the above user classification is extracted from program information and established.

For instance, it is assumed that the following program information is stored in the program information storage means 1. Here, for simplicity, the form of "program title, program stamp" will be described. For instance, it is assumed that there are data of "pro baseball, Koshien Stadium, Hanshin vs. Kyojin" and "pro baseball news, Ya-Chu, Han-Kyo, Hiro-Yoko". "baseball" is included in all the program titles. In comparison with this, "Han", "Kyo" and "-" are commonly included in the program details. The attribute structure extraction means extracts the commonly included program titles and program details as the attribute structure of "baseball: Han, Kyo, -", and stores them in the attribute structure storage means 11 through the attribute structure establishment means.

In this manner, the attribute input means 2 can automatically be generated. For instance, the attribute structure such as "O-157: sprouts, patient, self-governing body" is extracted in program information, thereby, it becomes possible that the program of a topical event such as "O-157" to be presented to the user.

10th Embodiment

Figure 23:
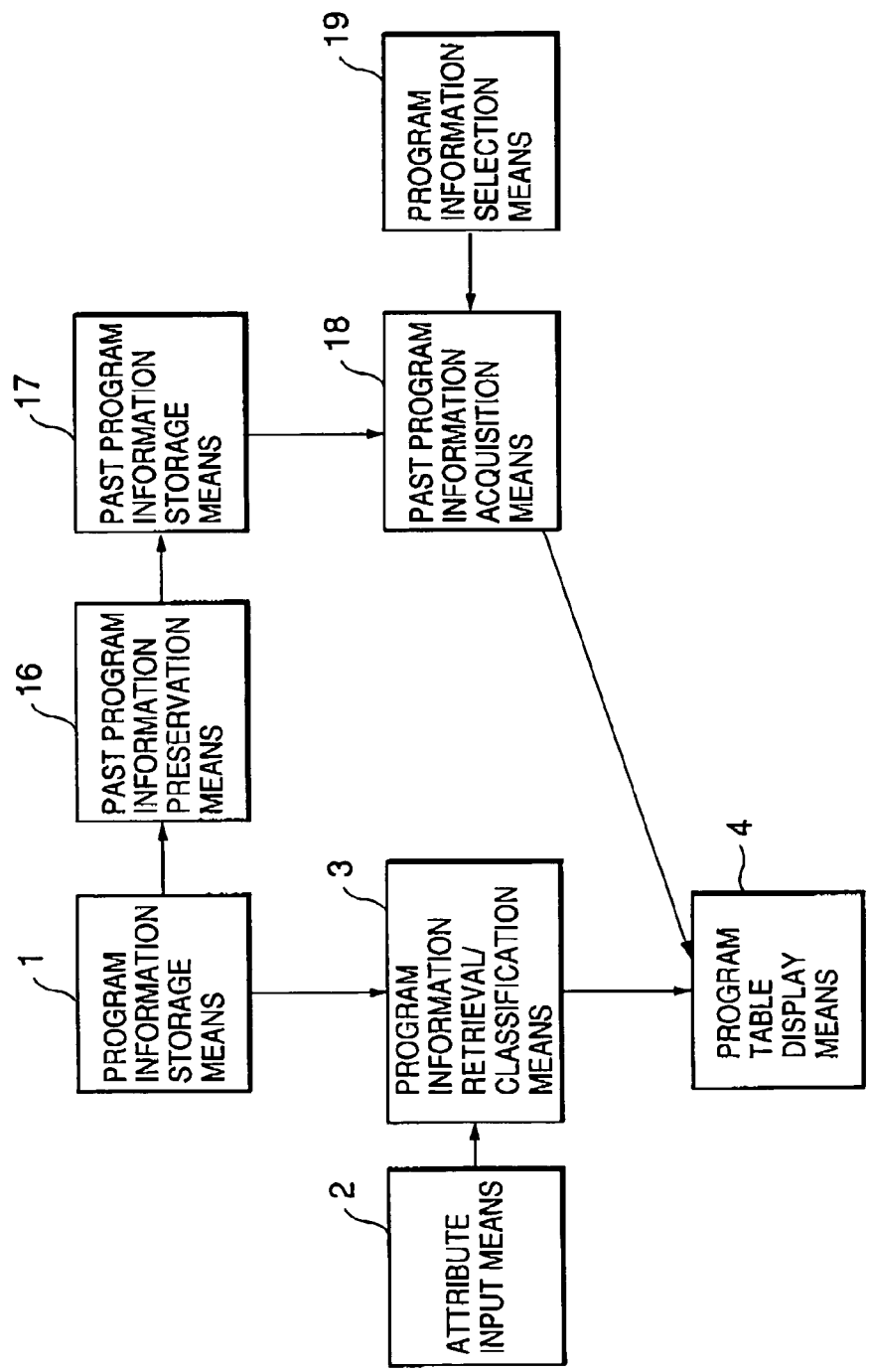
FIG. 23 is a block diagram showing the construction of a tenth embodiment of a system for processing program information according to the present invention.

FIG. 23 is a block diagram showing the construction of the tenth embodiment of a system for processing program information according to the present invention. In FIG. 23, the reference 16 denotes past program information preservation means, for preserving information of a program broadcast in the past, 17 represents past program information storage means for storing past program information, 18 represents past program information acquisition means for acquiring past program information, and 19 represents program information selection means for selecting program information. In this tenth embodiment, the remaining structure of the system for processing program information is the same as the above first embodiment and includes program information storage means 1, attribute input means 2, program information retrieval/classification means 3, and program table display means 4. The past program information preservation means 16 receives program information from the program information storage means 1 and retrieves information of the program that was broadcast in the past from that means in order to preserves it for a time. The past program information storage means 17 stores past program information that has been preserved in the past program information preservation means. The program information selection means 19 is for selecting and inputting information relative to the program broadcast in the past to the past program information acquisition means 18. The past program information acquisition means 18 acquires information relative to the program broadcast in the past from the past program information means 17 in accordance with the selection input of program information from the program information selection means 19 to send it to the program table display means 4.

Figure 24A:
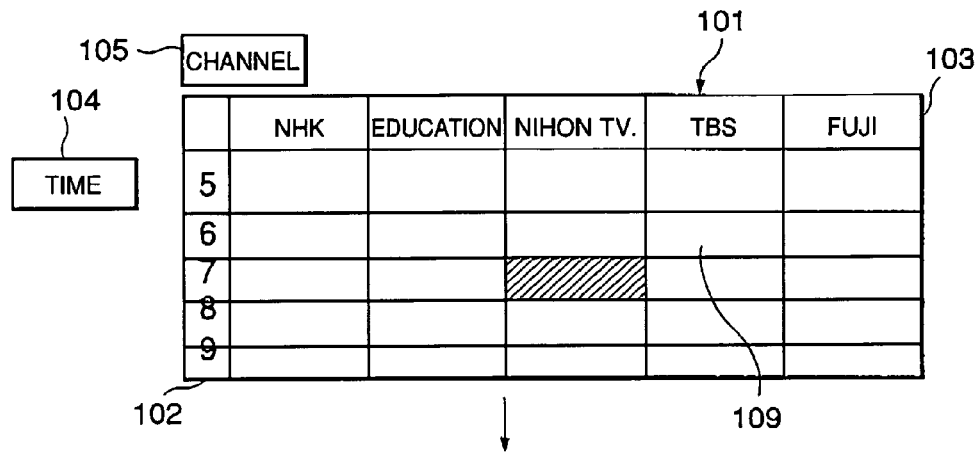
FIG. 24A is a diagram showing the construction of a program table in the ordinary form for use in the above tenth embodiment.

The operation of the system for processing program information according to the tenth embodiment having this structure will be described. FIGS. 24A, B and C are diagrams illustrating the display operation of a program table in the system for processing program information according to the tenth embodiment. In this tenth embodiment, at first, the basic program table 101 is displayed in two dimensions on the program table display means 4 as shown in FIG. 24A. At positions adjacent to the program table 101 in the display picture, there are provided displays for the two-axes attributes determining the structure of the program table that are being displayed at present, that is, present attribute displays 104 and 105. In the example of FIG. 24A, "time", representing the time slots is displayed in the present attribute display 104 and "CH", representing the channel, is displayed in the present attribute display 105.

Figure 24B:
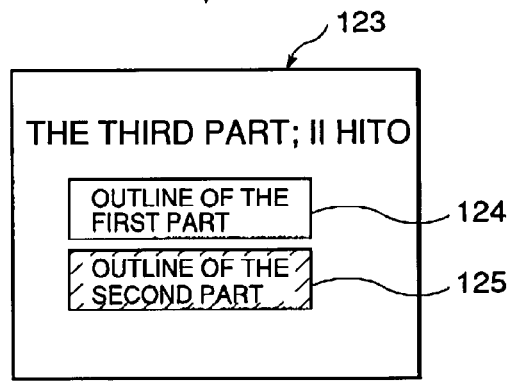
FIG. 24B is a diagram showing the construction of a picture displaying program information of the corresponding program by performing the program designation in the program table of the above FIG. 24A.
Figure 24C:
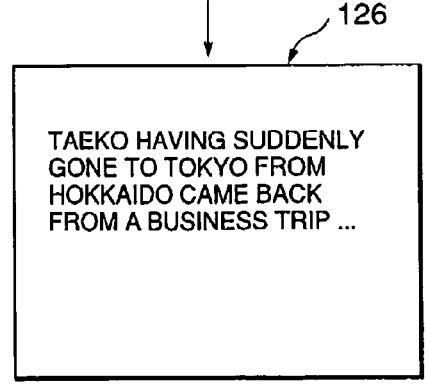
FIG. 24C is a diagram showing the construction of the picture displaying the display item of the corresponding program by performing the item designation in the picture of the above FIG. 24B.

If the audience selects a predetermined program (in the example of FIG. 24A, Nihon Television in the time slot of 7 o'clock) in the above program table 101 through the program information selection means 19, as shown in FIG. 24B, the picture 123, showing program information of the corresponding program, is displayed on the program table display means 4 and operating buttons 124 and 125, for selecting and indicating the outlines of the parts broadcast in the past, are displayed. If the audience clicks one of the operation buttons (for example 125 in FIG. 24B), as shown in FIG. 24C, the content of past program information corresponding to that the selection, that is an outline picture 126, is displayed on the program table display means 4. In this manner, past program information of dramas or the like can be looked by using the system for processing program information.

11th Embodiment

Figure 25:
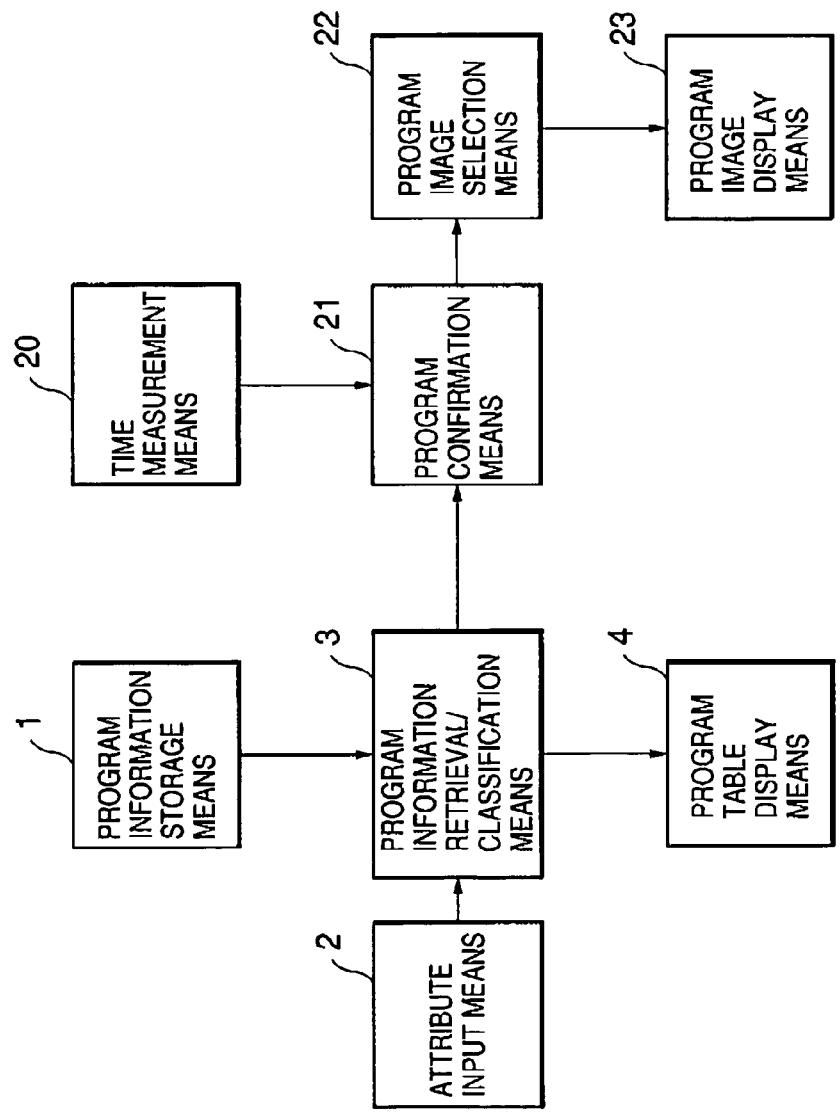
FIG. 25 is a block diagram showing the construction of an eleventh embodiment of a system for processing program information according to the present invention.

FIG. 25 is a block diagram showing the construction of the eleventh embodiment of a system for processing program information according to the present invention. In FIG. 25, the reference 20 denotes time measurement means for measuring the present time, 21 denotes program confirmation means for confirming a program, 22 denotes program image selection means for selecting a program image, and 23 denotes program image display means for displaying the program image. In this eleventh embodiment, the remaining structure of the system for processing program information is the same as the above first embodiment and includes program information storage means 1, attribute input means 2, program information retrieval/classification means 3, and program table display means 4. A clock or the like is used for the time measurement means 20 and the measurement result is output to the program confirmation means 21. The program confirmation means 21 receives program information from the program information retrieval/classification means 3 and collates it with data from the time measurement means 20 to confirm whether the program is on the air at present or not, and outputs the confirmation result to the program image selection means. The program image selection means 22 selects a program image, where the confirmation result from the program confirmation means 21 shows that it is on the air at present, and sends it to the program image display means 23. The program image display means 23 displays the image of the program.

Figure 26A:
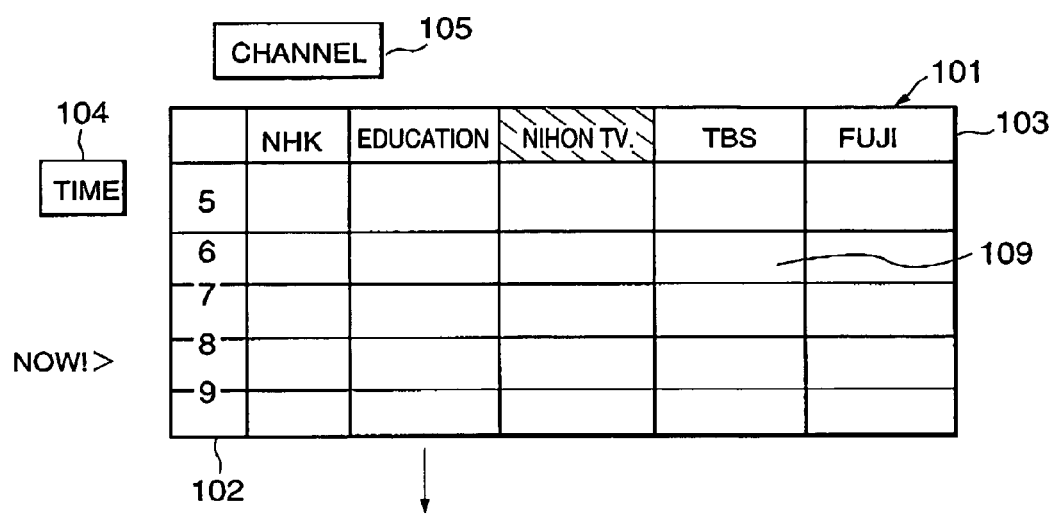
FIG. 26A is a diagram showing the construction of a program table in the ordinary form for use in the above eleventh embodiment.

The operation of the system for processing program information according to the eleventh embodiment having this structure will be described. FIGS. 26A, B and C are diagrams illustrating the display of the program table in the system for processing program information according to the eleventh embodiment. In this eleventh embodiment, at first, the basic program table 101 is two-dimensionally displayed on the program table display means 4 as shown in FIG. 26A. At a position adjacent to the program table 101 in the display picture, there are provided supplemental displays for the two-axes attributes that are adapted to determined the structure of the program table displayed at present, that is, the present attribute displays 104 and 105. In the example of FIG. 26A, "time", representing a time slot, is displayed in the present attribute display 104 and "CH", representing a channel, is displayed in the present attribute display 105.

Figure 26C:
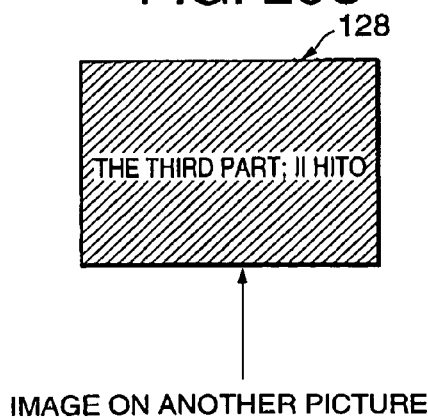
FIG. 26C is a diagram showing the construction of another picture displaying an image of the program in parallel with the picture display of the above (b)
Figure 26B:
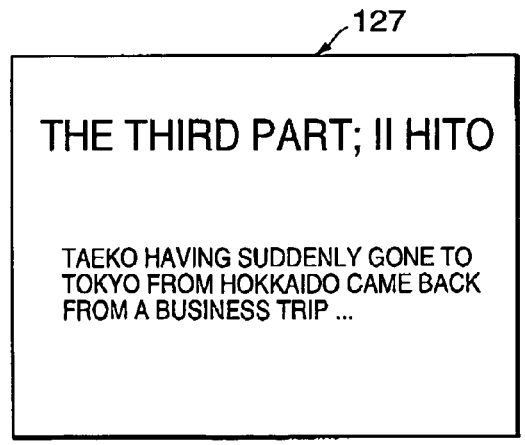
FIG. 26B is a diagram showing the construction of a picture displaying program information of the corresponding program on the air at present by designating a channel in the program table of the above FIG. 25A.

If the audience inputs a predetermined program or a channel (in the example of FIG. 26A, the channel corresponding to Nihon Television is selected) in the above program table 101 through the attribute input means 2, as shown in FIG. 26B, a picture 127, showing program information of the corresponding program, that is, the program on the air at present, is displayed on the program table display means 4. On the other hand, if the audience designates a predetermined program in the above program table 101 and inputs it through the attribute input means 2, the designated piece of program information is sent from the program information retrieval/classification means 3 to the program confirmation means 21. The program confirmation means 21 determines, based on the data from the time measurement means 20, whether the program is on the air at present or not. If it is off the air, because a signal showing that effect is output to the program image selection means 22, no image is displayed on the program image display means 23 and only the program information picture 127 is displayed on the program table display means 4 as shown in FIG. 26B. On the other hand, if it is judged that the program is on the air at present, in the above determination operation in the program confirmation means 21, a signal showing that it is on the air is output to the program image selection means 22. In this manner, the program image selection means 22 operates to select a program image, and an image picture 128 of the program is displayed on the program image display means 23 as shown in FIG. 26C. Also in this case, the program information picture 127 may be displayed on the program information display means 4.

12th Embodiment

Figure 27:
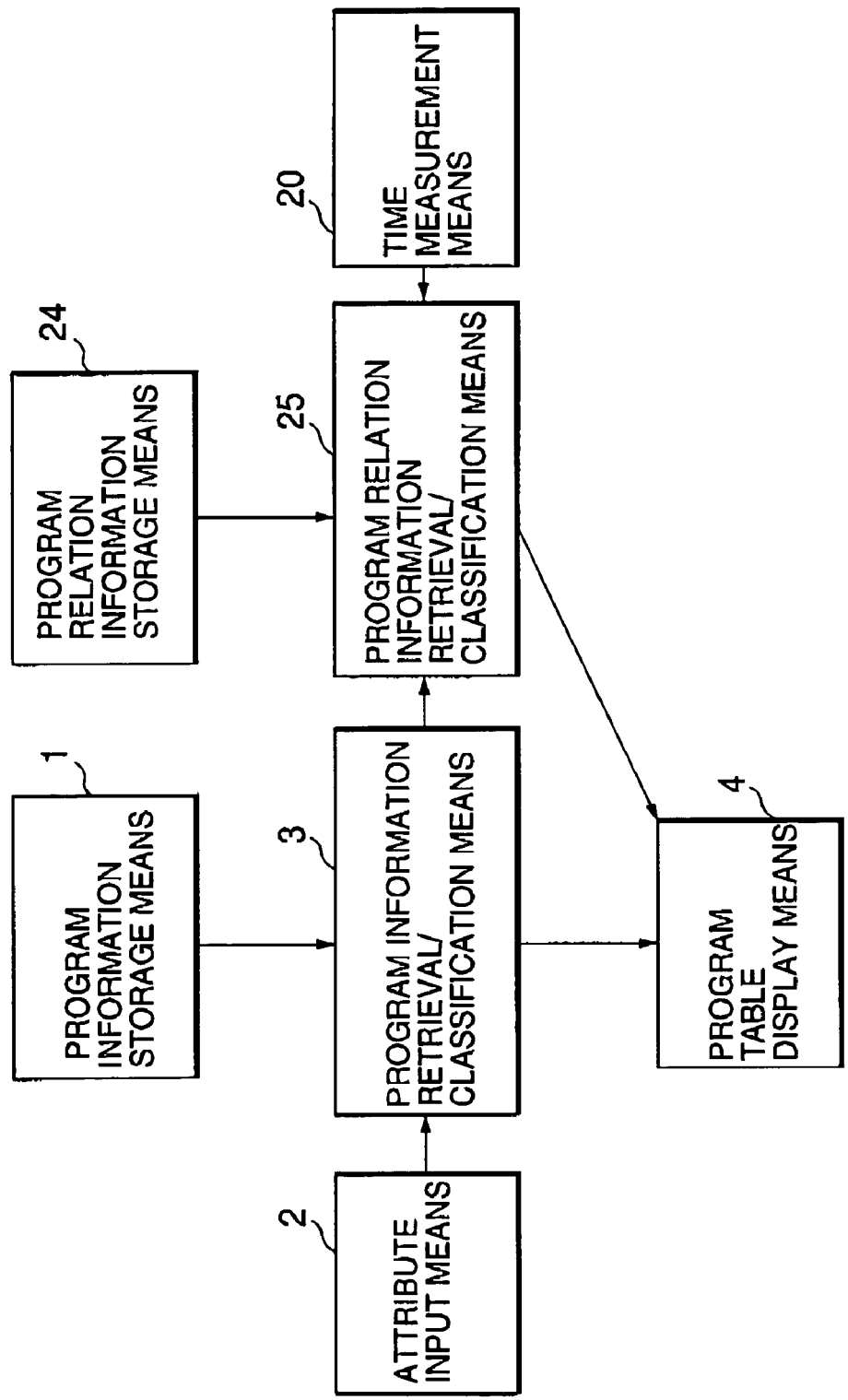
FIG. 27 is a block diagram showing the construction of a twelfth embodiment of a system for processing program information according to the present invention.

FIG. 27 is a block diagram showing the structure of the twelfth embodiment of a system for processing program information according to the present invention. In FIG. 27, the reference 24 denotes program relation information storage means for storing program relation information, 25 denotes program relation information retrieval/classification means for retrieving and classifying program related information, and 20 denotes time measurement means as in the above eleventh embodiment. In this twelfth embodiment, the remaining structure of the system for processing program information is the same as the above first embodiment and includes program information storage means 1, attribute input means 2, program information retrieval/classification means 3, and program table display means 4. In the program related information storage means 24, information related to programs in the storage means, for instance, information of sponsors or the like, is stored. The program related information retrieval/classification means 25 receives program information from the program information retrieval/classification means 3 to retrieve and classify program information related to the program from the program related information retrieval/classification means 25. A clock or the like is used for the time measurement means 20 and the time measurement result is output to the program related information retrieval/classification means 25.

The operation of the system for processing program information according to the twelfth embodiment having this structure will be described. FIGS. 28A, B and C are diagrams illustrating the display operation of the program table in the system for processing program information according to the twelfth embodiment. In this twelfth embodiment, at first, the basic program table 101 is displayed on the program table display means 4 in two dimensions as shown in FIG. 28A. At a position adjacent to the program table 101 in the display picture, there are provided display means for two-axes attributes that determine the structure of the program table being displayed at present, that is, present attribute display means 104 and 105. In the example of FIG. 28A, "time", representing the time slot, is displayed in the present attribute display means, 104 and "CH", representing the channel, is displayed in the present attribute display means, 105. The indication of "<NOW!>" given to the time axis represents the present time slot. Although the present time slot indicates "NOW!>" being displayed at two positions in FIG. 28A, the reason is that there is "the present" at each time because information relative to the program is retrieved in accordance with a time schedule, as described later.

If the audience inputs a predetermined channel (in the example of FIG. 28A, the channel for Nihon Television is selected) in the above program table 101 through the attribute input means 2, information relative to the program is displayed on the program table display means 4 in accordance with the time schedule of the selected channel. In the example of FIGS. 28, for the time slot of 6 o'clock, the channel selected by the above channel selection, an advertisement display picture 129 for "Digicam", is displayed on the program table display means 4 as information relative to the program as shown in FIG. 28B. On the other hand, as for the time slot nearly of 8 o'clock, an outline picture 130 of the program "the third part, Ii Hito" is displayed on the program table display means 4 as information relative to the program as shown in FIG. 28C. The time schedule in this case is controlled based on the data received from the time measurement means 20. What is retrieved as program related information is previously established in the program relation information retrieval/classification means 25.

Although program related information is displayed according to the input of the user, and the selected time in this example, it is also possible that for previous inputs of the user to be maintained to renew the display of program related information as a function of the time changing. For instance, if a specific broadcasting station (for instance, Nihon Television) is previously selected, it is also possible to retrieve and display program related information for the time elapsing after that the selected time slot.

13th Embodiment

Figure 29:
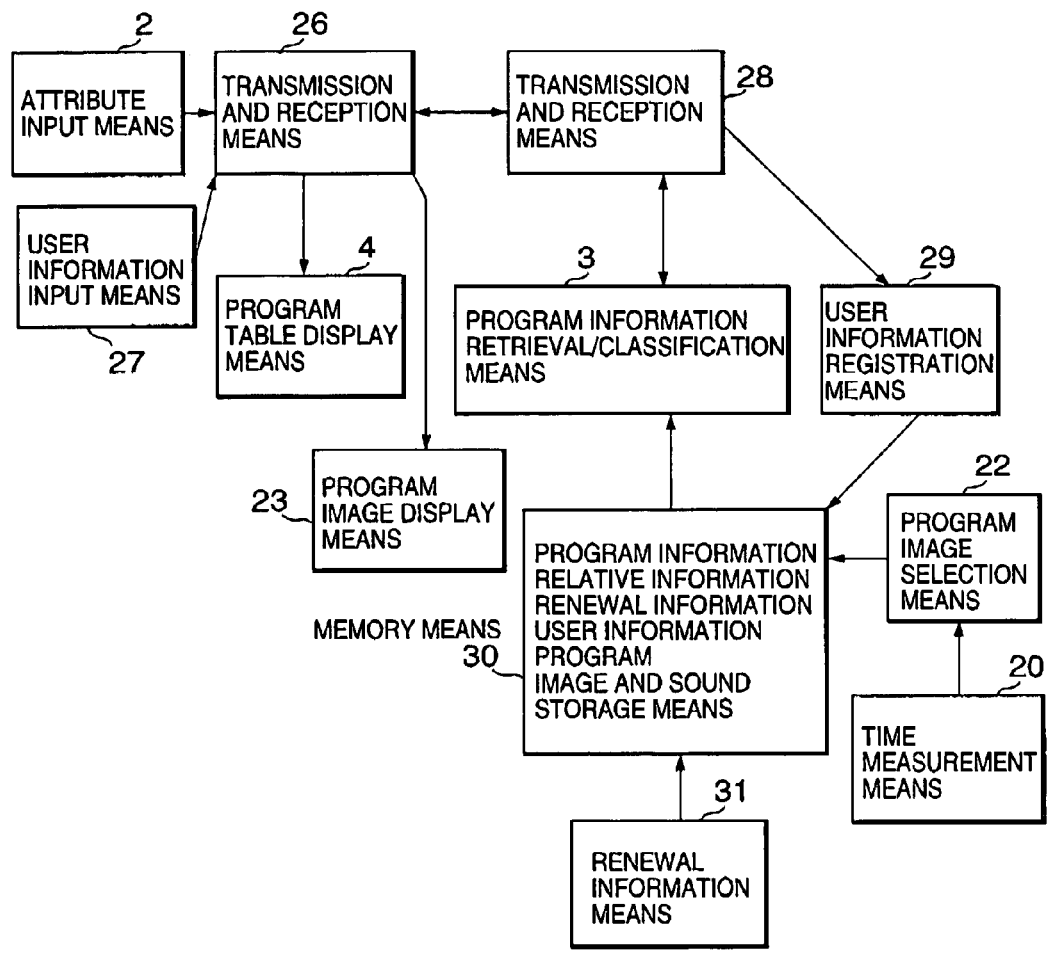
FIG. 29 is a block diagram showing the construction of a thirteenth embodiment of a system for processing program information according to the present invention.

FIG. 29 is a block diagram showing the structure of the thirteenth embodiment of a system for processing program information according to the present invention. In FIG. 29, the reference 26 denotes transmission and reception means for transmitting and receiving program information and a program image. To this transmission and reception means 26, attribute input means 2, user information input means 27, program table display means 4 and program image display means 23 are connected to constitute a reception side terminal (that is, a user side terminal). Reference 28 denotes transmission and reception means disposed correspondingly to the above transmission and reception means 26 for transmitting program information and a program image to that transmission and reception means 26 and means for receiving them from that transmission and reception means 26. Program information retrieval/classification means 3 and user information registration means 29 are connected to this transmission and reception means 28. Memory means 30 is connected to the program information retrieval/classification means 3, renewal information means 31 and program image selection means 22 are connected to this memory means 30. Time measurement means 20 is connected to the program image selection means 22. The program information retrieval/classification means 3, the time measurement means 20, the program image selection means 22, the transmission and reception means 28, the user information registration means 29, the memory means 30 and the renewal information means 31 constitute a server side terminal.

In the user side terminal, the attribute input means 2 is for inputting various program information retrieval conditions or the like by the audience. The user information input means 27 is means for the audience to input its name, address or the like and those input data are transmitted through the transmission and reception means 26 and 28 to the server side terminal. The program table display means 4 and the program image display means 23 receive program table data and a program image from the transmission and reception means 26 and display them for the user, respectively.

In the server side terminal, the program information retrieval/classification means 3 retrieves and classifies various data stored in the memory means 30 and sends the result to the transmission and reception means 28. The user information registration means 29 sends user information, sent from the transmission and reception means 28 that received user information transmitted from the user side terminal, to the memory means 30 and registers it. The user registration operation is carried out at an optional time at the audience side. Various data, such as program information, relative information, renewal information, user information, programs, images and sound are sent to the memory means 30. The renewal information means 31 is for maintaining various renewal matters, such as the time change and the change of a program content, and sending them to the memory means 30. The program image selection means 22 is for selecting and outputting a program image, that is, image and sound data, to the memory means 30. The time measurement means 20 is for controlling with time in relation to the operation of the program image means 22. The memory means 30 is the program information storage means 1 in the above storage means embodiment, and is adapted to stores more kinds of data than that program information storage means 1.

Figure 30A:
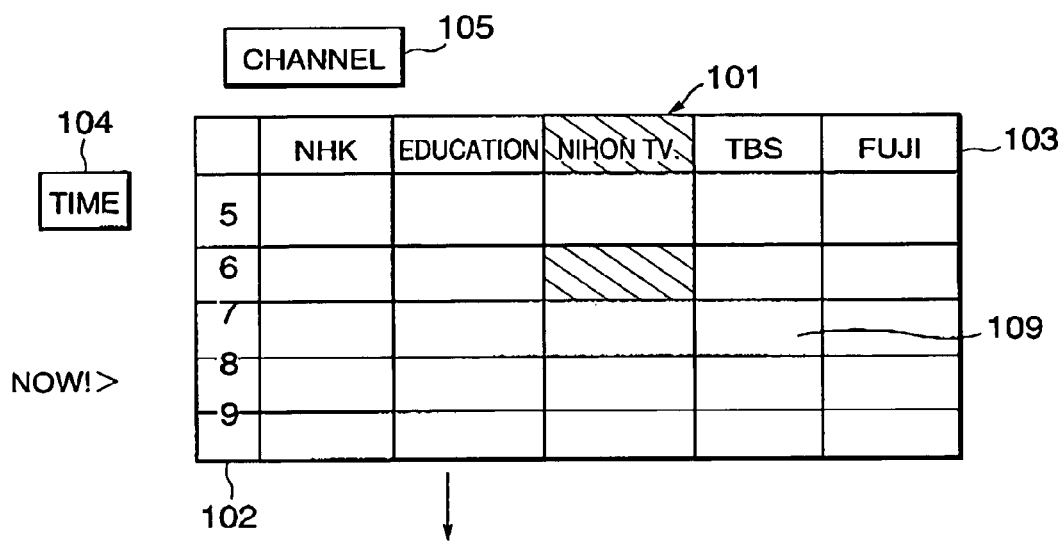
FIG. 30A is a diagram showing the construction of a program table in the ordinary form for use in the above thirteenth embodiment.

The operation of the system for processing program information according to the thirteenth embodiment having this structure will be described. FIGS. 30A and B are diagrams for illustrating the display operation of the program table in the system for processing program information according to the thirteenth embodiment. In this thirteenth embodiment, at first, the basic program table 101 is two-dimensionally displayed on the program table display means 4 as shown in FIG. 30A. At positions adjacent to the program table 101 in the display picture, there are provided present attribute display means 105 and 106 for two-axes attributes that are adapted to determine the structure of the program table displayed at present. In the example of FIG. 30A, "time", representing the time slot, is displayed in the present attribute display means 104 and "CH", representing the channel, is displayed in the present attribute display means 105. The indication of "NOW!>" given to the time axis represents the present time zone.

Here, if the audience inputs a predetermined program (in the example of FIG. 30A, Nihon Television in the time zone of 6 o'clock is selected) in the above program table 101 through the attribute input means 2, after the server side transmission and reception means 28 receives information of the selected program, the program information retrieval/classification means 3 performs the retrieval as to the memory means 30 to read out program information or information relative to the program. These read-out data of program information or the like are sent from the program information retrieval/classification means 3 to the transmission and reception means 28 to transmit them from the transmission and reception means 28 to the user side terminal. The transmitted data are received by the transmission and reception means 26 and are displayed on the program table display means 4.

Figure 30B:
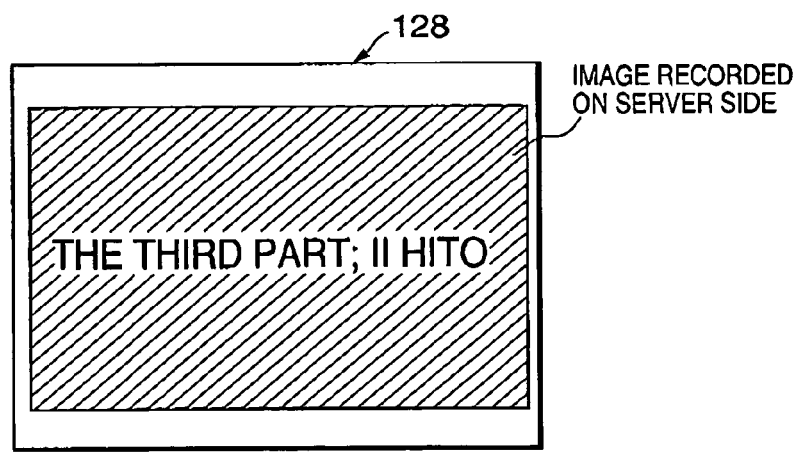
FIG. 30B is a diagram showing the construction of the image picture obtained by designating the program that had already been on the air, in the program table of the above FIG. 30A.

As another operation, the operation of transmission of the program image is shown. By the above attribute input, a program that is being broadcast before the time indicated by the present time "NOW!>" is input as the attribute. In such a case, programs that had been on the air are recorded and, a favorite program can be selected from the recording, and images of the program can be seen. In this case, the set of the time measurement means 20 and the program image selection means 22 is constituted by a video device, that records all programs on the air and stores the data in the memory means 30. If a program that had already been on the air is selected, through the attribute input means as described above, the program information is transmitted and received through the transmission and reception means 26 and 28, and image data of the corresponding program are retrieved from the memory means 30 through the program information retrieval/classification means 3 to transmit them back. On the reception side, an image picture 128 is displayed on the program image display means 23 as shown in FIG. 30B.

As still another operation, as described in the above eleventh embodiment, if a program meeting the time indicated by the present time "NOW!>" is input as the attribute through the attribute input means 2, because the program is on the air at present, the program image selection means 22 operates to select the image and sound of the program and so instruct the memory means 30. In this manner, the corresponding image and sound (program image) are read out from the memory means 30 and sent through the program information retrieval/classification means 3 to the transmission and reception means 26 and 28, to be transmitted to the reception side. On the reception side, the image picture 128 of the program is displayed on the program image display means 23 in a similar manner to FIG. 30B. By this manner, a program that has been forgotten to be reserved for recording or a program that has ended can be viewed at any time.

14th Embodiment

Figure 31:
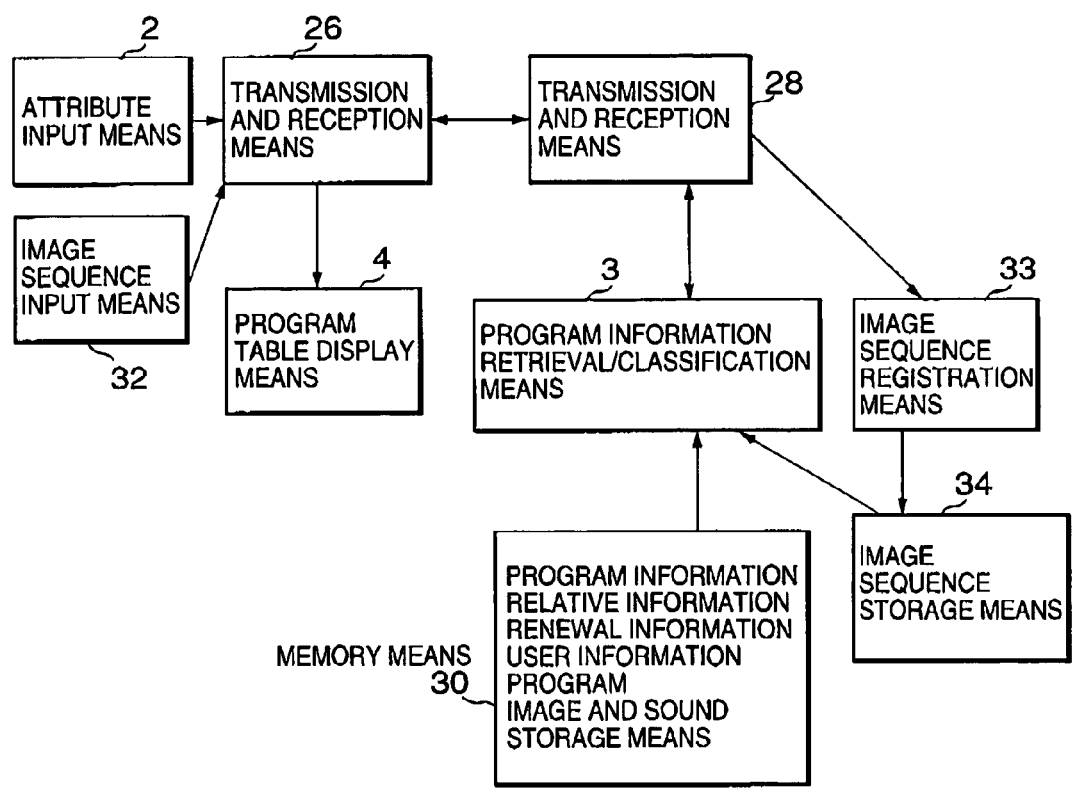
FIG. 31 is a block diagram showing the construction of a fourteenth embodiment of a system for processing program information according to the present invention.

FIG. 31 is a block diagram showing the structure of the fourteenth embodiment of a system for processing program information according to the present invention. In FIG. 31, the reference 26 denotes transmission and reception means for transmitting and receiving program information and a program image. Attribute input means 2, image sequence input means 32, and program table display means 4 are connected to this transmission and reception means 26 to constitute a user side terminal. Reference 28 denotes transmission and reception means disposed correspondingly to the above transmission and reception means 26 for transmitting program information and a program image to that transmission and reception means 26 and receiving them from that transmission and reception means 26. Program information retrieval/classification means 3 and image sequence registration means 33 are connected to this transmission and reception means 28. Memory means 30 and image sequence storage means 34 are connected to the program information retrieval/classification means 3. The program information retrieval/classification means 3, the transmission and reception means 28, the memory means 30, the image sequence registration means 33, and the image sequence storage means 34 constitute a server side terminal.

In the user side terminal, the attribute input means 2 is for inputting various program information retrieval conditions or the like by the audience. The image sequence input means 32 is means for inputting an image sequence selected by the user and those input data are transmitted through the transmission and reception means 26 and 28 to the server side terminal. The program table display means 4 receives program table data from the transmission and reception means 26 and displays them, respectively.

In the server side terminal, the program information retrieval/classification means 3 retrieves and classifies various data stored in the memory means 30 and the image sequence storage means 34, and sends the result to the transmission and reception means 28. The image sequence storage means 34 stores the image sequence received from the user side terminal and sends the image sequence data to the program information retrieval/classification means 3. The image sequence registration means 33 is for sending the image sequence transmitted from the user side terminal and received by the transmission and reception means 28 and registering it.

Figure 32A:
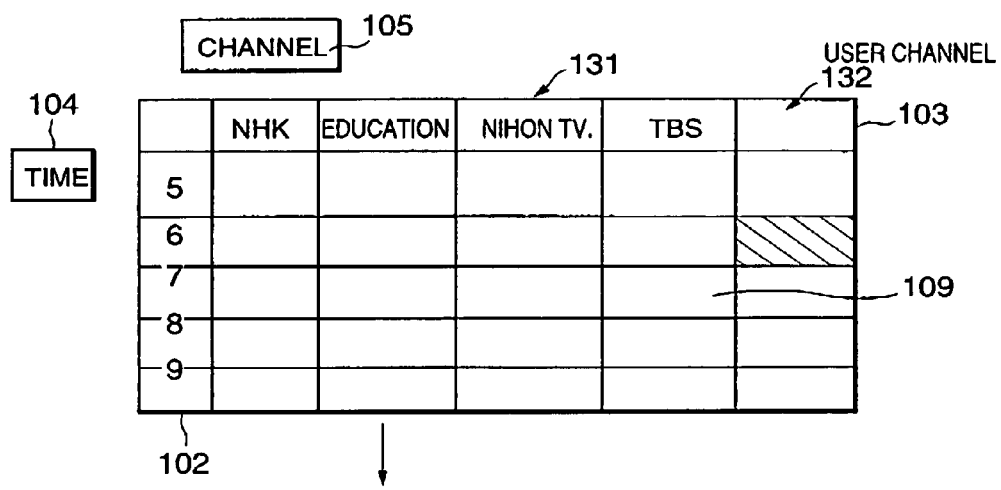
FIG. 32A is a diagram showing the construction of a program table in the ordinary form for use in the above fourteenth embodiment.

The operation of the system for processing program information according to the fourteenth embodiment having this structure will be described. FIGS. 32A and B are diagrams for illustrating the display operation of the program table in a system for processing program information according to the fourteenth embodiment. In this fourteenth embodiment, at first, a program table 131, where a station name has been added to the basic program tables is two-dimensionally displayed on the program table display means 4 as shown in FIG. 32A. This program table 131 has an extra user channel 132 in addition to the existing channels. At a position adjacent to the program table 131 in the display picture, there are provided present attribute display means 104 and 105 for the two-axes attributes that determine the construction of the program table displayed at present. In the example of FIG. 32A, "time", representing the time slot, is displayed in the present attribute display means 104 and "CH", representing the channels is displayed in the present attribute display means 105.

The image sequence selected by the user is inputs by the image sequence input means 32 the user side terminal and the data are sent to the transmission and reception means 26. The transmission and reception means 26 transmits the data to the server side terminal. In the server side terminal, the transmission and reception means 28 receives the transmitted data of the image sequence sends those data to the image sequence registration means 33. The image sequence registration means 33 sends the image sequence transmitted from the user side terminal, that has been received by the transmission and reception means 28, to the image sequence storage means 34 and registers it. The registered image sequence is stored in the image sequence storage means 34.

Figure 32B:
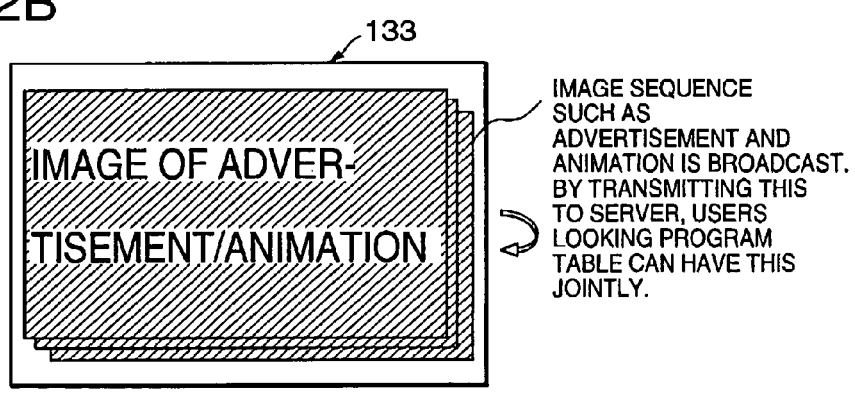
FIG. 32B is a diagram showing the construction of the image sequence picture obtained by selecting the user channel in the program table of the above FIG. 32A.

Here, if the audience selects a predetermined program (in the example of FIG. 32A, the user channel 132 in the time slot of 6 o'clock is selected) in the user channel 132 in the above program table 131 through the attribute input means 2, after the server side transmission and reception means 28 receives information as to the selected program, the program information retrieval/classification means 3 performs the retrieval as from the memory means 30 and the image sequence storage means 34. Because the designated piece of program information is stored in the image sequence storage means 34, the program information retrieval/classification means 3 reads out the corresponding data from the image sequence storage means 34. These read-out image sequence data are sent from the program information retrieval/classification means 3 to the transmission and reception means 28 to transmit them from the transmission and reception means 28 to the user side terminal. An image sequence picture 133 that is the transmitted data, is received by the transmission and reception means 26 and displayed on the program table display means 4 as shown in FIG. 32B.

15th Embodiment

Figure 33:
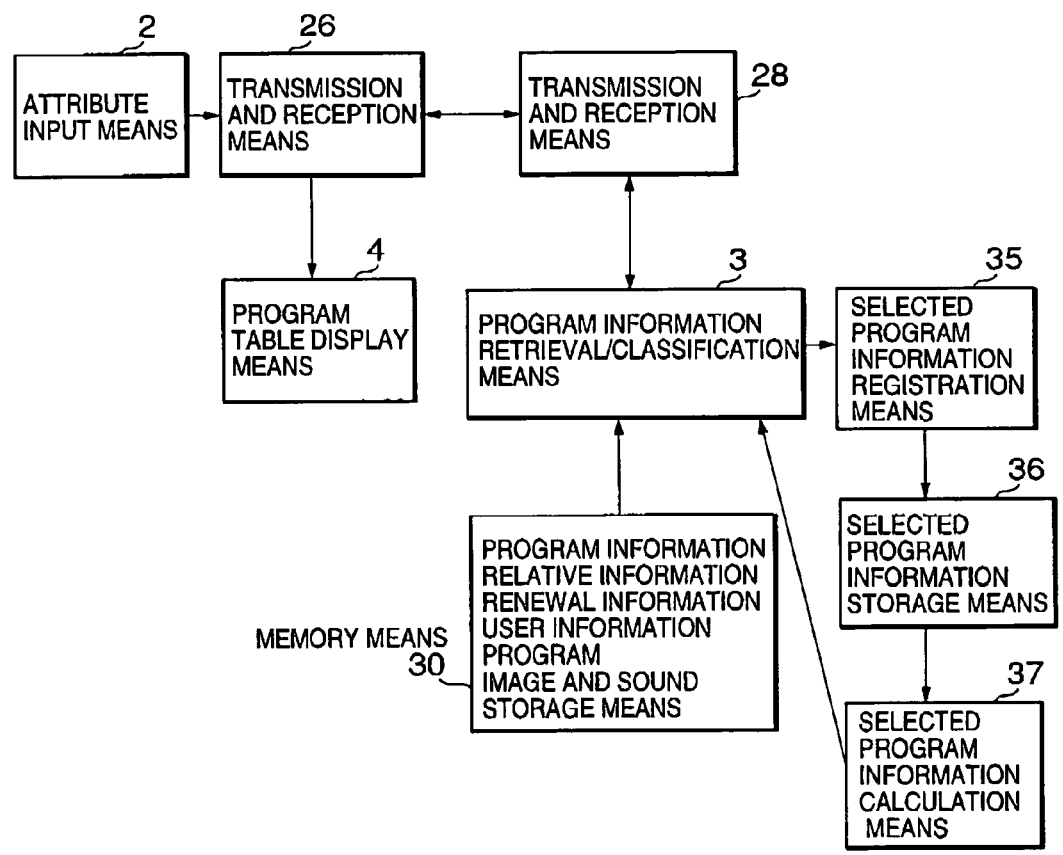
FIG. 33 is a block diagram showing the construction of a fifteenth embodiment of a system for processing program information according to the present invention.

FIG. 33 is a block diagram showing the structure of the fifteenth embodiment of a system for processing program information according to the present invention. In FIG. 33, the reference 26 denotes transmission and reception means for transmitting and receiving program information and a program image. This transmission and reception means 26, and the attribute input means 2 and program table display means 4 are connected together to constitute a user side terminal. Reference 28 denotes transmission and reception means disposed correspondingly to the above transmission and reception means 26 for transmitting program information and a program image to that transmission and reception means 26 and receiving them from that transmission and reception means 26. This transmission and reception means 28, and the program information retrieval/classification means 3 are connected together. Memory means 30 and selected program information registration means 35 are connected to the program information retrieval/classification means 3. Selected program information storage means 36 is connected to the selected program information registration means 35. Furthermore, this selected program information storage means 36 is connected to a selected program information calculation means 37. The program information retrieval/classification means 3, the transmission and reception means 28, the memory means 30, the selected program information registration means 35, the selected program information storage means 36, and the selected program information calculation means 37 constitute a server side terminal.

In the user side terminal, the attribute input means 2 is for inputting various program information retrieval conditions or the like by the audience. The program table display means 4 receives program table data from the transmission and reception means 26 and displays them, respectively.

In the server side terminal, the program information retrieval/classification means 3 retrieves and classifies various data stored in the memory means 30 and sends the result to the transmission and reception means 28. The selected program information registration means 35 is for sending information of the program selected by the user to the selected program information storage means 36 and registering it. The selected program information storage means 36 stores selected program information, received from the user side terminal, and sends the selected program information to the selected program information calculation means 37. The selected program information calculation means 37 is for calculating the number of people viewing the same program and for calculating the audience rating in relation to the program information selected by the user, and for sending the result(s) to the program information retrieval/classification means 3.

The operation of the system for processing program information according to the fifteenth embodiment having this invention will be described. The description of the operation in this fifteenth embodiment is almost the same as the above described embodiments shown in FIG. 3 or FIG. 21. For instance, referring first to FIG. 21, in FIG. 21A, the program table by day of week in relation to prime time (8 o'clock to 10 o'clock), that is, the program table 108 in which only the time slot only the prime time (8 o'clock to 10 o'clock) slots are arranged along the vertical axis 102 and the days of week (Monday, Tuesday, Wednesday, . . . ) are arranged along the horizontal axis 103, is displayed on the program table display means 4. At the position adjacent to the program table 108 in the display picture, there are provided display means for the two-axes attributes that determine the construction of the program table displayed at present, that is, present attribute display means 104 and 105. In the example of FIG. 21A, "time", representing the time slot, is displayed in the present attribute display means 104 and "CH", representing the channel, is displayed in the present attribute display means 105. Another display may be performed in the picture.

Program information selected by the user is input through the attribute input means 2 in the user side terminal and the data are sent to the transmission and reception means 26. The transmission and reception means 26 transmits the data to the server side terminal. In the server side terminal, the transmission and reception means 28 receives the transmitted data of the selected program information and sends the data to the selected program information registration means 35. The selected program information registration means 35 sends selected program information transmitted from the user side terminal and received by the transmission and reception means 28, to the selected program information storage means 36 and registers it. Selected program information that has been registered is stored in the selected program information storage means 36.

Here, if the audience inputs a predetermined program in the above program table 108 through the attribute input means 2, after the server side transmission and reception means 28 receives the selected program, the program information retrieval/classification means 3 sends the program to the selected program information registration means 35 and performs the retrieval from the memory means 30 to read out program information or information relative to the program. On the other hand, the selected program information registration means 35, that received selected program information from the program information retrieval/classification means 3, sends the data to the selected program information storage means 36. The selected program information calculation means 37 calculates the number of people viewing the same program, determines the audience rating of that program on the basis of the data in the selected program information storage means 36, and sends the result to the program information retrieval/classification means 3. The program information retrieval/classification means 3 sends the data of program information or the like, that it has read out from the memory means 30, and the calculated result sent from the selected program information calculation means 37, to the transmission and reception means 28 and they are transmitted from the transmission and reception means 28 to the user side terminal. The selected program information picture, that is the transmitted data, is received by the transmission and reception means 26 and displayed on the program table display means 4 in the manner as shown in FIG. 4B or in the manner as shown in FIG. 21B.

16th Embodiment

Figure 34:
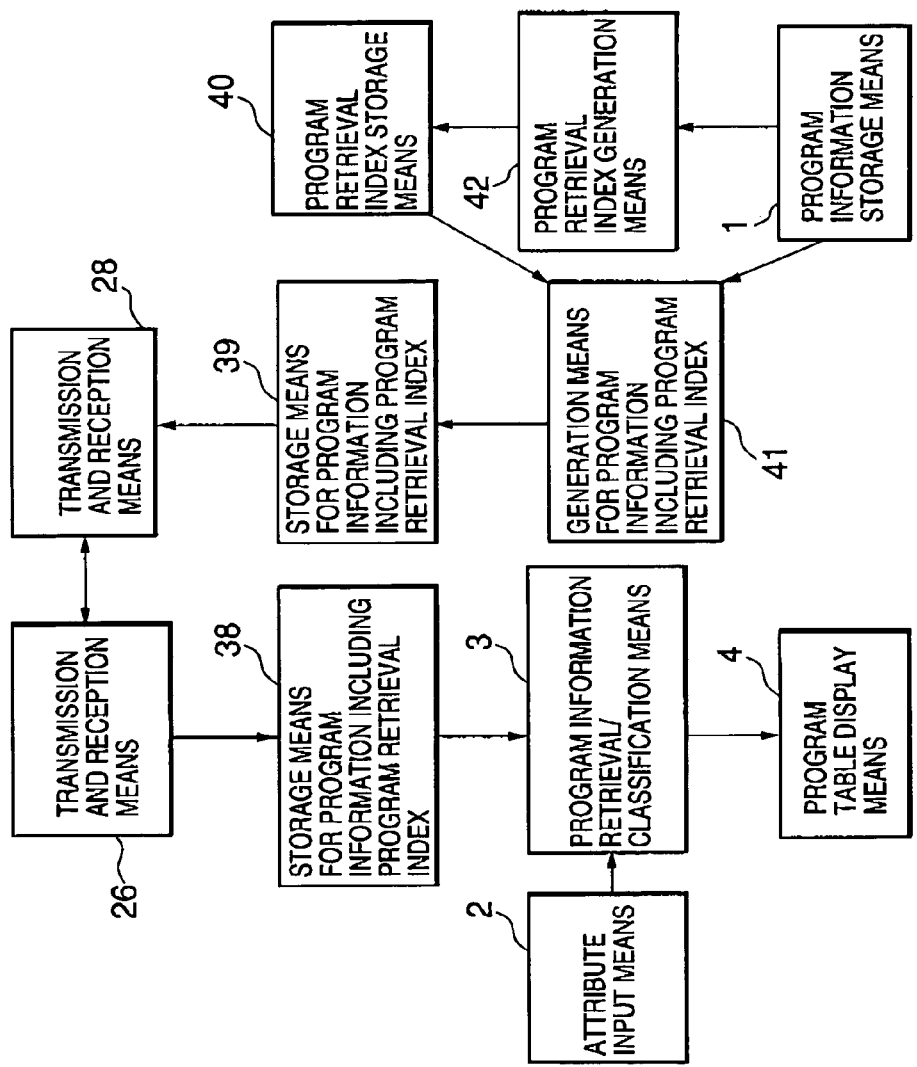
FIG. 34 is a block diagram showing the construction of a sixteenth embodiment of a system for processing program information according to the present invention.

FIG. 34 is a block diagram showing the structure of the sixteenth embodiment of a system for processing program information according to the present invention. In FIG. 34, the reference 26 denotes transmission and reception means for transmitting and receiving program information. Storage means 38 for storing program information, including a program retrieval index, is connected to this transmission and reception means 26. This storage means 38 for program information including a program retrieval index is connected to the program information retrieval/classification means 3. Attribute input means 2 and program table display means 4 are connected to the program information retrieval/classification means 3. Those functional parts constitute a user side terminal. Reference 28 denotes transmission and reception means disposed correspondingly to the above described transmission and reception means 26 for transmitting program information and a program image to that transmission and reception means 26 and receiving them from that transmission and reception means 26. This transmission and reception means 28 is connected to storage means 39 for program information including a program retrieval index. Generation means 41 for program information including a program retrieval index is connected to the storage means 39 for program information including a program retrieval index. In FIG. 34, the reference 40 denotes program retrieval index storage means 40. This program retrieval index storage means 40 is connected to program retrieval index generation means 42. Furthermore, this program retrieval index generation means 42 is connected to program information storage means 1. The program information storage means 1, the transmission and reception means 28, the means for storage 39 of program information including a program retrieval index, the means for generating program information 41, including a program retrieval index, the program retrieval index storage means 40, and the program retrieval index generation means 42 constitute a server side terminal.

In the user side terminal, the attribute input means 2 is for inputting various program information retrieval conditions or the like by the audience. The program information retrieval/classification means 3 is for retrieving and classifying program information including a program retrieval index stored in the means for storage 38 of program information including a program retrieval index. The program table display means 4 receives the program table data from the program information retrieval/classification means 3 and is adapted to display them.

In the server side terminal, the means for storage 39 of program information, including a program retrieval index, is for storing program information that includes a program retrieval index generated on the server side. The means for generating 41 program information, including a program retrieval index, is for generating program information, including a program retrieval index, by adding an index for program retrieval to the program information that has been sent from the program information storage means 1. The program retrieval index storage means 40 is for storing the data relative to the index to be added to program information. The program retrieval index generation means 42 is for generating the data relative to the index to be added to program information.

The operation of the system for processing program information according to the sixteenth embodiment having this structure will be described. In this sixteenth embodiment, on the server side, program information, stored in the program information storage means 1, is received by the program retrieval index generation means 42 and an index for the program retrieval is generated based on the above program information, and the generated program retrieval index is sent to the program retrieval index storage means 40 to be stored. The data from the program information storage means 1 and the data from the program retrieval index storage means 40 are sent to the means for generating 41 program information, including a program retrieval index, to generate program information, including a program retrieval index.

Program information, including a program retrieval index, generated on the server side is sent from the means for storage 39 of program information, including a program retrieval index, to the transmission and reception means 28 and transmitted from the transmission and reception means 28 to the user side terminal. In the user side terminal, the transmission and reception means 26 receives the transmitted data from the program information storage means, including a program retrieval index, and those data are stored in the storage means 38 for program information, including a program retrieval index.

In the program information retrieval operation based on the program table, if the audience inputs a program retrieval index as for a predetermined program in the program table (it can be the program table 101 used in the above embodiments) through the attribute input means 2, the program information retrieval/classification means 3 retrieves the selected program from the storage means 38 for program information, including a program retrieval index, to read out program information. The read-out program information is sent to the program table display means 4 to be displayed there.

17th Embodiment

Figure 35:
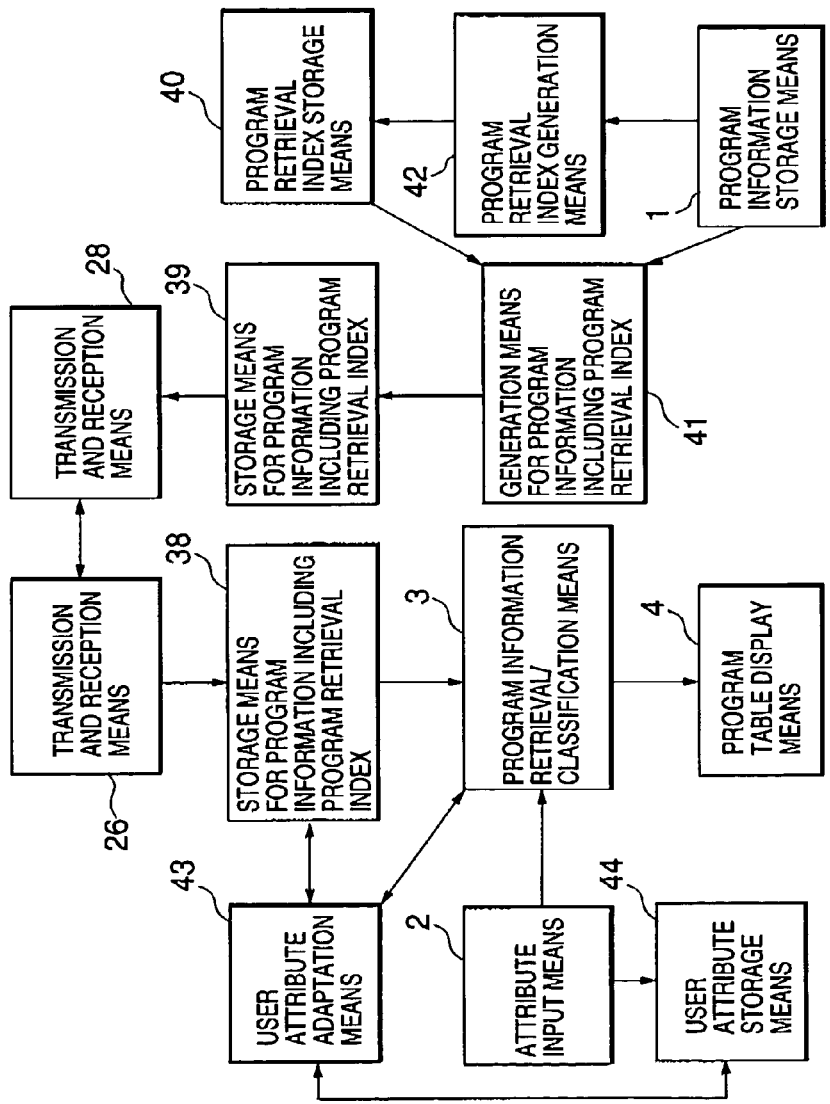
FIG. 35 is a block diagram showing the construction of a seventeenth embodiment of a system for processing program information according to the present invention.

FIG. 35 is a block diagram showing the structure of the seventeenth embodiment of a system for processing program information according to the present invention. In FIG. 35, the reference 26 denotes transmission and reception means for transmitting and receiving program information. To transmission and reception means 26, is connected to storage means 38 for program information including a program retrieval index. This storage means 38 for program information including a program retrieval index, is connected to program information retrieval/classification means 3 and also connected to user attribute adaptation means 43. Attribute input means 2, program table display means 4 and the user attribute adaptation means 43 are connected to the program information retrieval/classification means 3. User attribute storage means 44 is connected to the attribute input means 2. This user attribute storage means 44 is connected so that data can be sent to and received from the user attribute adaptation means 43. Those functional parts constitute a user side terminal. Reference 28 denotes transmission and reception means disposed correspondingly to the above transmission and reception means 26 for transmitting program information and a program image to that transmission and reception means 26 and receiving program information and a program image from that transmission and reception means 26. This transmission and reception means 28, is connected to a storage means 39 for program information including a program retrieval index. Generation means 41 for program information, including a program retrieval index, is connected to the storage means 39 for program information, including a program retrieval index. In FIG. 35, the reference 40 denotes a program retrieval index storage means 40. This program retrieval index storage means 40 is connected to a program retrieval index generation means 42. Furthermore, this program retrieval index generation means 42 is connected to a program information storage means 1. The program information storage means 1, the transmission and reception means 28, the storage means 39 for program information including a program retrieval index, the generation means 41 for program information, including a program retrieval index, the program retrieval index storage means 40, and the program retrieval index generation means 42 constitute a server side terminal.

In the user side terminal, the attribute input means 2 is for inputting various program information retrieval conditions or the like by the audience. The program information retrieval/classification means 3 is for retrieving and classifying program information including a program retrieval index stored in the storage means 38 for program information including a program retrieval index. The program table display means 4 receives the program table data from the program information retrieval/classification means 3 and comprises means to display them. The user attribute storage means 44 is for maintaining the data relative to the user attribute in the user side terminal. The user attribute adaptation means is for examining whether the user attribute is adaptable or not upon the retrieval of program information.

In the server side terminal, the storage means 39 for program information including a program retrieval index is for storing program information including a program retrieval index generated on the server side. The generation means 41 for program information, including a program retrieval index is for generating program information including a program retrieval index by adding an index for the program retrieval to program information that has been sent from the program information storage means 1. The program retrieval index storage means 40 is for storing the data relative to the index to be added to the program information. The program retrieval index generation means 42 is for generating the data relative to the index to be added to program information.

The operation of the system for processing program information according to the seventeenth embodiment having this structure will be described. In this seventeenth embodiment, on the server side, program information stored in the program information storage means 1 is received by the program retrieval index generation means 42 and the index for the program retrieval is generated based on the above program information. The generated program retrieval index is sent to the program retrieval index storage means 40 to be stored. The data from the program information storage means 1 and the data from the program retrieval index storage means 40 are sent to the generation means 41 for program information including a program retrieval index to generate program information including a program retrieval index.

Program information including a program retrieval index generated on the server side is sent from the storage means 39 for program information including a program retrieval index to the transmission and reception means 28 and transmitted from the transmission and reception means 28 to the user side terminal. In the user side terminal, the transmission and reception means 26 receives the transmitted data of the above program information including a program retrieval index and those data are stored in the storage means 38 for program information including a program retrieval index.

In the program information retrieval operation based on the program table, if the audience inputs a program retrieval index for a predetermined program in the program table (it can be the program table 101 used in the above embodiments) through the attribute input means 2, the program information retrieval/classification means 3 retrieves the selected program in the storage means 38 for program information including a program retrieval index. At this time, the user attribute adaptation means 43 receives the user attribute data from the user attribute storage means 44 to determine whether the program subjected to the retrieval adapts to the user attribute or not. If the user attribute is adaptable, the program information is read out. The read-out program information is sent to the program table display means 4 to be displayed there. On the other hand, if the user attribute is not adaptable, program information is not read out and the program information is not displayed on the program table display means 4.

18th Embodiment

Figure 36:
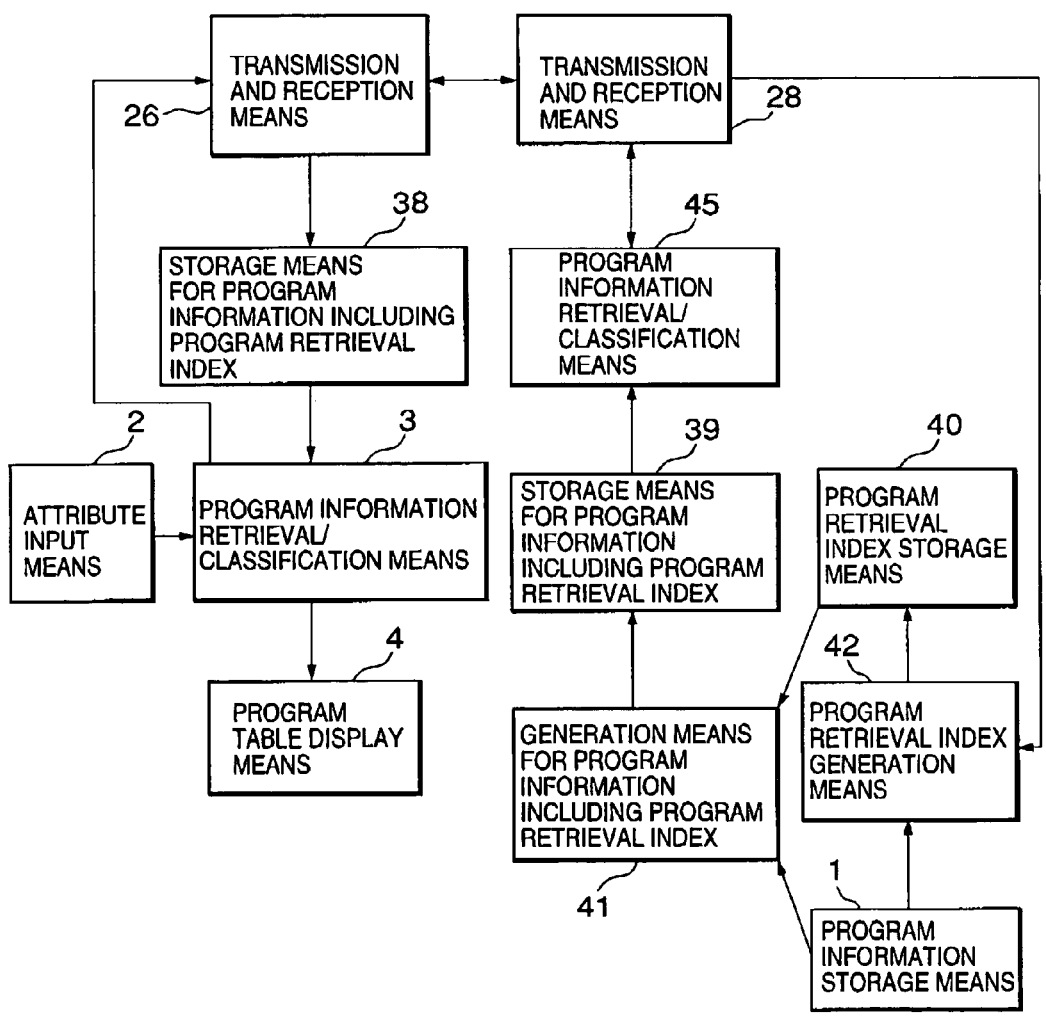
FIG. 36 is a block diagram showing the construction of a eighteenth embodiment of a system for processing program information according to the present invention.

FIG. 36 is a block diagram showing the structure of the eighteenth embodiment of a system for processing program information according to the present invention. In FIG. 36, the reference 26 denotes a transmission and reception means for transmitting and receiving program information. This transmission and reception means 26 is connected to a storage means 38 for program information including a program retrieval index. This storage means 38 for program information including a program retrieval index, is connected to program information retrieval/classification means 3. Attribute input means 2, and program table display means 4 are connected to the program information retrieval/classification means 3. Those functional parts constitute a user side terminal. Reference 28 denotes transmission and reception means disposed correspondingly to the above transmission and reception means 26 for transmitting program information and a program image to that transmission and reception means 26 and receiving the same from that transmission and reception means 26. This transmission and reception means 28, is connected to a program information retrieval/classification means 45. This program information retrieval/classification means 45, is connected to storage means 39 for program information, including a program retrieval index. Generation means 41 for program information including a program retrieval index is connected to the storage means 39 for program information including a program retrieval index. In FIG. 36, the reference 40 denotes program retrieval index storage means 40. This program retrieval index storage means 40 is connected to a program retrieval index generation means 42. Furthermore, this program retrieval index generation means 42 is connected to a program information storage means 1. The program information storage means 1, the transmission and reception means 28, the storage means 39 for program information, including a program retrieval index, the generation means 41 for program information including a program retrieval index, the program retrieval index storage means 40, the program retrieval index generation means 42, and the program information retrieval/classification means 45 constitute a server side terminal.

In the user side terminal, the attribute input means 2 is for inputting various program information retrieval conditions or the like by the audience. The program information retrieval/classification means 3 is for retrieving and classifying program information including a program retrieval index stored in the storage means 38 for program information including a program retrieval index. The program table display means 4 receives the program table data from the program information retrieval/classification means 3 to display them.

In the server side terminal, the storage means 39 for program information including a program retrieval index is for storing program information including a program retrieval index generated on the server side. The generation means 41 for program information, including a program retrieval index, is for generating program information, including a program retrieval index, by adding an index for the program retrieval to program information sent from the program information storage means 1. The program retrieval index storage means 40 is for storing the data relative to the index to be added to program information. The program retrieval index generation means 42 is for generating the data about the index to be added to program information. The program information retrieval/classification means 45 is for retrieving program information including, a program retrieval index, stored in the storage means 39 for program information including a program retrieval index.

The operation of the system for processing program information according to the eighteenth embodiment having this structure will be described. In this eighteenth embodiment, on the server side, program information stored in the program information storage means 1 is received by the program retrieval index generation means 42 and the index of the program retrieval is generated based on the above program information. The generated program retrieval index is sent to the program retrieval index storage means 40 to be stored. The data from the program information storage means 1 and the data from the program retrieval index storage means 40 are sent to the generation means 41 for program information including a program retrieval index, to generate program information including a program retrieval index.

Program information, including a program retrieval index, generated on the server side is sent from the storage means 39 for program information, including a program retrieval index, to the transmission and reception means 28 and transmitted from the transmission and reception means 28 to the user side terminal. In the user side terminal, the transmission and reception means 26 receives the transmitted data of the above program information including a program retrieval index and those data are stored in the storage means 38 for program information including a program retrieval index.

In the program information retrieval operation based on the program table, if the audience inputs a program retrieval index as for a predetermined program in the program table (it can be the program table 101 used in the above embodiments) through the attribute input means 2, the program information retrieval/classification means 3 retrieves the selected program from the storage means 38 for program information including a program retrieval index to read out program information. The read-out program information is sent to the program table display means 4 to be displayed there. However, if, in the user side terminal, the corresponding program information is not retrieved even when the program information retrieval/classification means 3 retrieves the selected program in the storage means 38 for program information including a program retrieval index, the retrieval of program information is performed in the server side terminal. In this case, the attribute data input in the user side terminal are sent from the program information retrieval/classification means 3 to the transmission and reception means 26, and after that, transmitted from the transmission and reception means 26 to the server side terminal. These attribute data are sent to the program information retrieval/classification means 45 in the server side terminal. The program information retrieval/classification means 45 on the server side performs the retrieval from the storage means 39 for program information including a program retrieval index and if there is program information, it is read out. The read-out program information is transmitted from the transmission and reception means 28 to the user side terminal and sent to the program table display means 4 in the audience terminal to be displayed there. In this manner, even if the retrieval of program information, including a program retrieval index, ended in failure in the user side terminal, a similar program information retrieval can be performed in the server side terminal so the certainty of the operation increases.

19th Embodiment

Figure 37:
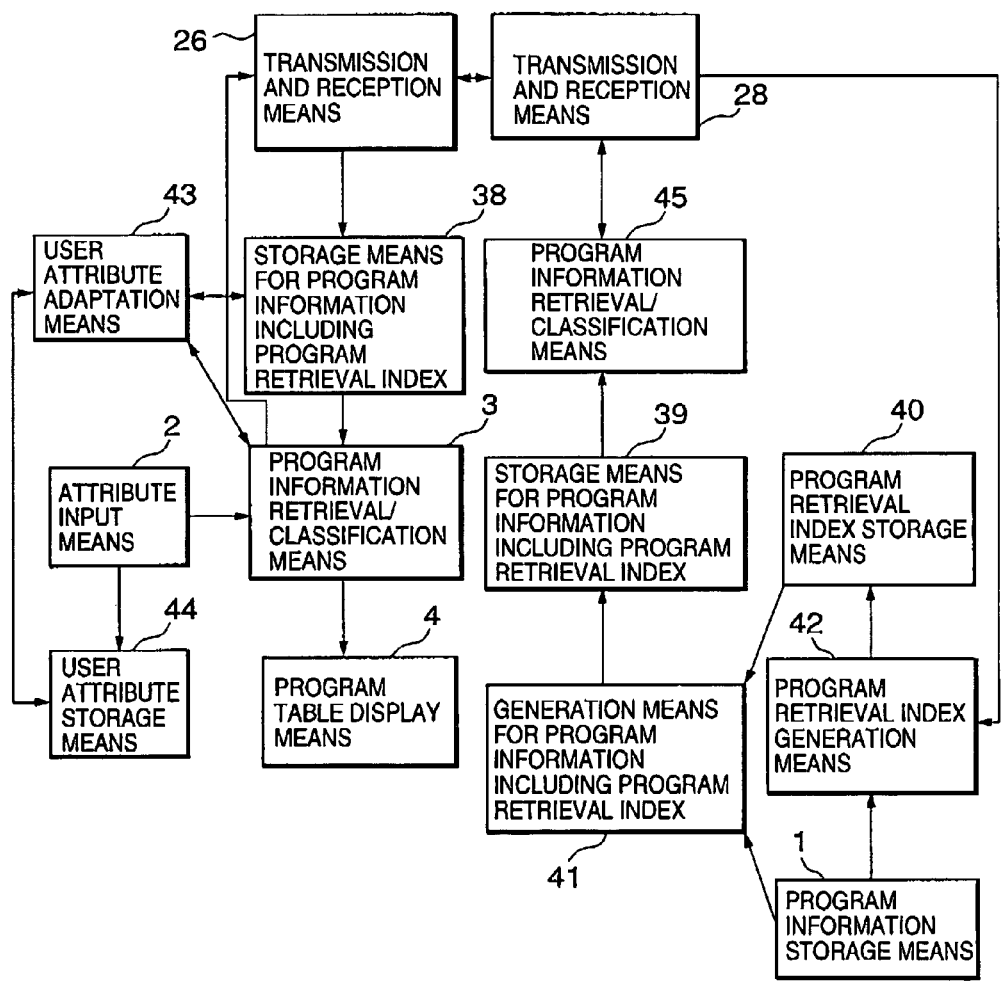
FIG. 37 is a block diagram showing the construction of a nineteenth embodiment of a system for processing program information according to the present invention.

FIG. 37 is a block diagram showing the structure of the nineteenth embodiment of a system for processing program information according to the present invention. In FIG. 37, the reference 26 denotes transmission and reception means for transmitting and receiving program information. This transmission and reception means 26, is connected to a storage means 38 for program information including a program retrieval index. This storage means 38 for program information including a program retrieval index, is connected to a program information retrieval/classification means 3 and a user attribute adaptation means 43. Attribute input means 2, program table display means 4 and the user attribute adaptation means 43 are connected to the program information retrieval/classification means 3. User attribute storage means 44 is connected to the attribute input means 2. This user attribute storage means 44 is connected so that data can be sent to and received from the user attribute adaptation means 43. Those functional parts constitute a user side terminal. Reference 28 denotes transmission and reception means disposed correspondingly to the above transmission and reception means 26 for transmitting program information and a program image to that transmission and reception means 26 and receiving them from that transmission and reception means 26. This transmission and reception means 28 is connected to a program information retrieval/classification means 45. This program information retrieval/classification means 45 is connected to a storage means 39 for program information including a program retrieval index is connected. Generation means 41 for program information, including a program retrieval index, is connected to the storage means 39 for program information including a program retrieval index. In FIG. 37, the reference 40 denotes program retrieval index storage means 40. This program retrieval index storage means 40 is connected to program retrieval index generation means 42. Furthermore, this program retrieval index generation means 42 is connected to a program information storage means 1. The program information storage means 1, the transmission and reception means 28, the storage means 39 for program information including a program retrieval index, the generation means 41 for program information including a program retrieval index, the program retrieval index storage means 40, the program retrieval index generation means 42, and the program information retrieval/classification means 45 constitute a server side terminal.

In the user side terminal, the attribute input means 2 is for inputting various program information retrieval conditions or the like by the audience. The program information retrieval/classification means 3 is for retrieving and classifying program information, including a program retrieval index, stored in the storage means 38 for program information including a program retrieval index. The program table display means 4 receives the program table data from the program information retrieval/classification means 3 and comprises means to display them. The user attribute storage means 44 is for maintaining the data relative to the user attribute in the user side terminal. The user attribute adaptation means is for examining whether the user attribute is adaptable or not upon the retrieval of program information.

In the server side terminal, the storage means 39 for program information, including a program retrieval index, is for storing program information, including a program retrieval index generated on the server side. The generation means 41 for program information, including a program retrieval index, is for generating program information including a program retrieval index by adding an index for the program retrieval to program information sent from the program information storage means 1. The program retrieval index storage means 40 is for storing the data related to the index to be added to program information. The program retrieval index generation means 42 is for generating the data relative to the index to be added to the program information. The program information retrieval/classification means 45 is for retrieving program information including a program retrieval index stored in the storage means 39 for program information including a program retrieval index.

The operation of the system for processing program information according to the nineteenth embodiment having this construction will be described. In this nineteenth embodiment, on the server side, program information stored in the program information storage means 1 is received by the program retrieval index generation means 42 and the index for the program retrieval is generated based on the above program information. The generated program retrieval index is sent to the program retrieval index storage means 40 to be stored. The data from the program information storage means 1 and the data from the program retrieval index storage means 40 are sent to the generation means 41 for program information including a program retrieval index to generate program information including a program retrieval index.

Program information, including a program retrieval index generated on the server side, is sent from the storage means 39 for program information, including a program retrieval index, to the transmission and reception means 28 and transmitted from the transmission and reception means 28 to the user side terminal. In the user side terminal, the transmission and reception means 26 receives the transmitted data of the above program information including a program retrieval index, and those data are stored in the storage means 38 for program information including a program retrieval index.

In the program information retrieval operation based on the program table, if the audience inputs a program retrieval index for a predetermined program in the program table (it can be the program table 101 used in the above embodiments) through the attribute input means 2, the program information retrieval/classification means 3 retrieves the selected program in the storage means 38 for program information including a program retrieval index. At this time, the user attribute adaptation means 43 receives the user attribute data from the user attribute storage means 44 to examine whether the retrieved program is adapted to the user attribute or not. If the user attribute is adaptable, program information is read out. The read-out program information is sent to the program table display means 4 and is adapted to be displayed there. On the other hand, if the user attribute is not adaptable, program information is not read out and the program information is not displayed on the program table display means 4.

In the above retrieval operation, a different retrieval result is obtained depending of the adaptation or non-adaptation of the user attribute. In the case of the adaptable user attribute, if, in the user side terminal, the corresponding program information is not retrieved even when the program information retrieval/classification means 3 retrieves the selected program in the storage means 38 for program information including a program retrieval index, the retrieval of program information is performed in the server side terminal. In this case, the attribute data input in the user side terminal are sent from the program information retrieval/classification means 3 to the transmission and reception means 26, and after that, transmitted from the transmission and reception means 26 to the server side terminal. These attribute data are sent to the program information retrieval/classification means 45 in the server side terminal. The program information retrieval/classification means 45 on the server side performs the retrieval in the storage means 39 for program information including a program retrieval index and if there is program information, it is read out. The read-out program information is transmitted from the transmission and reception means 28 to the user side terminal and sent to the program table display means 4 in the audience terminal to be displayed there. In this manner, in addition to performing the certain retrieval in the user side terminal by examining the adaptation of the user attribute, even if the retrieval of program information: including a program retrieval index, ended in failure, a similar program information retrieval can be performed in the server side terminal so the certainty of the operation increases.

20th Embodiment

Figure 38:
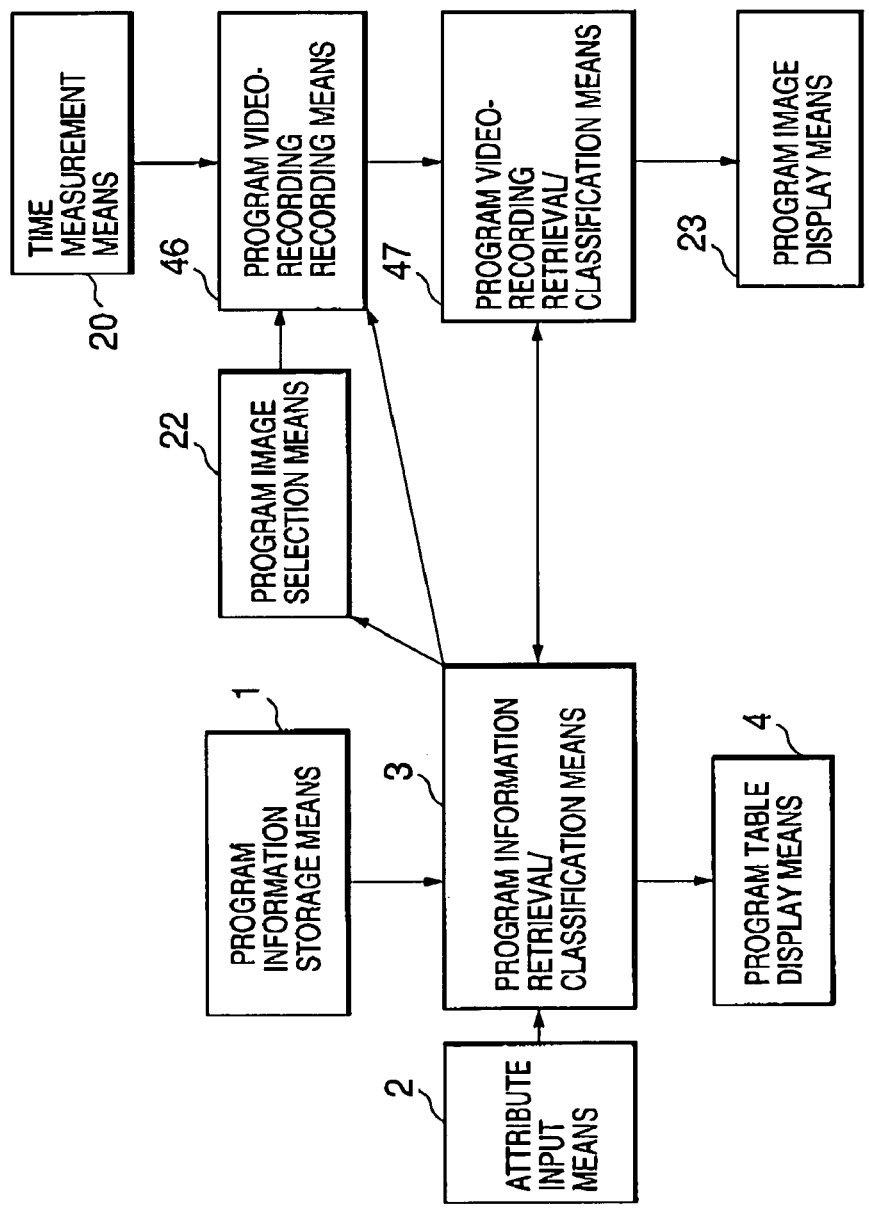
FIG. 38 is a block diagram showing the construction of a twentieth embodiment of a system for processing program information according to the present invention.

FIG. 38 is a block diagram showing the construction of the twentieth embodiment of a system for processing program information according to the present invention. In FIG. 38, the reference 1 denotes program information storage means for storing received program information, 2 shows attribute input means through which attribute information to be used as two-axes attributes of a program table and the others of attribute information are input, 3 indicates a program information retrieval/classification means for retrieving or classifying a program in program information on the basis of input attribute information to make the program table, and 4 denotes a program table display means for displaying the made table of programs. The reference 22 denotes a program image selection means, 20 denoted time measurement means, 46 indicates a program image recording means for recording a program image, 47 denotes a program video-recording information retrieval/classification means, and 23 indicates a program image display means for displaying the program image. The program image recording means 46 is made up of, for instance, a device for recording a video image of the program determined by a timer control under the control of the time measurement means 20. The program image recording means 46 is also constructed to record a program image by following an instruction from the program information retrieval/classification means 3. The program image selection means 22 starts the program image recording means 46 in response to receiving an instruction from the program information retrieval/classification means 3. The program image display means 23 displays the image of the program.

Figure 39A:
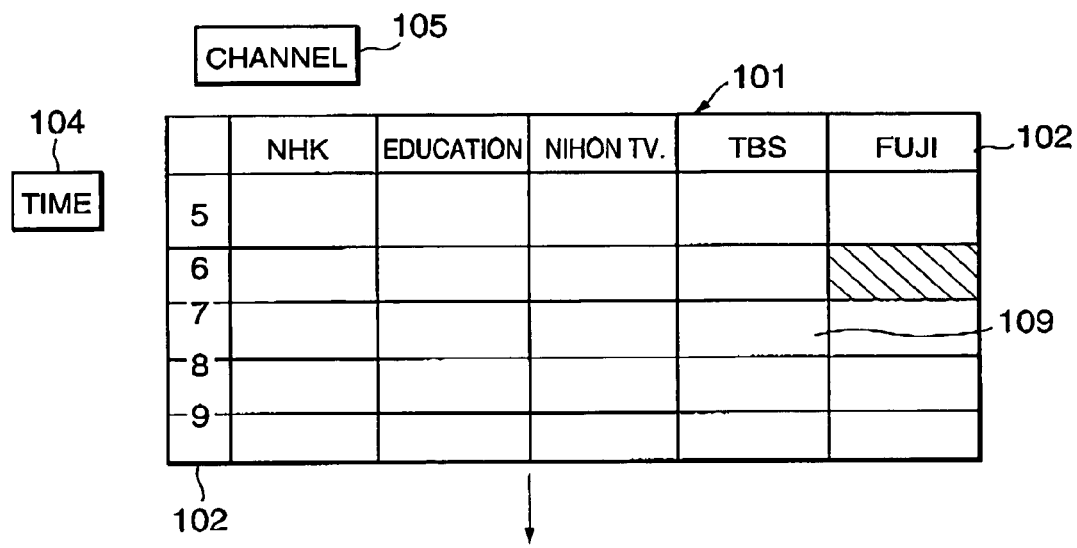
FIG. 39A is a diagram showing the construction of a program table in the ordinary form used in the above twentieth embodiment.

The operation of the system for processing program information according to the twentieth embodiment having this structure will be described. FIGS. 39A and B are diagrams that illustrate the display operation of the program table in the system for processing program information according to the twentieth embodiment. In this twentieth embodiment, at first, the basic program table 101 is two-dimensionally displayed on the program table display means 4 as shown in FIG. 39A. At position(s) adjacent to the program table 101 in the display picture, there are provided display windows for the two-axes attributes that determine the structure of the program table displayed at present, that is, present attribute display window 104 and 105. In the example of FIG. 39A, "time", representing the time slot, is displayed in the present attribute display window 104 and "CH", representing the channel, is displayed in the present attribute display window 105.

Figure 39B:
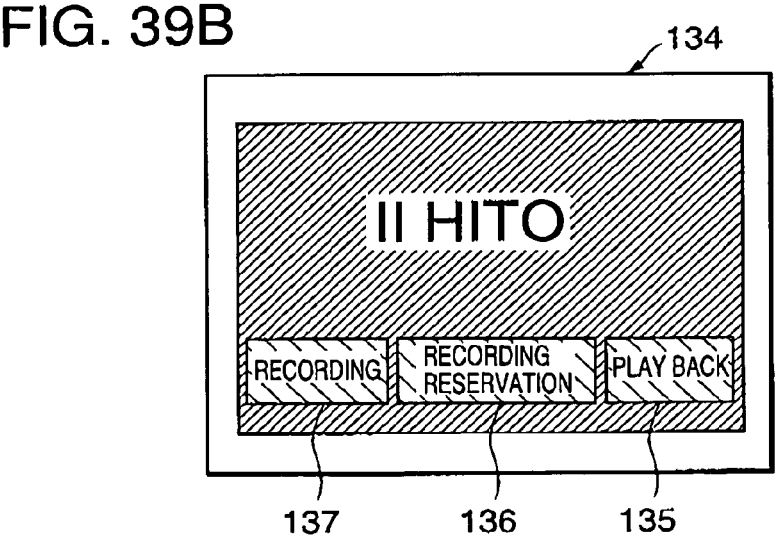
FIG. 39B is a diagram showing the construction of the image picture with the recording, play back and reservation buttons obtained by the predetermined program selection in the program table of the above FIG. 39A.

In this embodiment, if the audience selects a certain program through the attribute input means 2, the program information retrieval/classification means 3 retrieves the program from the program image storage means 1. If the program is recorded, a play back button 135 is displayed with program information on the program information picture 134 of the program table display means 4 as shown in FIG. 39B. If it is not recorded and if it is off the air at the time, a recording reservation button 136 is displayed on the program information picture 134 of the program table display means 4. If it is on the air, a recording button 137 is displayed on the program information picture 134 of the program table display means 4. Based on the button display as described above, if the audience clicks the play back button 135, this operation information is sent through the program information retrieval/classification means 3 to the program image recording means 46 to play back the program. If the recording reservation button 136 is clicked, this operation information is sent through the program information retrieval/classification means 3 to the program image recording means 46 to reserve the program for recording. By this manner, the program image recording means 46 and the time measurement means 20 are set. Furthermore, if the recording button 137 is clicked, this operation information is sent through the program information retrieval/classification means 3 and the program image selection means 22 to the program image recording means 46 to record the program immediately. In this manner, even in the case where the audience has no time for viewing the program, or the like, it can be recorded in this manner such as the recording reservation, to enable the audience to view the program later.

Figure 40A:
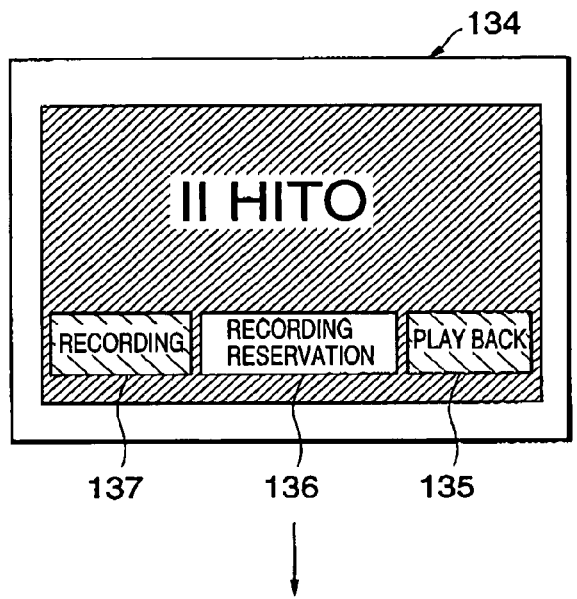
FIG. 40A is a diagram showing the construction of a picture when performing the recording reservation operation in the image picture of FIG. 39B.
Figure 40B:
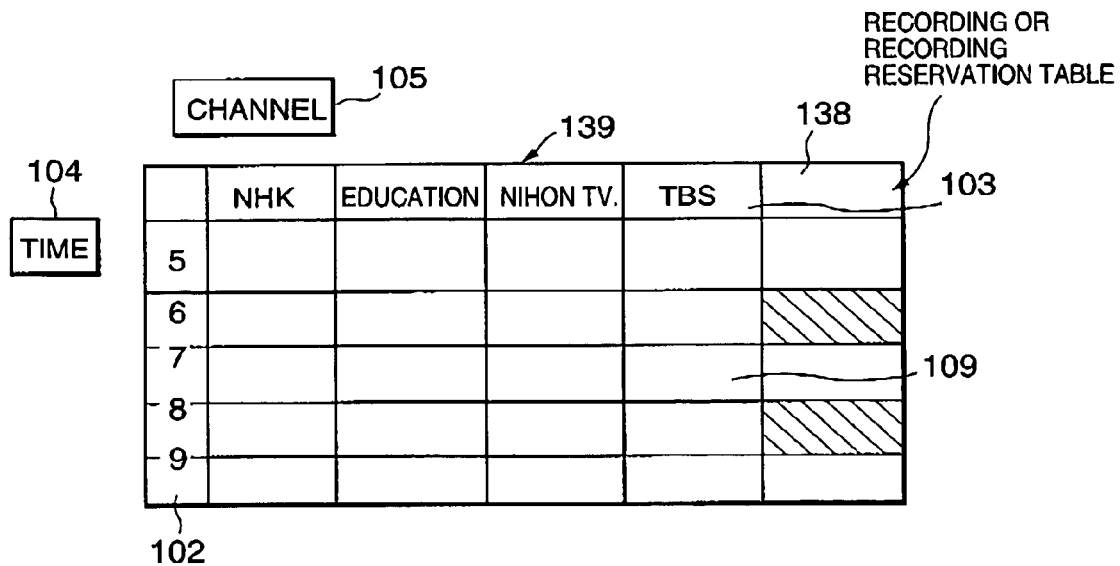
FIG. 40B is a diagram showing the construction of a program table clearly displaying the time slot in which the recording or recording reservation was performed in the picture of the above FIG. 40A.

FIGS. 40A and B show display conditions of the program table display means 4 for performing the above recording reservation operation. In these drawings, if the recording reservation button 136 is operated by clicking in the program information picture 134, shown in FIG. 40A, to reserve the program for recording, a recording reservation program table 139 is made up as shown in FIG. 40B. In this recording reservation program table 139, there are provided recording relation columns 138 for displaying a recording or recording reservation table. If recording reservations are performed as to plural programs, in the recording relation columns 138 of the recording complementary-angle program table 139, program information reserved for recording is displayed along the time. By this manner, it becomes easy to distinguish the program reserved for recording.

21st Embodiment

Figure 41:
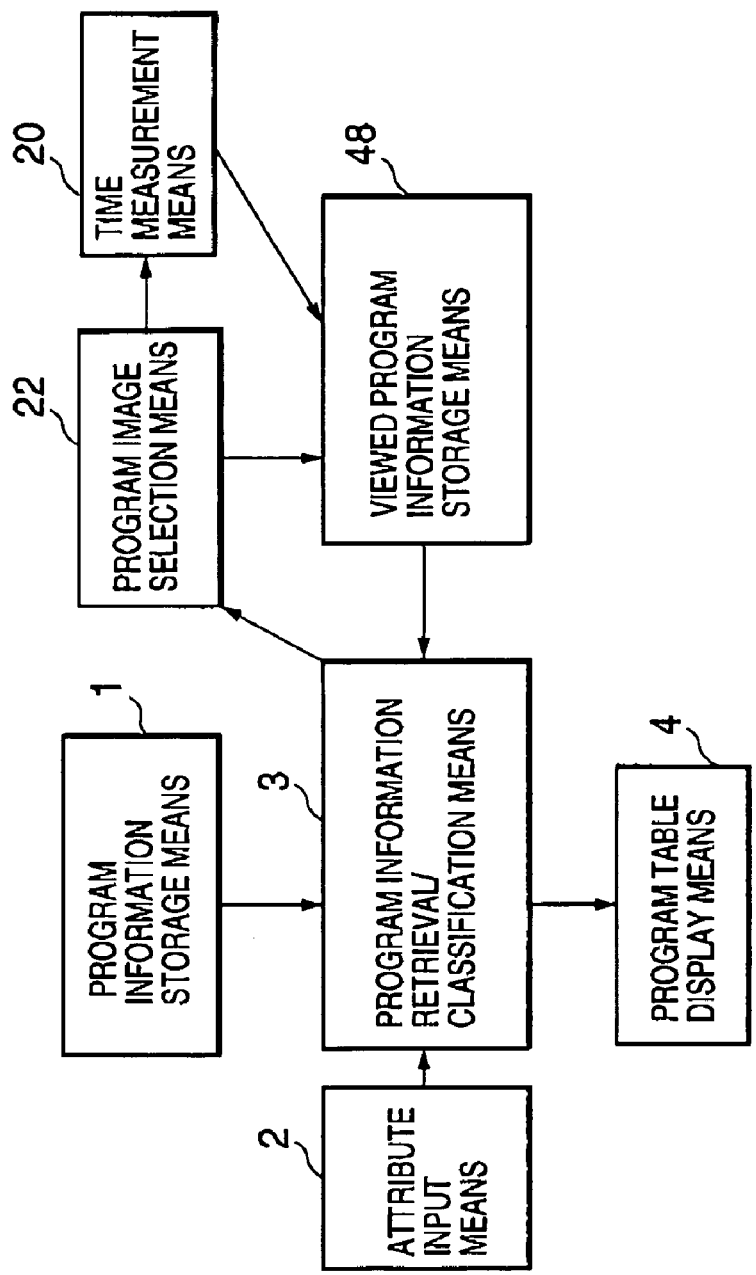
FIG. 41 is a block diagram showing the construction of a twenty-first embodiment of a system for processing program information according to the present invention.

FIG. 41 is a block diagram showing the structure of the twenty-first embodiment of a system for processing program information according to the present invention. In FIG. 41, the reference 1 denotes program information storage means for storing received program information, 2 identifies attribute input means through which attribute information, to be used as two-axes attributes of a program table and the others of attribute information, are input, 3 indicates a program information retrieval/classification means for retrieving or classifying a program in program information on the basis of input attribute information to make the program table, and 4 identifies a program table display means for displaying the program table that has been made. The reference 22 denotes a program image selection means, 20 denotes a time measurement means, and 48 shows a viewed program information storage means. The viewed program information storage means 48 is for recording information about the program being viewed by the audience. The program image selection means 22 registers data to the viewed program information storage means 48 by receiving an instruction to do so from the program information retrieval/classification means 3.

Figure 42A:
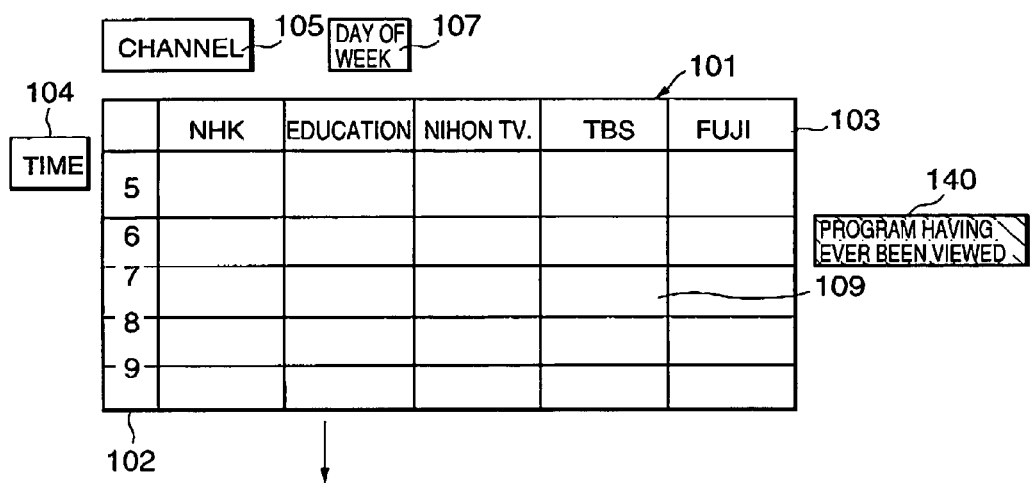
FIG. 42A is a diagram showing the construction of a program table in the ordinary form used in the above twenty-first embodiment.

The operation of the system for processing program information according to the twenty-first embodiment having this construction will be described. FIGS. 42A and B are diagrams for illustrating the display operation of the program table in the system for processing program information according to the twenty-first embodiment. In this twenty-first embodiment, at first, the basic program table 101 is two-dimensionally displayed on the program table display means 4 as shown in FIG. 42A. At positions adjacent to the program table 101 in the display picture, there are provided display windows for the two-axes attributes determining the structure of the program table displayed at present, that is, present attribute display windows 104 and 105. In the example of FIG. 42A, "time", representing a time slot is displayed in the present attribute display window 104, "CH", representing the channel, is displayed in the present attribute display window 105, and "day of week", as the other attribute information, is displayed in the change attribute display window 107. At a position adjacent to the right side of the above referenced program table 101, there is displayed an operating button 140 for recalling a "program that has previously been viewed".

Figure 42B:
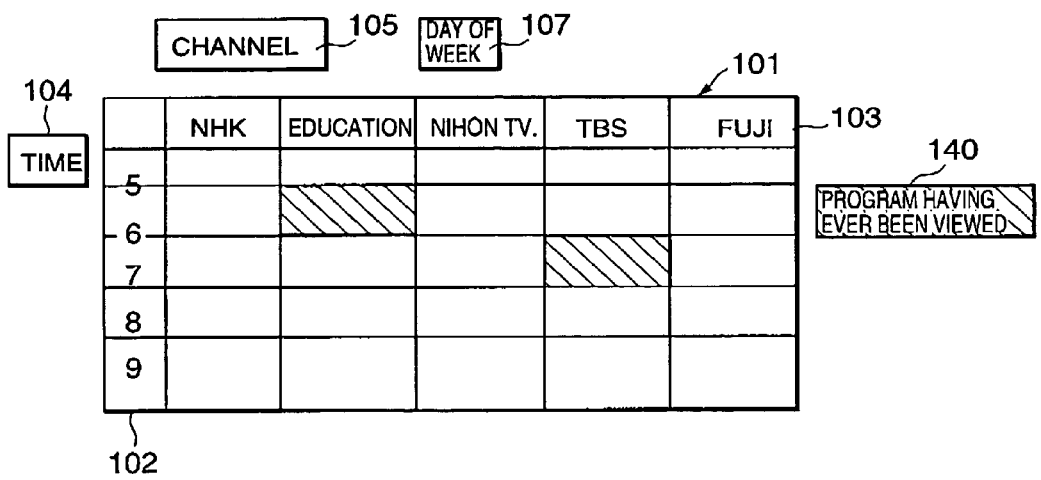
FIG. 42B is a diagram showing the construction of the program table in which the program corresponding to a program having ever been viewed is different in color from the other programs, obtained by the button operation in the picture of the above FIG. 42A.

Here, if the audience clicks the referenced operation button 140, on the program table display means 4, as shown in FIG. 42B, there is displayed a program table 141 in which the program information display windows 109 corresponding to the programs have previously been viewed are different in color from the other programs. If the audience selects a certain program through the attribute input means 2, the program information retrieval/classification means 3 retrieves the program from the program image storage means 1 to display the program information on the program table display means 4. In this manner, the programs having previously been viewed become clear at a glance at the program table 141 and this can be utilized for selecting the program the audience wants to view next.

FIG. 43 is a diagram showing the user classification program table 120 (already described with reference to FIG. 17) when the user classification operation is designated in the program table shown in FIG. 42A, and the structure of the program table is basically the same as that shown in FIG. 17B. In this embodiment, by clicking the operation button 140 for calling up the above "program having previously been viewed", also in this user classification program table 120, windows for the programs previously viewed are added to the lowermost columns and program information about the programs previously viewed is displayed in those windows. In this manner, as for the programs inserted in the user classification, the distinction of programs having previously been viewed or not yet viewed can easily be performed and this can be utilized for selecting the program that the audience wants to view next.

22nd Embodiment

Figure 44:
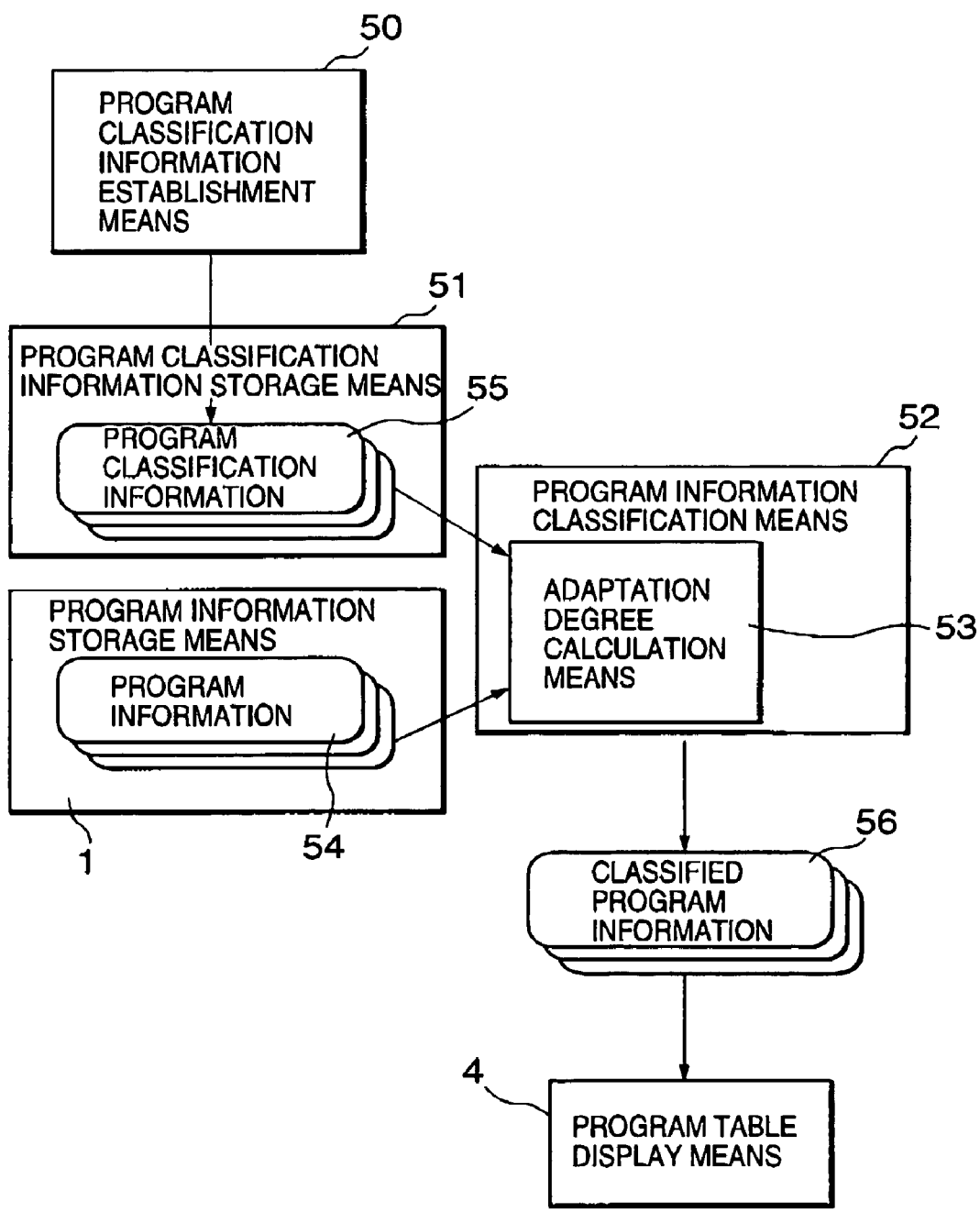
FIG. 44 is a block diagram showing the construction of a twenty-second embodiment of a system for processing program information according to the present invention.

FIG. 44 is a block diagram showing the structure of the twenty-second embodiment of a system for processing program information according to the present invention. In FIG. 44, the reference 1 denotes a program information storage means for storing received program information, and 4 denotes a program table display means for displaying the made program table. The reference 50 denotes program information classification establishment means for establishing classification information required for classifying programs, 51 denotes a program classification information storage means for storing program classification information, and 52 denotes a program information classification means for classifying programs in accordance with a predetermined rule. To the program classification information establishment means 50, for instance, program classification information is input by the user or established at the time of constructing the system. Program information 54 is stored in the program information storage means 1 and program classification information 55 is stored in the program classification information storage means 51. The program information classification means 52 includes adaptation degree calculation means 53 for calculating the adaptation degree of a program upon the classification operation.

Figure 45:
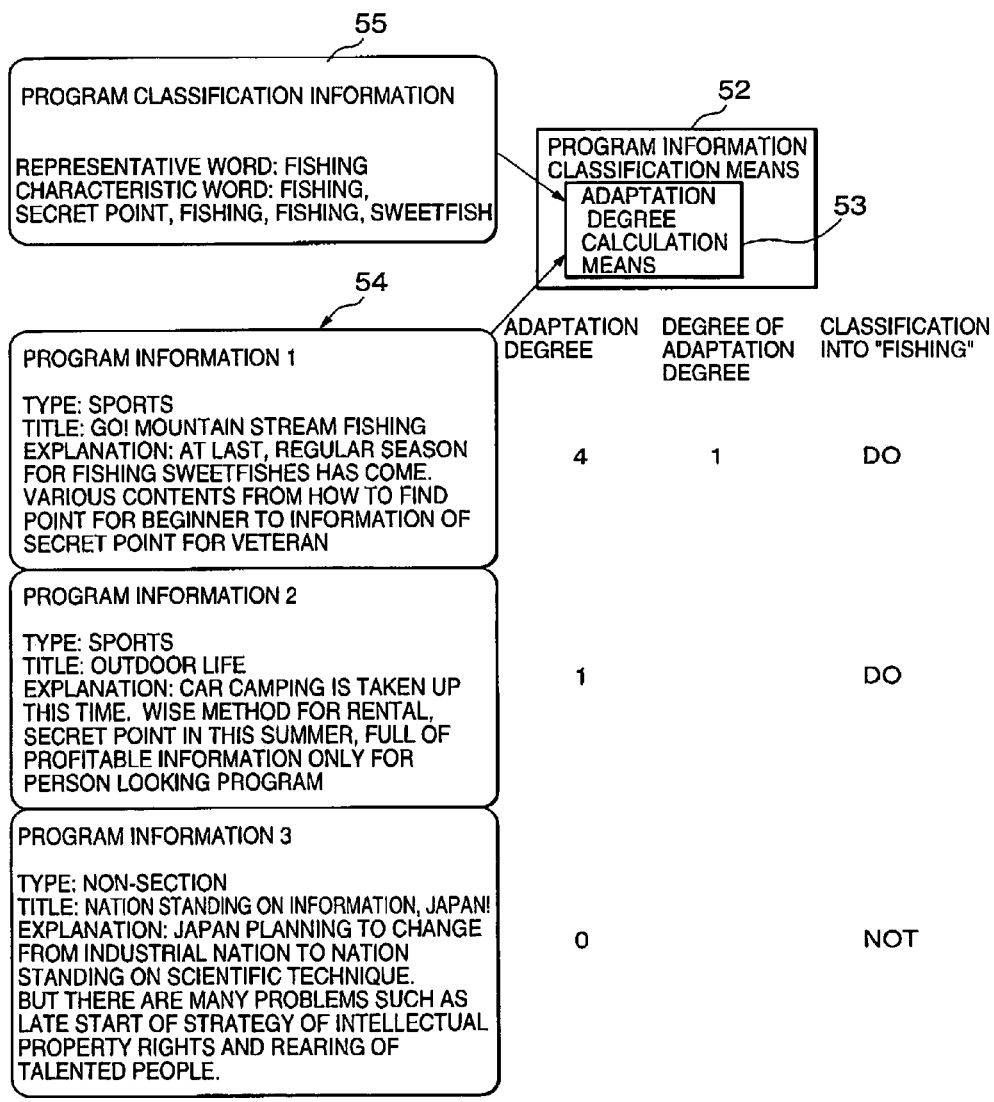
FIG. 45 is an image diagram showing the process operation content of the classification method by the adaptation degree calculation means in the above twenty-second embodiment.
Figure 46:
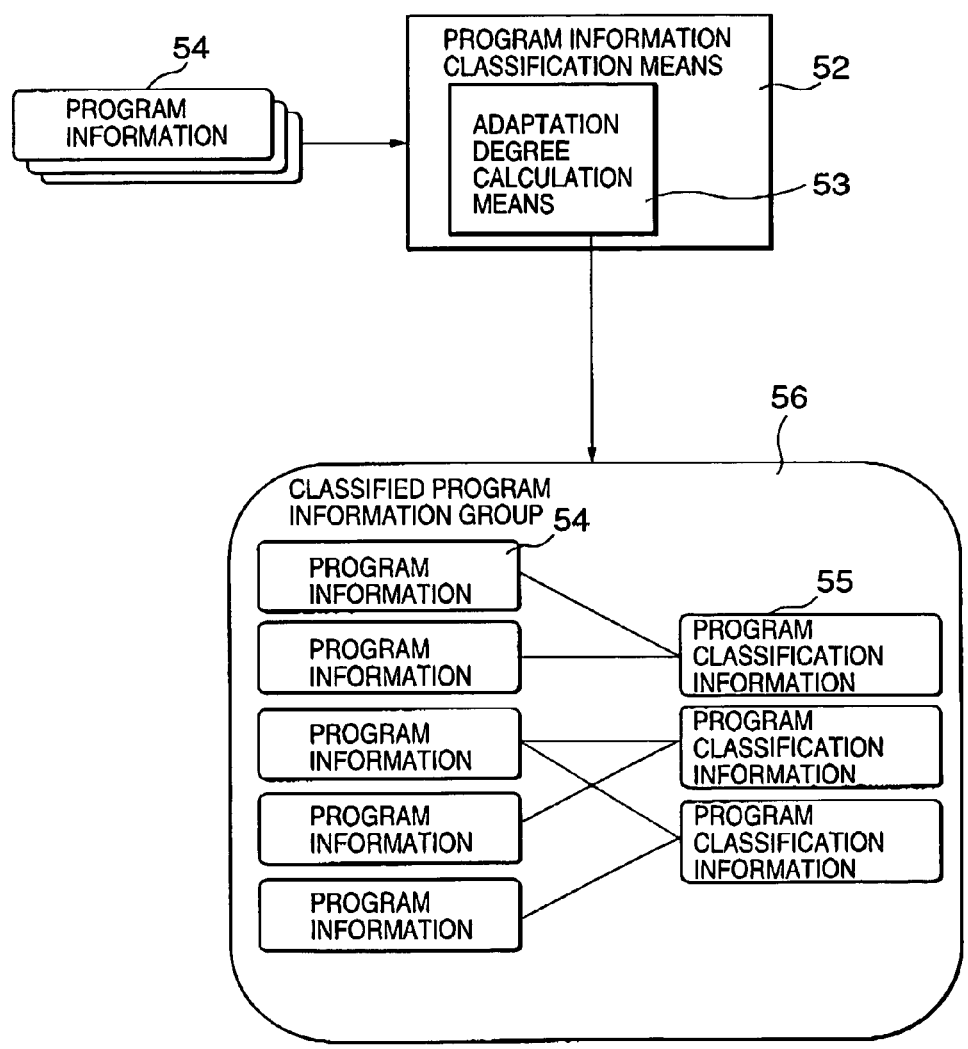
FIG. 46 is an image diagram of the classification result of program information obtained by the program information classification means.

The structure of program classification information 55 will be described. Program classification information 55 comprises, for instance, a set of representative words (for example: fishing) representing the meaning of the classification and a line of characteristic words (example: FISHING, spot, fishing, Fishing) for collation with program information. By collating these characteristic words with program information, the adaptation degree of each piece of program information with the program classification information can be calculated. For instance, the sum of the numbers of times of the appearances of the characteristic words can be used as the measurement of the adaptation degree. In the adaptation degree calculation means 53, by comparing this value with a threshold value of the adaptation degree established as to the program classification, the set of program information to be classified in program classification information of a certain program can be specified. In this case, as for one piece of program classification information, all pieces of program information having adaptation values that exceed the threshold value are classified. FIG. 45 is an image diagram showing the process operation content of the classification method (or classification operation) by the adaptation degree calculation means 53. As shown in this drawing, as program classification information 55, "representative word: fishing" and "characteristic word: FISHING, secret point, fishing, Fishing, sweetfish" are established. The program information classification means 52 loads program information 1 to 3 from program information each 1 and calculates the adaptation degrees as to respective pieces of program information. As a result, the adaptation degree of 4 is given to program information 1, the adaptation degree of 1 to program information 2, and the adaptation degree of 0 to program information 3. Therefore, the threshold value established in the program information classification means 52 and the adaptation degree of each piece of program information are compared with each other, with the result that program information 1 is classified into "fishing" and program information 2 is also classified into "fishing" but program information 3 is not classified into "fishing". Because the classification of program information is performed by such a classification method, there is also the possibility that one piece of program information is classified into plural pieces of program classification information. FIG. 46 is an image diagram of the classification result of program information by the program information classification means 52. In classified program information (group) 56, program information connected by a line to the same program classification information says that it belongs the same classification. Program information in which two or more lines are drawn from one piece of program information says that it is classified into plural pieces of program classification information.

Program classification information itself may be predetermined for the system, or established by the user with the program classification information establishment means. They may also be mixed.

In the structure that includes such program information classification means 52, program information 54 can be classified as to program classification information 55. The program table with the established program classification information as one axis can be made and displayed on the program table display means 4. On the other axis of the program table, the order of the adaptation degrees, as to respective pieces of program classification information, may be shown, or, by showing the line of other pieces of program classification information, the accuracy of the program can be seen from plural points of view, and it can be grasped more accurately.

In any form of the program table, among the programs displayed therein, it becomes possible to separately display only those programs that are classified into a certain piece of program classification information.

23rd Embodiment

Figure 47:
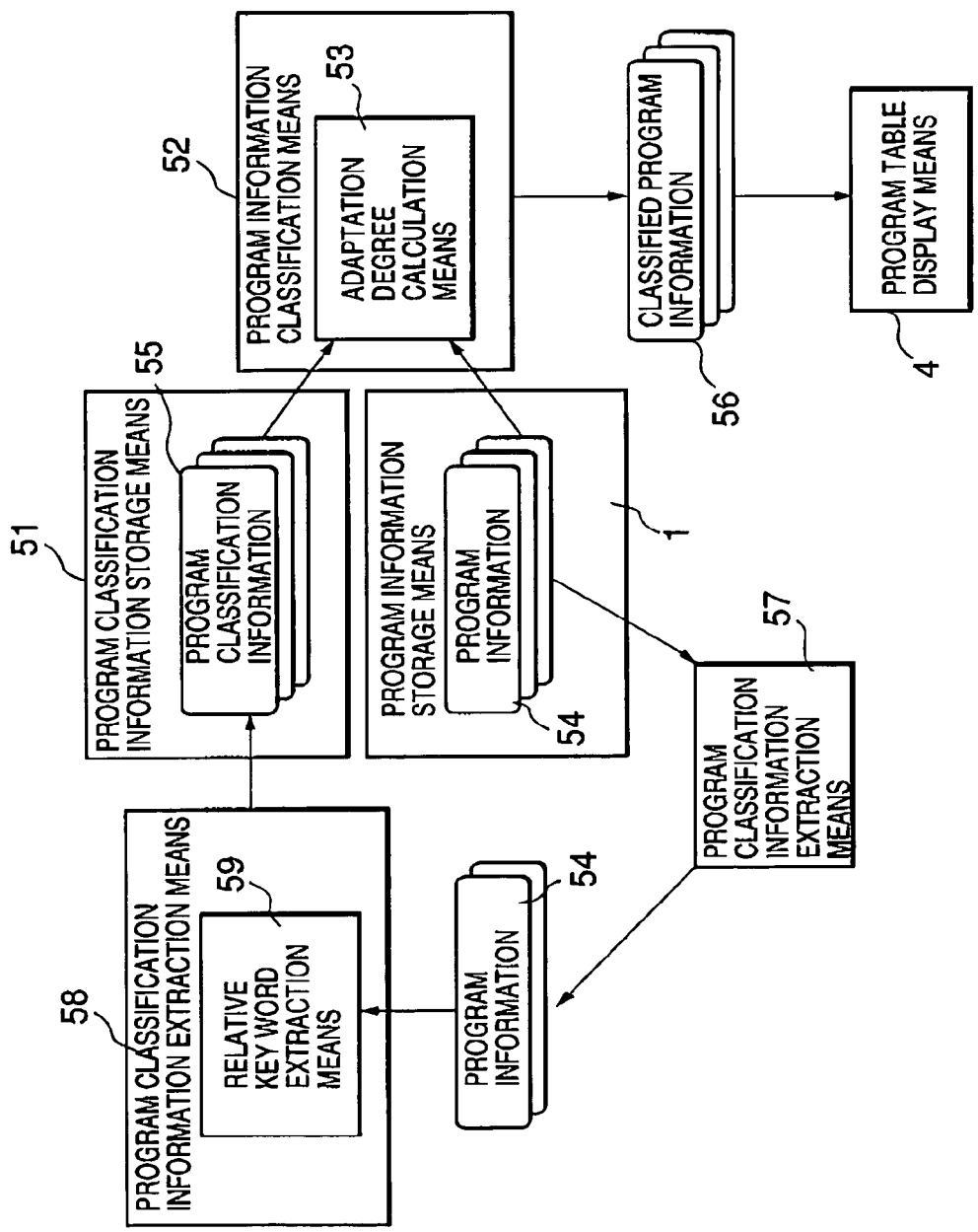
FIG. 47 is a block diagram showing the construction of a twenty-third embodiment of a system for processing program information according to the present invention.

FIG. 47 is a block diagram showing the structure of the twenty-third embodiment of this invention in relation to a system for processing program information. The program information processing means according to this embodiment has a structure such that program classification information extraction means 57 and program classification information generation means 58 replace the program classification information establishment means 50 of the system for processing program information according to the above twenty-second embodiment. The program classification information generation means 58 includes related key word extraction means 59. The remaining structure of this embodiment of this invention is the same as the above described twenty-second embodiment and includes program information storage means 1, program table display means 4 for displaying the program table, program classification information storage means 51, program information classification means 52, and adaptation degree calculation means 53. The program classification information extraction means 57 obtains program information from the program information storage means 1 and extracts data, that will become program classification information, from this program information. The program classification information generation means 58 extracts a characteristic word or the like to be the program classification information by the related key word extraction means 59 to make up the program classification information. In this manner, in this embodiment, the system for processing program information itself can generate program classification information in a self-complete manner.

In the operation of this twenty-third embodiment, a specified set of program information data stored in the program information storage means 1, for instance, "program liked by a certain person or the like" is designated. A characteristic word is extracted from the designated set of program information data by the related key word extraction means 59, and by establishing an appropriate representative word designated by the user, appropriate program classification information can be generated. There are various methods for the practical implementation of the relative key word extraction means 59.

By including such program classification information extraction means 57 and program classification information generation means 58, a new piece of program classification information can easily be defined by a user by designating a proper program group so the task of designating a characteristic word can be omitted. Because the characteristic word is extracted from real program information, there is also the advantage that it is easy to obtain program classification information capable of classifying the program more accurately.

24th Embodiment

Figure 48:
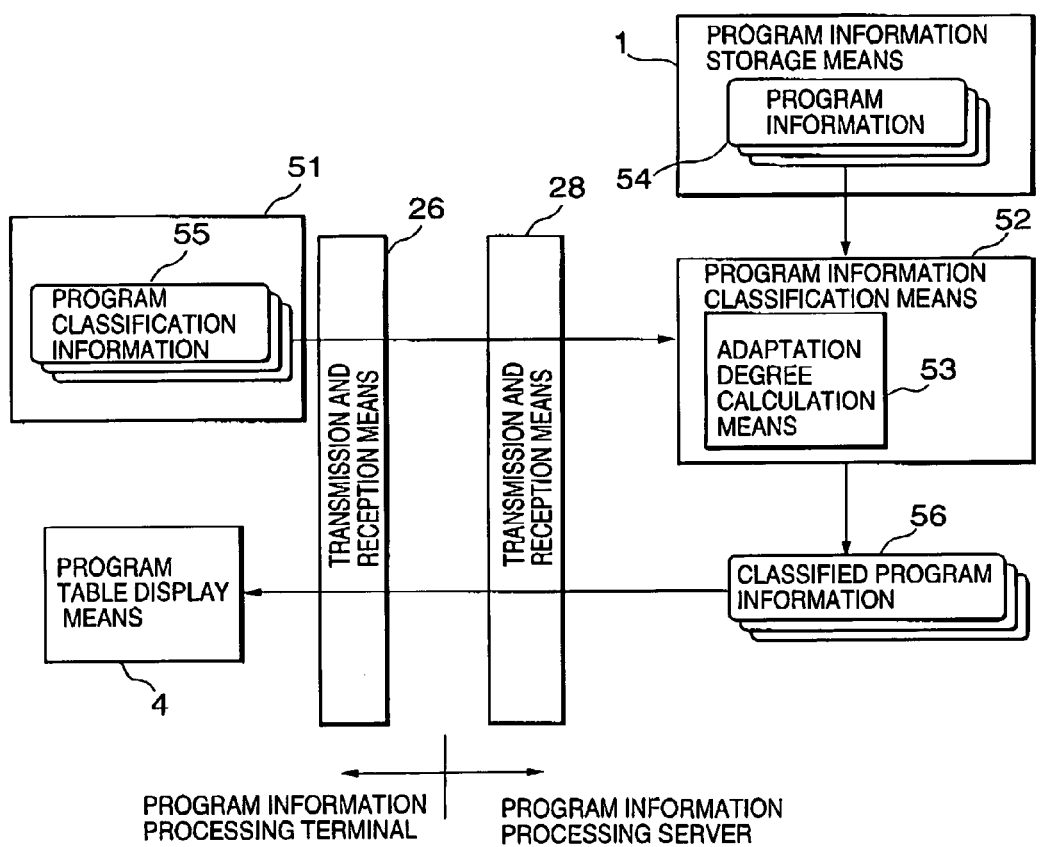
FIG. 48 is a block diagram showing the construction of a twenty-fourth embodiment of a system for processing program information according to the present invention.

FIG. 48 is a block diagram showing the structure of the twenty-fourth embodiment of a system for processing program information according to the present invention. In FIG. 48, the reference 26 denotes transmission and reception means for transmitting and receiving program information and program classification information. This transmission and reception means 26 is connected to the program classification information storage means 51 and the program table display means 4 to constitute a reception side terminal (that is, a user side terminal). 28 denotes transmission and reception means, disposed correspondingly to the above transmission and reception means 26, for transmitting program information and program classification information to that transmission and reception means 26 and receiving them from that transmission and reception means 26. The transmission and reception means 28 is connected to the program information classification means 52. The program information storage means 1 is connected to the program information classification means 52. The program information storage means 1 and the program information classification means 52 constitute a server (sender) side terminal.

Because it has this structure, the system for processing program information includes the program information classification means 52 according to this embodiment and is constructed to classify program information, can be used in the environment where the server and the user terminals cooperate with each other. In this case, program classification information is transmitted from the user side terminal to the server side terminal. Program classification information to be transmitted may be any of those predetermined in the system, established by the user, and extracted from the program information group designated by the user.

The server side terminals that has received program classification information, classifies the program information groups stored in the program information storage means 1 in accordance with those pieces of program classification information. By transmitting, to the user side terminal for display on the program table display means 4, only program information, that has been classified into program classification information and has been transmitted from the user side terminal, the quantity of data to be transmitted can remarkably be reduced in comparison with the case where all program tables are transmitted.

As described above, according to this embodiment of the present invention, the system for processing program information is constructed to include the program information storage means for storing program information, and the program table display means. This enables the system to two-dimensionally display the program table using two axes in accordance with two attributes selected from among attributes given to each piece of program information. This allows, the program table for two-dimensionally displaying the programs with two axes for the audience to select the attributes. Thus, program tables of various structures can be displayed on the display means at will and in respective program retrieval operations, in a format that makes the program table easy to use to find a desired program. The result of being able to find a desired program in a short time, by coming up with ideas for the extraction of key words that designate the program or the like, and the fact that the table is useful for making a broadcast view plan for each user are obtained.

While the preferred embodiments of the present invention have been described in the above, various variations and modifications may be made without departing from the scope of the invention claimed herein below.

What is claimed is:

1. A system for processing program information comprising:
   program information storage means for storing program information;
   program table display means comprising a display having at least two dimensions defined by designation of at least two-axes attributes, wherein the attributes are selected from among all program information attributes, and at least two such attributes are used for two axes of a program table;
   attribute input means adapted to input attributes of two axes used for two dimensionally displaying the program table;
   program table making means adapted to retrieve program information from program information stored in the program information storage means on the basis of said input attributes to make a program table, said program table means being adapted to display the program table created by the program table making means;
   when there are plural programs in the same time zone, means for using said plural programs to check the programs of the same time zone without expanding the display area including means for displaying them overlaid one upon the other while shifting the programs rearward one at a time; and
   means for displaying the programs.

2. A system for processing program information as claimed in claim 1, wherein the program table making means is adapted to use program information stored in the program information storage means and is adapted to classify said program information.

3. A system for processing program information as claimed in claim 1, further comprising means for selecting or adding another attribute to the two-axes attributes of the program table to change over the display.

4. A system for processing program information as claimed in claim 1, further comprising means to display the program table while culling a portion the data that does not need to be displayed.

5. A system for processing program information as claimed in claim 4, further comprising means adapted to restore the original program table when displaying the program table.

6. A system for processing program information as claimed in claim 1, further comprising means to select an attribute relative to the program to that are adapted to change the display.

7. A system for processing program information as claimed in claim 1, further comprising means for adding and/or deleting a new attribute from the program table in accordance with a selection of the attribute by a user or an input from another system.

8. A system for processing program information as claimed in claim 1, further comprising means to designate information registered by a user as an attribute of the program table.

9. A system for processing program information as claimed in claim 1, further comprising means to extract attribute information from program information.

10. A system for processing program information as claimed in claim 1, comprising means to display and/or play back pictures or sounds of a program.

11. A system for processing program information as claimed in claim 1, wherein, when a channel or a program is selected as an attribute of the program table, means to change the channel to the picture of the selected program and means for displaying information relative to the selected program if the program is being received, and if the selected program is not being received, means for displaying only information relative to the program.

12. A system for processing program information as claimed in claim 1 further comprising, if a channel is selected as an attribute of the program table, means for displaying advertisements and program relation information in accordance with the time schedule of programs being broadcast over the channel.

13. A system for processing program information as claimed in claim 1, further comprising means for transmitting and/or receiving program information, program relation information, program renewal information, and information registered by a user, a program, a picture, or a sound.

14. A system for processing program information as claimed in claim 1, further comprising means for transmitting and/or receiving an image sequence made by a user and means for displaying said image sequence in a portion of the program table.

15. A system for processing program information as claimed in claim 1, further comprising means for transmitting program information selected by a user, means for calculating the number of people viewing the same program, and means for displaying the result in a portion of the program table as an audience rating or the number of people in the audience.

16. A system for processing program information as claimed in claim 1 further comprising:
   said program information including an index for retrieving a program;
   means for transmitting and/or receiving said program information; and
   means for maintaining a user attribute that is adapted to retrieve program information, including said index for retrieving a program on the basis of the user attribute, at the receiver side.

17. A system for processing program information as claimed in claim 1 further comprising:
   said program information including an index for retrieving a program;
   means for transit and/or receiving said program information;
   means for determining whether sad program information, including an index for retrieving a program, was not received at the receiver side; and
   when the program information was not received at the receiver side, means, at the transmitter side, for retrieving said program information.

18. A system for processing program information as claimed in claim 16, wherein, when a retrieval based on a user attribute was unsuccessful with program information, including an index for retrieving a program, at the receiver side, the system further comprising:

means for retrieving and automatically classifying said program information according to the user attribute at the transmitter side; and means to transmit the result to the receiver side.

19. A system for processing program information as claimed in claim 1, further comprising means for recording, reserving for recording and playing back a designated program in accordance with a designation by a user or an input from another system.

20. A system for processing program information as claimed in claim 1, further comprising means for displaying programs that have been recorded or reserved for recording along a time line of the program table.

21. A system for processing program information as claimed in claim 1, further comprising a recorder for recording information of the program viewed by a user, means for examining a relationship with recorded program information in all programs, and means for displaying the program when it is judged that there is a strong relationship.

22. A system for processing program information as claimed in claim 1, further comprising means for determining whether a performance of the program appears on a certain day or not.

* * * * *

UNITED STATES PATENT AND TRADEMARK OFFICE
CERTIFICATE OF CORRECTION

PATENT NO.        : 7,047,550 B1  
APPLICATION NO.   : 09/108506  
DATED             : May 16, 2006  
INVENTOR(S)       : Hideki Yasukawa et al.

It is certified that error appears in the above-identified patent and that said Letters Patent is hereby corrected as shown below:

Cover page  
    Item (75):

Change "Yoshihiro Noguchi, Ishikawa" to --Yoshihiro Noguchi, Ishikawashi--;  
        Change "Hayashi Itou, Matsudo" to --Hayashi Itou, Matsudo-shi--; and  
        Change "Takeo Isogawa, Sagamihara" to --Takeo Isogawa, Sagamihara-shi--

Paragraph (57) ABATRACT:

Line 5, change "structured" to --constructed--; and  
        Line 15, change "An" to --A--

Column 47, line 56, after "portion" insert --of--; and line 64, after "program" delete "to".  
Column 48, line 60, change "transit" to --transmitting--.

Signed and Sealed this

Twenty-sixth Day of December, 2006

JON W. DUDAS  
*Director of the United States Patent and Trademark Office*